United States Patent
Sun et al.

(10) Patent No.: US 10,567,127 B2
(45) Date of Patent: *Feb. 18, 2020

(54) SIGNAL FIELDS IN A HIGH EFFICIENCY WIRELESS LOCAL AREA NETWORK (WLAN) DATA UNIT

(71) Applicant: Marvell World Trade Ltd., St. Michael (BB)

(72) Inventors: Yakun Sun, San Jose, CA (US); Hongyuan Zhang, Fremont, CA (US); Liwen Chu, San Ramon, CA (US); Lei Wang, San Diego, CA (US); Jinjing Jiang, San Jose, CA (US); Mingguang Xu, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,666

(22) Filed: Jul. 16, 2018

(65) Prior Publication Data

US 2018/0323919 A1    Nov. 8, 2018

Related U.S. Application Data

(63) Continuation of application No. 14/956,947, filed on Dec. 2, 2015, now Pat. No. 10,027,449.

(Continued)

(51) Int. Cl.
  *H04L 5/00* (2006.01)
  *H04W 72/04* (2009.01)
  (Continued)

(52) U.S. Cl.
  CPC ........ *H04L 5/0007* (2013.01); *H04L 27/2602* (2013.01); *H04W 72/044* (2013.01);
  (Continued)

(58) Field of Classification Search
  CPC . H04L 5/007; H04L 27/2646; H04L 27/2666; H04L 65/1609; H04W 72/044; H04W 28/16; H04W 28/18; H04J 11/00
  See application file for complete search history.

(56) References Cited

U.S. PATENT DOCUMENTS 7,599,332 B2   10/2009   Zelst et al.
7,742,390 B2    6/2010   Mujtaba
(Continued)

FOREIGN PATENT DOCUMENTS

WO   WO2013166697   *   5/2012   ............ H04W 28/18

OTHER PUBLICATIONS

Chun et al. "Legacy Support on HEW frame structure," doc: IEEE 11-13/1057r0, *The Institute of Electrical and Electronics Engineers, Inc.*, pp. 1-8 (Sep. 2013).

(Continued)

*Primary Examiner* — Warner Wong

(57) ABSTRACT

A communication device generates a physical layer (PHY) preamble of a multi-user (MU) PHY data unit. The PHY preamble includes a first signal field, and a second signal field. The second signal field includes: a common field that includes a value, selected from a codebook, that indicates i) an allocation of frequency resources to one or more resource units, wherein each resource unit corresponds to a respective block of consecutive orthogonal frequency division multiplexing (OFDM) tones, and ii) a respective number of receiving devices assigned to each resource unit. The second signal field also includes a plurality of user-specific fields that indicate an allocation of the one or more resource units to the multiple receiving devices, wherein each user-specific field corresponds to a respective receiving device and includes i) an identifier of the respective receiving device, (Continued)

and ii) an indication of which one or more spatial streams are allocated to the respective receiving device.

19 Claims, 34 Drawing Sheets

Related U.S. Application Data

(60) Provisional application No. 62/222,566, filed on Sep. 23, 2015, provisional application No. 62/191,658, filed on Jul. 13, 2015, provisional application No. 62/156,059, filed on May 1, 2015, provisional application No. 62/112,976, filed on Feb. 6, 2015, provisional application No. 62/112,524, filed on Feb. 5, 2015, provisional application No. 62/105,459, filed on Jan. 20, 2015, provisional application No. 62/102,554, filed on Jan. 12, 2015, provisional application No. 62/092,053, filed on Dec. 15, 2014, provisional application No. 62/086,584, filed on Dec. 2, 2014.

(51) Int. Cl.
*H04L 27/26* (2006.01)
*H04J 11/00* (2006.01)

(52) U.S. Cl.
CPC .......... *H04J 11/00* (2013.01); *H04L 27/2646* (2013.01); *H04L 27/2666* (2013.01)

(56) References Cited

U.S. PATENT DOCUMENTS

| | | | |
|---|---|---|---|
| 8,155,138 B2 | 4/2012 | van Nee | |
| 8,289,869 B2 | 10/2012 | Sawai | |
| 8,526,351 B2 | 9/2013 | Fischer et al. | |
| 8,619,907 B2 | 12/2013 | Mujtaba et al. | |
| 8,724,720 B2 | 5/2014 | Srinivasa et al. | |
| 8,830,917 B1 * | 9/2014 | Zhang | H04W 4/00 370/329 |
| 9,197,298 B2 | 11/2015 | Kim et al. | |
| 9,397,873 B2 | 7/2016 | Zhang et al. | |
| 9,549,080 B2 | 1/2017 | Tabet | |
| 9,596,060 B1 | 3/2017 | Sun et al. | |
| 9,673,943 B2 | 6/2017 | Seok | |
| 9,706,599 B1 | 7/2017 | Zhang et al. | |
| 9,717,086 B2 | 7/2017 | Zhang et al. | |
| 9,749,879 B2 | 8/2017 | Eng | |
| 9,768,921 B2 | 9/2017 | Sun et al. | |
| 10,014,992 B2 | 7/2018 | Sun et al. | |
| 10,027,449 B2 | 7/2018 | Sun et al. | |
| 10,164,695 B2 | 12/2018 | Sun et al. | |
| 10,230,556 B2 | 3/2019 | Sun et al. | |
| 10,263,738 B2 | 4/2019 | Sun et al. | |
| 10,314,058 B2 * | 6/2019 | Mori | H04J 11/00 |
| 2009/0196163 A1 | 8/2009 | Du | |
| 2009/0290484 A1 | 11/2009 | Painchault | |
| 2010/0260159 A1 | 10/2010 | Zhang et al. | |
| 2011/0002219 A1 | 1/2011 | Kim et al. | |
| 2012/0147866 A1 | 6/2012 | Stacey et al. | |
| 2012/0237023 A1 | 9/2012 | Arnold | |
| 2013/0170376 A1 | 7/2013 | Dinan | |
| 2013/0229996 A1 | 9/2013 | Wang et al. | |
| 2014/0036811 A1 | 2/2014 | Zhang | |
| 2014/0307612 A1 | 10/2014 | Vermani et al. | |
| 2015/0085910 A1 | 3/2015 | Yokokawa | |
| 2015/0124744 A1 | 5/2015 | Zhu | |
| 2015/0131517 A1 | 5/2015 | Chu et al. | |
| 2016/0080056 A1 | 3/2016 | Porat | |
| 2016/0192388 A1 | 6/2016 | Ekpenyong | |
| 2016/0241315 A1 | 8/2016 | Kwon | |
| 2016/0255625 A1 | 9/2016 | Kim et al. | |
| 2016/0262157 A1 | 9/2016 | Kim et al. | |
| 2016/0301500 A1 | 10/2016 | Suh et al. | |
| 2016/0329999 A1 | 11/2016 | Li et al. | |
| 2016/0330300 A1 | 11/2016 | Josiam et al. | |
| 2016/0380794 A1 | 12/2016 | Sun et al. | |
| 2017/0048034 A1 | 2/2017 | Bharadwaj et al. | |
| 2017/0105218 A1 | 4/2017 | Tabet | |
| 2017/0126558 A1 | 5/2017 | Kwon | |
| 2017/0280462 A1 | 9/2017 | Chun et al. | |
| 2017/0295560 A1 | 10/2017 | Kim et al. | |
| 2018/0309550 A1 | 10/2018 | Sun et al. | |
| 2018/0323919 A1 | 11/2018 | Sun et al. | |
| 2019/0245659 A1 | 8/2019 | Sun et al. | |

OTHER PUBLICATIONS

Hiertz et al., "The IEEE 802.11 Universe," IEEE Communications Magazine, pp. 62-70, (Jan. 2010).

IEEE Std 802.11ac/D2.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

(56) References Cited

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).
International Preliminary Report on Patentability in International Patent Application No. PCT/US2015/063429, dated Jun. 15, 2017 (8 pages).
International Search Report and Written Opinion in International Application No. PCT/US2015/063429, dated Apr. 5, 2016 (13 pages).
Kwon et al., "SIG Field Design Principle for 11ax," IEEE draft, IEEE 802.11-15/0344r1, pp. 1-17 (Mar. 10, 2015).
Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
Stacey, "Specification Framework for TGax," Doc. No. IEEE 802.11-15-/0132r8, IEEE P802.11 Wireless LANs, Institute for Electrical and Electronics Engineers, 22 pages (Sep. 22, 2015).
Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).
Noh et al., "Preamble Structure in 80.11ax", Doc. No. IEEE 802.11-15/0575r0, May 2015 (15 pages).
Josiam et al., "HE-SIG-B Contents", Doc. No. IEEE 802.11-15/1066r0, Sep. 13, 2015 (25 pages).

\* cited by examiner

FIG. 11A

| SU/ MUMIMO | Group ID | Member ID | STBC | Nsts_total | Start Stream index | Nsts_user | MCS | Coding | CRC |
|---|---|---|---|---|---|---|---|---|---|
| 1 | 6 | 2 | 1 | 3 | 3 | 3 | 4 | 1 | 1 |
| 1102-2 | 1102-4 | 1102-6 | 1102-8 | 1102-10 | 1102-12 | 1102-14 | 1102-16 | 1102-18 | 1102-20 |

| SU/ MUMIMO | STA-ID/PID | STBC | Nsts_total | Joint index of (Start Stream Index/Nsts_user | MCS | Coding | CRC |
|---|---|---|---|---|---|---|---|
| 1 | 7 | 1 | 3 | 3 | 4 | 1 | 1 |
| 1102-2 | 1152-2 | 1102-8 | 1102-10 | 1152-4 | 1102-16 | 1102-18 | 1102-20 |

← 1150

| SU/MUMIMO | Number of RUs | STA_ID/PAID | Nsts | TxBF | STBC | MCS | Coding |
|---|---|---|---|---|---|---|---|
| 1 | 1 | 6 | 3 | 1 | 1 | 3 | 1 |
| 802-2 | 1302 | 802-4 | 802-6 | 802-8 | 802-10 | 802-12 | 802-14 |

| SU/ MUMIMO | STA_IS/PAID | Nsts (DL) | TxBF (DL) | STBC (DL) | MCS (DL) | Nsts (UL) | TxBF (UL) | STBC (UL) | MCS (UL) | Coding |
|---|---|---|---|---|---|---|---|---|---|---|
| 1702-2 | 1702-4 | 1702-6 | 1702-8 | 1702-10 | 1702-12 | 1702-14 | 1702-16 | 1702-18 | 1702-20 | 1702-12 |

| SU/ MUMIMO | STA_IS/PAID | Nsts (DL) | TxBF (DL) | STBC (DL) | MCS (DL) | Δ Nsts (UL) | TxBF (UL) | STBC (UL) | Δ MCS (UL) | Coding |
|---|---|---|---|---|---|---|---|---|---|---|
| 1702-2 | 1702-4 | 1702-6 | 1702-8 | 1702-10 | 1702-12 | 1752-2 | 1702-16 | 1702-18 | 1752-4 | 1702-12 |

| DL/UL/ Both | SU/ MUMIMO | STA_IS/PAID | Nsts (DL) | TxBF (DL) | STBC (DL) | MCS (DL) | Nsts (UL) | TxBF (UL) | STBC (UL) | MCS (UL) | Coding |
|---|---|---|---|---|---|---|---|---|---|---|---|
| 1902-1 | 1702-2 | 1702-4 | 1702-6 | 1702-8 | 1702-10 | 1702-12 | 1702-14 | 1702-16 | 1702-18 | 1702-20 | 1702-12 |

SIGNAL FIELDS IN A HIGH EFFICIENCY WIRELESS LOCAL AREA NETWORK (WLAN) DATA UNIT

CROSS-REFERENCES TO RELATED APPLICATIONS

This application is a continuation of U.S. patent application Ser. No. 14/956,947, entitled "Signal Fields in a High-Efficiency Wireless Local Area Network (WLAN) Data Unit," filed on Dec. 2, 2015, which claims the benefit of the following U.S. Provisional Patent Applications:

U.S. Provisional Patent Application No. 62/086,584, entitled "Signal Field Structure for High Efficiency WiFi," filed on Dec. 2, 2014;

U.S. Provisional Patent Application No. 62/092,053, entitled "Signal Field Structure for High Efficiency WiFi," filed on Dec. 15, 2014;

U.S. Provisional Patent Application No. 62/102,554, entitled "Signal Field Structure for High Efficiency WiFi," filed on Jan. 12, 2015;

U.S. Provisional Patent Application No. 62/105,459, entitled "Signal Field Structure for High Efficiency WiFi," filed on Jan. 20, 2015;

U.S. Provisional Patent Application No. 62/112,524, entitled "Signal Field Structure for High Efficiency WiFi," filed on Feb. 5, 2015;

U.S. Provisional Patent Application No. 62/112,976, entitled "Signal Field Structure for High Efficiency WiFi," filed on Feb. 6, 2015;

U.S. Provisional Patent Application No. 62/156,059, entitled "Signal Field Structure for High Efficiency WiFi," filed on May 1, 2015;

U.S. Provisional Patent Application No. 62/191,658, entitled "Signal Field Structure for High Efficiency WiFi," filed on Jul. 13, 2015; and U.S. Provisional Patent Application No. 62/222,566, entitled "Signal Field Structure for High Efficiency WiFi," filed on Sep. 23, 2015.

The disclosures of all of the patent applications referenced above are hereby incorporated by reference herein in their entireties.

FIELD OF THE DISCLOSURE

The present disclosure relates generally to communication networks and, more particularly, to wireless local area networks that utilize orthogonal frequency division multiplexing (OFDM).

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method includes: generating, at a communication device, a physical layer (PHY) preamble of a multi-user (MU) PHY data unit. Generating the PHY preamble includes: generating a first signal field, wherein the first signal field is generated to include formatting information for a second signal field to be included in the PHY preamble, and generating the second signal field according to the formatting information in the first signal field. The second signal field is generated to include: a common field that includes a value, selected from a codebook, that indicates i) an allocation of frequency resources to one or more resource units, wherein each resource unit corresponds to a respective block of consecutive orthogonal frequency division multiplexing (OFDM) tones, and ii) a respective number of receiving devices assigned to each resource unit, and a plurality of user-specific fields that indicate an allocation of the one or more resource units to the multiple receiving devices, wherein each user-specific field corresponds to a respective receiving device and includes i) an identifier of the respective receiving device, and ii) an indication of which one or more spatial streams are allocated to the respective receiving device. The method also includes: generating, at the communication device, a data portion of the MU PHY data unit to include data for the multiple receiving devices, wherein the data portion is generated according to i) the value, selected from the codebook, in the common field, and ii) the allocation of the one or more resource units to the multiple receiving devices indicated by the plurality of user-specific fields; and transmitting, by the communication device, the MU PHY data unit via the communication channel.

In another embodiment, an apparatus comprises a network interface device having one or more integrated circuit (IC) devices. The one or more IC devices are configured to: generate a physical layer (PHY) preamble of a multi-user (MU) PHY data unit, including: generating a first signal field, wherein the first signal field is generated to include formatting information for a second signal field to be included in the PHY preamble, and generating the second signal field according to the formatting information in the first signal field. The second signal field is generated to include: a common field that includes a value, selected from a codebook, that indicates i) an allocation of frequency resources to one or more resource units, wherein each resource unit corresponds to a respective block of consecutive orthogonal frequency division multiplexing (OFDM) tones, and ii) a respective number of receiving devices assigned to each resource unit, and a plurality of user-specific fields that indicate an allocation of the one or more resource units to the multiple receiving devices, wherein each user-specific field corresponds to a respective receiving device and includes i) an identifier of the respective receiving device, and ii) an indication of which one or more spatial streams are allocated to the respective receiving device. The one or more IC devices are further configured to: generate a data portion of the MU PHY data unit to include data for the multiple receiving devices, wherein the data portion is generated according to i) the value, selected from the codebook, in the common field, and ii) the allocation of the one or more resource units to the multiple receiving devices indicated by the plurality of user-specific fields. The one or more IC devices are further configured to: transmit the MU PHY data unit via the communication channel.

BRIEF DESCRIPTION OF THE DRAWINGS

FIG. 11A is a diagram of a resource allocation configuration element included in an OFDMA information element, according another embodiment;

FIG. 11B is a diagram of a resource allocation configuration subfield included in an OFDMA information element, according to another embodiment;

FIG. 13 is a diagram of an example resource allocation configuration element, according to an embodiment;

FIG. 17A is a diagram of a resource allocation configuration subfield included in an OFDMA information element of a downlink data unit that triggers uplink transmission, according to an embodiment;

FIG. 17B is a diagram of a resource allocation configuration subfield included in an OFDMA information element of a downlink data unit that triggers uplink transmission, according to another embodiment;

FIG. 19 is a diagram of a resource allocation configuration subfield included in an OFDMA information element of a downlink data unit that triggers uplink transmission, according to an embodiment;

DETAILED DESCRIPTION

Figure 1:
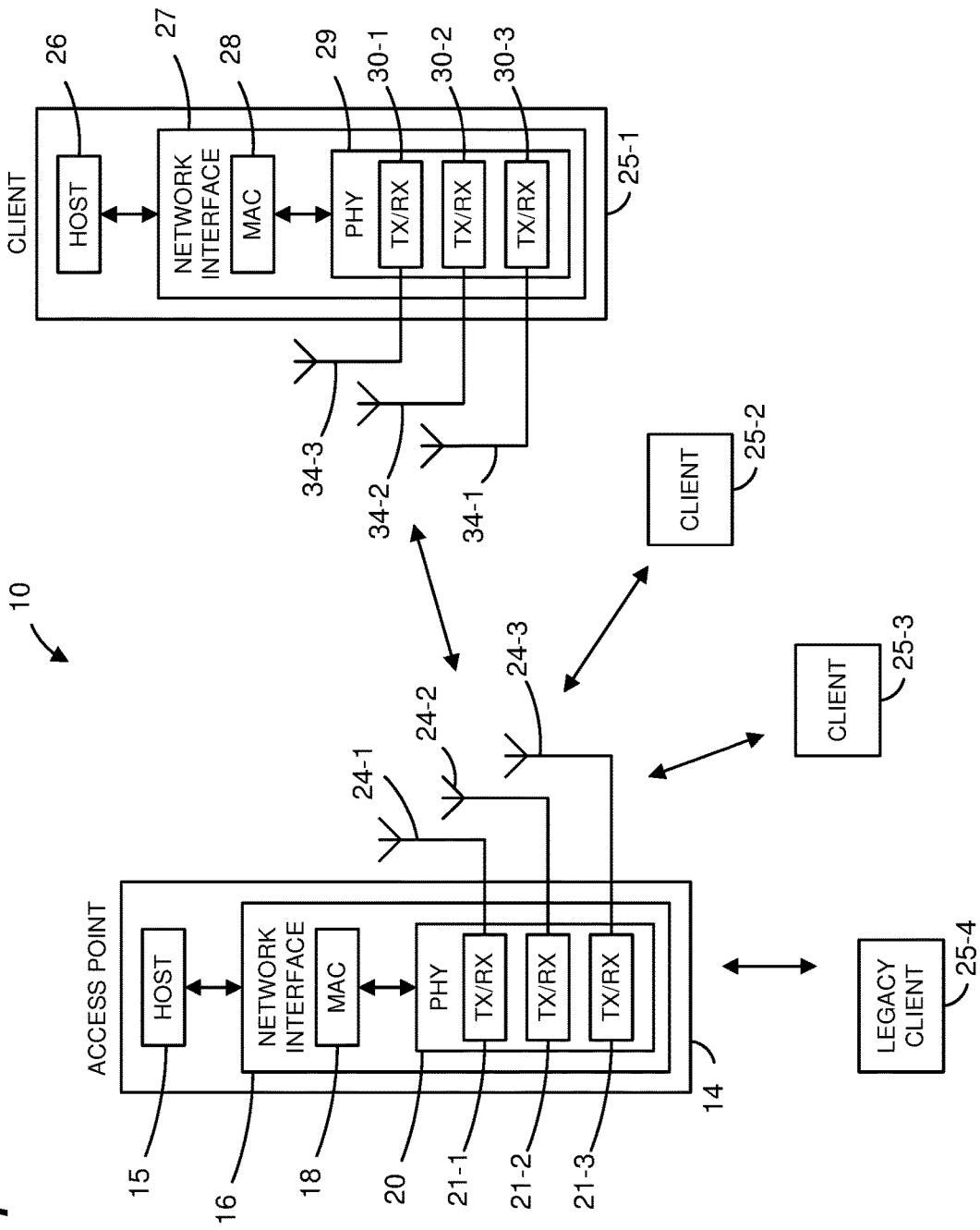
FIG. 1 is a block diagram of an example wireless local area network (WLAN), according to an embodiment.

In embodiments described below, a wireless network device such as an access point (AP) of a wireless local area network (WLAN) transmits data streams to one or more client stations. The AP is configured to operate with client stations according to at least a first communication protocol. The first communication protocol is sometimes referred herein as "high efficiency WiFi," "HEW" communication protocol, "HE" communication protocol, or IEEE 802.11ax communication protocol. In an embodiment, the first communication protocol supports orthogonal frequency division (OFDM) communication in both downlink direction from the AP to one or more client station and uplink direction from one or more client stations to the AP. In an embodiment, the first communication protocol supports a single user (SU) mode, in which the AP transmits a data unit to one client station, or receives a data unit from one client station, at any given time. The first communication protocol also supports one or more multi-user (MU) modes in which the AP transmits multiple independent data streams simultaneously to multiple client stations, or receives independent data streams simultaneously transmitted by multiple client stations, in some embodiments. Multi-user transmission to, or by, multiple client stations is performed using MU multiple input multiple output (MU-MIMO) transmission in which respective spatial streams are used for transmission to, or by, respective ones of the multiple client stations and/or using orthogonal frequency division multiple access (OFDMA) transmission in which respective frequency sub-channels of a communication channel are used for simultaneous transmission to, or by, respective ones of multiple client stations, in various embodiments.

In various embodiments, a data unit transmitted in the downlink direction from the AP to one or more client stations 25 ("DL data unit"), or a data unit transmitted in the uplink direction from a client station to the AP ("UL data unit"), includes one or more signal fields that include formatting information needed at the receiving device to properly receive and decode the data unit. In an embodiment, presence or absence of one or more signal fields in a data unit and/or particular information included in one or more signal fields in a data unit depends on the mode of transmission of the data unit. For example, one or more signal fields that are included in a data unit transmitted in the downlink direction are omitted from a data unit that is transmitted in the uplink direction, in an embodiment. Additionally or alternatively, information included in one or more signal fields in a data unit transmitted in the downlink direction is different from the information included in corresponding one or more signal fields in a data unit transmitted in the uplink direction, in an embodiment. As another example, information included in one or more signal fields in a single-user data unit is different from information included in corresponding one or more signal fields in a multi-user data unit, in an embodiment.

FIG. 1 is a block diagram of an example wireless local area network (WLAN) 10, according to an embodiment. The WLAN 10 supports downlink (DL) and uplink (UL) multiuser (MU) multiple-input and multiple-output (MIMO) communication between an access point (AP) and a plurality of client stations. Additionally, the WLAN 10 supports DL and UL single-user (SU) communication between the AP and each of a plurality of client stations. The WLAN 10 includes an AP 14, and the AP 14, in turn, includes a host processor 15 coupled to a network interface device 16. The network interface device 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In an embodiment, the MAC processing unit 18 and the PHY processing unit 20 are configured to operate according to the first communication protocol (e.g., HE communication protocol). In an embodiment, the network interface device 16 includes one or more integrated circuit (IC) devices. For example, at least some of the functionality of the MAC processing unit 18 and at least some of the functionality of the PHY processing unit 20 are implemented on a single IC device, according to an embodiment. As another example, at least some of the functionality of the MAC processing unit 18 is implemented on a first IC device, and at least some of the functionality of the PHY processing unit 20 is implemented on a second IC device, according to an embodiment.

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to a legacy communication protocol (referred to herein as a "legacy client station").

The client station 25-1 includes a host processor 26 coupled to a network interface device 27. The network interface device 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In an embodiment, the MAC processing unit 28 and the PHY processing unit 29 are configured to operate according to the first communication protocol (e.g., HE communication protocol). In an embodiment, the network interface device 27 includes one or more IC devices. For example, at least some of the functionality of the MAC processing unit 28 and at least some of the functionality of the PHY processing unit 29 are implemented on a single IC device, according to an embodiment. As another example, at least some of the functionality of the MAC processing unit 28 is implemented on a first IC device, and at least some of the functionality of the PHY processing unit 29 is implemented on a second IC device, according to an embodiment.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to a legacy communication protocol.

In an embodiment, one or both of the client stations 25-2 and 25-3, has a structure the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the first communication protocol and having formats described herein. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is configured to process received data units conforming to the first communication protocol and having formats described herein and to determine that such data units conform to the first communication protocol, according to various embodiments.

In various embodiments, the PHY processing unit 29 of the client device 25-1 is configured to generate data units conforming to the first communication protocol and having formats described herein. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol and having formats described hereinafter and to determine that such data units conform to the first communication protocol, according to various embodiments.

In an embodiment, when operating in single-user mode, the AP 14 transmits a data unit to a single client station 25 (DL SU transmission), or receives a data unit transmitted by a single client station 25 (UL SU transmission), without simultaneous transmission to, or by, any other client station 25. When operating in multi-user mode, the AP 14 transmits a data unit that includes multiple data streams for multiple client stations 25 (DL MU transmission), or receives data units simultaneously transmitted by multiple client stations 25 (UL MU transmission), in an embodiment. For example, in multi-user mode, a data unit transmitted by the AP includes multiple data streams simultaneously transmitted by the AP 14 to respective client stations 25 using respective spatial streams allocated for simultaneous transmission to the respective client stations 25 and/or using respective sets of OFDM tones corresponding to respective frequency sub-channels allocated for simultaneous transmission to the respective client stations.

Figure 2:
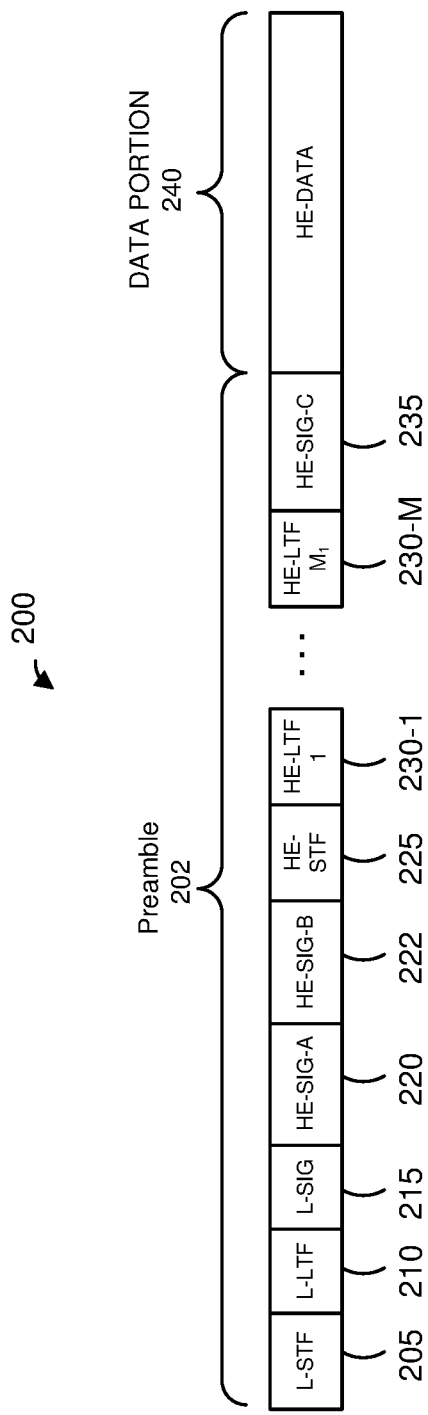
FIG. 2 is a diagrams of a physical layer (PHY) data unit, according an embodiment.

FIG. 2 is a diagram of a physical layer (PHY) data unit 200 that the AP 14 is configured to transmit to one or more client stations 25 (e.g., the client stations 25-1), according to an embodiment. In an embodiment, one or more client stations 25 (e.g., the client stations 25-1) are also configured to transmit data units the same as or similar to the data unit 200 to the AP 14. The data unit 200 conforms to the HE communication protocol and occupies a 20 MHz bandwidth. Data units similar to the data unit 200 occupy other suitable bandwidth such as 40 MHz, 80 MHz, 160 MHz, 320 MHz, 640 MHz, for example, or other suitable bandwidths, in other embodiments. The data unit 200 is suitable for "mixed mode" situations, i.e. when the WLAN 10 includes a client station (e.g., the legacy client station 24-4) that conforms to a legacy communication protocol, but not the first communication protocol. The data unit 200 is utilized in other situations as well, in some embodiments.

In various embodiments and/or scenarios, the data unit 200 is a downlink (DL) orthogonal frequency division multiple access (OFDMA) unit in which independent data streams are transmitted to multiple client stations 25 using respective sets of OFDM tones and, in some cases respective spatial streams, allocated to the client stations 25. Similarly, in various embodiments and/or scenarios, the data unit 200 is an uplink (UL) OFDMA data unit transmitted by a particular client station 25 as part of an OFDMA uplink transmission by multiple client stations 25, wherein each of the multiple client stations 25 transmits data using a set of OFDM tones and, in some cases, respective one or more spatial streams, allocated to the client station 25. For example, in an embodiment, available OFDM tones (e.g., OFDM tones that are not used as direct current (DC) tones and/or guard tones) are partitioned into multiple resource units (RUs), and each of the multiple RUs is allocated to one or more client stations 25 for transmission of data to, or by, the one or more of the client stations 25. In an embodiment, allocation of OFDM tones is performed using basic resource unit blocks defined by the first communication protocol. A basic resource unit block is sometimes referred to herein as simply a "basic resource unit." For example, a basic resource unit includes K OFDM tones, wherein K is an integer greater than zero, in an embodiment. In an embodiment, each allocated resource unit includes one or more K-OFDM tone basic resource units. As just an example, K=26, in an embodiment. Accordingly, a basic resource unit includes 26 OFDM tones, in this embodiment. A resource unit allocated to a client station 25, or allocated to multiple client stations 25, includes a number of OFDM tones that is an integer multiple of 26 OFDM tones, such as 26 OFDM tones, 52 OFDM tones, 78 OFDM tones, etc., in this embodiment. In another embodiment, K is any suitable integer other than 26, and a basic resource unit includes a corresponding number of OFDM tones other than 26.

The data unit 200 includes a preamble including a legacy short training field (L-STF) 205, a legacy long training field (L-LTF) 210, a legacy signal field (L-SIG) 215, a first HE signal field (HE-SIG-A) 220, a second HE signal field (HE-SIG-B) 222, an HE short training field (HE-STF) 225, M HE long training fields (HE-LTFs) 230, where M is an integer, and a third HE signal field (HE-SIG-C) 235. In some embodiments and/or scenarios, the data unit 200 also includes a data portion 240. In some embodiments and/or scenarios, the data unit 200 omits the data portion 240.

In some embodiments and/or scenarios, the preamble 202 omits one or more of the fields 205-235. For example, the preamble 202 omits one or more of the HE-SIG-A 220, the HE-SIG-B 222 and the HE-SIG-C 235, in an embodiment. In some embodiments, the preamble 202 includes additional fields not illustrated in FIG. 2.

Each of the L-STF 205, the L-LTF 210, the L-SIG 215, the HE-SIG-A 220, the HE-SIG-B 222, the HE-STF 225, the M HE-LTFs 230, and the HE-SIG-C 235 comprises one or more OFDM symbols. The HE-SIG-A 220, the HE-SIG-B 222 and the HE-SIG-C 235 is each individually encoded to generate the respective number of OFDM symbols, in an embodiment. As merely an example, in an embodiment, the HE-SIG-A 220 comprises two OFDM symbols, and each of the HE-SIG-B 222 and the HE-SIG-C 235 comprises one OFDM symbol. As merely another example, in another embodiment, the HE-SIG-A 220 comprises one OFDM symbol, the HE-SIG-B comprises two OFDM symbols, and the HE-SIG-C comprises one OFDM symbol. As yet another example, in an embodiment, the HE-SIG-A 220 comprises two OFDM symbols, the HE-SIG-B 222 comprises a variable number of OFDM symbols, and the HE-SIG-C 235 is omitted. In an embodiment in which the HE-SIG-B 222 comprises a variable number of OFDM symbols, the particular number of HE-SIG-B 222 OFDM symbols in the data unit 200 is indicated in the HE-SIG-A 220.

In the embodiment of FIG. 2, the data unit 200 includes one of each of the L-STF 205, the L-LTF 210, the L-SIG 215, the HE-SIG-A 220. In other embodiments in which a data unit similar to the data unit 200 occupies a cumulative bandwidth other than 20 MHz, each of the L-STF 205, the L-LTF 210, the L-SIG 215 and HE-SIG-A 220 is repeated over a corresponding number of 20 MHz sub-bands of the whole bandwidth of the data unit, in an embodiment. For example, in an embodiment, the data unit occupies an 80 MHz bandwidth and, accordingly, includes four of each of the L-STF 205, the L-LTF 210, the L-SIG 215, the HE-SIG-A 220. In an embodiment in which a data unit similar to the data unit 200 occupies a cumulative bandwidth other than 20 MHz, the HE-SIG-B is repeated over a corresponding number of 20 MHz sub-bands of the whole bandwidth of the data unit. In another embodiment in which a data unit similar to the data unit 200 occupies a cumulative bandwidth other than 20 MHz, the HE-SIG-B 222 includes different channel-specific portions corresponding to different 20 MHz sub-bands of the whole bandwidth of the data unit, and the different channel specific portions are transmitted in parallel in the corresponding 20 MHz sub-bands of the whole bandwidth of the data unit 200.

In some embodiments, the modulation of different 20 MHz sub-bands signals is rotated by different angles. For example, in one embodiment, all OFDM tones within a first subband are rotated 0-degrees, all OFDM tones within a second subband is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced peak to average power ratio (PAPR) of OFDM symbols in the data unit 200, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the HE-SIG-B and the HE data portion occupy the corresponding whole bandwidth of the data unit.

In an embodiment, each of the HE-SIG-A 220, the HE-SIG-B 222 and the HE-SIG-C 235 generally carries information about the format of the data unit 200, such as information needed to properly decode at least a portion of the data unit 200, in an embodiment. In an embodiment in which the data unit 200 is a multi-user data unit, HE-SIG-A 220 carries information commonly needed by multiple intended receivers of the data unit 200. In some embodiments, HE-SIG-A 220 additionally includes information for client stations 25 that are not intended receivers of the data unit 200, such as information needed for medium protection from the client stations 25 that are not receivers of the data unit 200. On the other hand, HE-SIG-B 222 and HE-SIG-C 235 carry user-specific information individually needed by each client station 25 that is an intended recipient of the data unit 200, in an embodiment. In an embodiment, HE-SIG-A 220 includes information needed to properly decode HE-SIG-B 222, and HE-SIG-B 222 includes information needed to properly decode data streams in the data portion 240 of the data unit 200. In some embodiments and/or scenarios, however, HE-SIG-A field 220 includes at least some of the information needed to decode the data portion 240, and HE-SIG-B 222 is omitted from the data unit 200 in at least some such embodiments. In at least some embodiments and scenarios in which the AP 14 is the intended recipient of the data unit 200 (i.e., when the data unit 200 is an uplink data unit), information needed to properly decode the data portion of the data unit 200 is known a priori to the intended recipient of the data unit 200 and need not be included in the preamble of the data unit 200. In some such embodiments, the HE-SIG-B 222 and HE-SIG-C 325 are both omitted from the data unit 200.

In some embodiments, specific information included in the HE-SIG-A 220 and/or in the HE-SIG-B 222 depends on the mode of transmission of the data unit 200. For example, information included in the HE-SIG-A 220 and/or information included in the HE-SIG-B 222 depends on mode of transmission of the data unit 200, in an embodiment. In an embodiment, different information is included in the HE-SIG-A 220 when the data unit 200 is a downlink data unit as compared to information included in the HE-SIG-A 220 when the data unit 200 is an uplink data unit. Additionally or alternatively, different information is included in the HE-SIG-A 220 when the data unit 200 is a multi-user data unit as compared to information included in the HE-SIG-A 220 when the data unit 200 is a single-user data unit, in an embodiment. In another embodiment, different information is included in the HE-SIG-B 222 when the data unit 200 is a downlink data unit as compared to the information is included in the HE-SIG-B 222 when the data unit 200 is an uplink data unit.

Figure 3A:
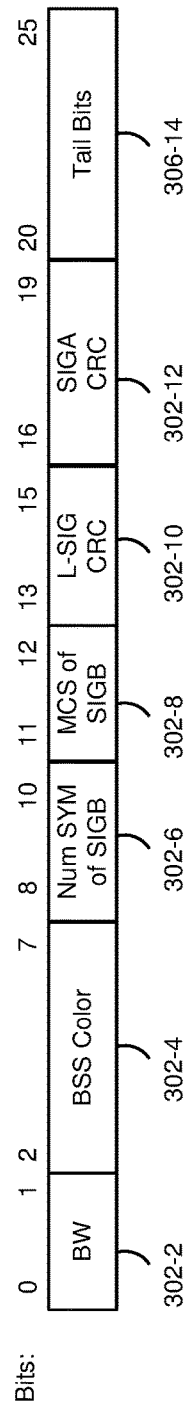
FIGS. 3A-3B are diagrams of example signal fields, according to embodiments.
Figure 3B:
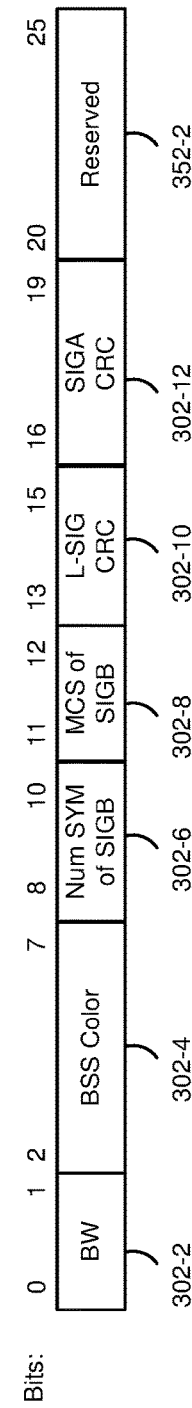

FIGS. 3A-3B are diagrams of example signal fields 300, 350, according to embodiments. The signal fields 300, 350 correspond to the HE-SIG-A 220 of the data unit 200 of FIG. 2, in various embodiments. For ease of explanation, the signal fields 300, 350 are described with reference to the data unit 200 of FIG. 2. However, the signal fields 300, 350 are included in suitable data units different from the data unit 200 of FIG. 2, in some embodiments.

Referring to FIG. 3A, an example HE-SIG-A 300 includes a plurality of subfields 302. Bit allocation for the subfields 302, according to an example embodiment, are illustrated above the subfields 302 in FIG. 3A. Other bit allocations are used for the subfields 302, in other embodiments. The subfields 302 include a bandwidth (BW) subfield 302-2, a basic service set (BSS) color subfield 302-4, a number of SIG-B OFDM symbols subfield 302-6, a SIG-B modulation and coding (MCS) subfield 302-8, an L-SIG cyclic redundancy check (CRC) subfield 302-10, an HE-SIG-A CRC subfield 302-12, and tail bits 302-14. The BW subfield 302-2 includes an indication of a bandwidth of the data unit 200, in an embodiment. The BSS color subfield 302-4 includes an identifier of a BSS in which the data unit 200 is being transmitted, in an embodiment. The number of SIG-B OFDM symbols subfield 302-6 indicates the number of OFDM symbols in the HE-SIB-B 222 that follows the HE-SIG-A 300 in the data unit 200, in an embodiment. The SIB-B MCS subfield 302-8 indicates a modulation and coding scheme used for the HE-SIB-B 222 that follows the HE-SIG-A 220 in the data unit 200, in an embodiment.

With continued reference to FIG. 3A, the CRC bits 302-10 include CRC bits used to check correctness of the L-SIG field 215 at a receiving device, for example to provide protection for the L-SIG field 215 in addition to, or instead of, protection provided by a parity bit included in the L-SIG field 215. HE-SIG-A CRC bits 302-12 include CRC bits used to check correctness of the various subfields 302 at a receiving device, in an embodiment. Tail bits 306-14 include tail bits required to terminate the trellis of the convolution coder for proper operation.

In some embodiments, the signal field 300 omits some of the subfields 302 illustrated in FIG. 3A. For example, the signal field 300 omits the BSS color subfield 302-2, in an embodiment. As just another example, the signal field 300 omits the L-SIG CRC subfield 302-5, in an embodiment. In some embodiments, the signal field 300 includes additional subfields 302 not illustrated in in FIG. 3A.

Referring now to FIG. 3B, an example signal field 350 is generally the same as the signals field 300 of FIG. 3A and includes many of the same subfields as the signal field 300 of FIG. 3A. The signal field 350 is used encoded using a tail biting convolutional coding (TBCC) technique. In an embodiment in which TBCC is used to encode the signal field 350, initial bits (e.g., first 6 bits) of the signal field 350, rather than tail bits, are used to initialize the decoder at the receiving device. Accordingly, unlike the signal field 300, the signal field 350 omits tail bits. Instead of the tail bits 306-14, the signal field 350 includes bits 352-2 that are reserved or are used for transmitting additional information in the signal field 350, in various embodiments.

In an embodiment in which tail biting is used with the signal field 350, repetition of the bits of the signal field 350 is used to improve reception of the signal field 350 to compensate for performance lost by omitting tail bits from the signal field 350. For example, in an embodiment, the preamble 204 of the data unit 200 includes the signal field 350 and a copy of the signal field 350, with a tone shift introduced into the copy of the signal field 350 to provide frequency diversity, in an embodiment. A receiving device suitably combines the two received signal fields 350, for example to increase reliability of decoding information in the signal field 350, in an embodiment.

In some embodiments, the format of the HE-SIG-A 220 depends on the mode of transmission of the data unit 200. For example, a regular format HE-SIG-A 220 is used when the data unit 200 is a downlink transmission or a non-triggered uplink transmission, while a short format HE-SIG-A 220 is used when the data unit 200 is a triggered uplink transmission. The regular format HE-SIB-A 220 includes indications of various transmission parameters used for transmission of HE-SIG-B 222 of the data unit 200, in an embodiment. On the other hand, the short format HE-SIG-A 220 includes an indication of a duration of the data unit 200, or an indication of a duration of the TxOP during which the data unit 200 is transmitted, and omits indications of various transmission parameters used for transmission of HE-SIG-B 222, in an embodiment. In an embodiment, when the short format is used with the HE-SIG-A 220, the data unit 200 omits the HE-SIG-B 222 because information generally included in the HE-SIB-B 222 in scenarios in which regular format HE-SIG-A 220 is utilized is known to the receiving device (e.g., the AP 14) a priori in scenarios in which short HE-SIG-A 220 is used such as in triggered uplink mode of transmission, in an embodiment.

Figure 3C:
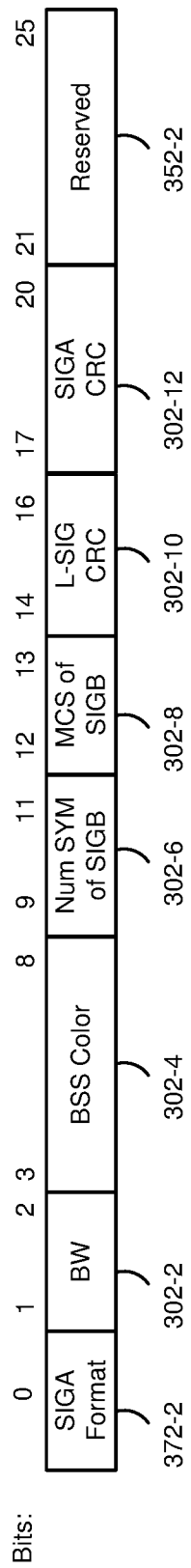
FIGS. 3C-3D are diagrams of signal fields corresponding to different modes of transmission, according to an embodiment.
Figure 3D:
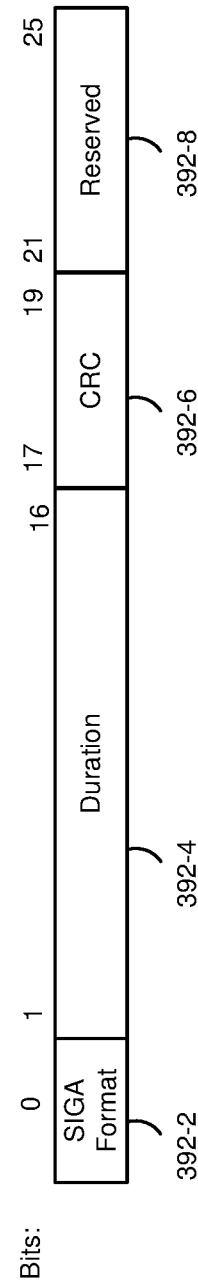

FIGS. 3C-3D are diagrams of signal fields 370, 390 included in a data unit, such as the data unit 200, in different modes of transmission of the data unit, according to an embodiment. The signal fields 370, 390 correspond to HE-SIG-A 220 of the data unit 200 of FIG. 2, in different modes of transmission the data unit 200, in an embodiment. For ease of explanation, the signal fields 370, 390 are described with reference to the data unit 200 of FIG. 2. However, the signal fields 370, 390 are included in suitable data units different from the data unit 200 of FIG. 2, in some embodiments. In the illustrated embodiment, tail biting is used with the signal fields 370, 390. Accordingly, tail bits are omitted from the signal fields 370, 390, in the illustrated embodiment. In another embodiment, tail bits are included in one or both of the signal fields 370, 390.

Referring to FIG. 3C, a signal field 370 corresponds to HE-SIG-A 220 of the data unit 200 when the data unit 200 is transmitted in downlink multi-user format, according to an embodiment. In another embodiment, the signal field 370 corresponds to HE-SIG-A 220 of the data unit 200 when the data unit 200 is transmitted in one or more of (i) downlink single user mode, (ii) downlink multi-user mode, and (iii) non-triggered uplink mode. The signal field 370 is generally the same as the signal field 350 of FIG. 3B, except that the signal field 370 includes a format subfield 372-2 that includes an indication of the format of the signal field 370. For example, the format subfield 372-2 is set to indicate that the signal field 370 is a "regular" format HE-SIG-A field that corresponds to a downlink mode of transmission of the data unit 200, in the illustrated embodiment. Additionally or alternatively, polarity of modulation of the signal field 370 is used to indicate the mode of transmission of the data unit 200, in some embodiments. The signal field 370 omits the format subfield 372-1, in some such embodiments.

Referring now to FIG. 3D, a signal field 390 corresponds to HE-SIG-A 220 of the data unit 200 when the data unit 200 is transmitted in triggered uplink mode, according to an embodiment. The signal field 390 includes a plurality of subfields 392. Bit allocation for the subfields 392, according to an example embodiment, are illustrated above the subfields 392 in FIG. 3D. Other bit allocations are used for the subfields 392, in other embodiments. The subfields 302 include a format subfield 392-2, a duration subfield 392-4, CRC bits 392-6, and reserved bits 392-8. The format subfield 392-2 includes an indication of the format of the signal field 390. For example, the format subfield 392-2 is set to indicate that the signal field 390 is a "short" format HE-SIG-A field used in a triggered uplink transmission mode, in the illustrated embodiment. Additionally or alternatively, polarity of modulation of the signal field 390 is used to indicate the mode of transmission of the data unit 200, in some embodiments. The signal field 390 omits the format subfield 392-2, in some such embodiments.

The duration subfield 392-4 includes an indication of a duration of the data unit 200, or an indication of a duration of a transmit opportunity (TxOP) during which the data unit 200 is transmitted, in various embodiments. The duration subfield 392-2 is used to indicate the duration to a communication device that is not an intended recipient of the data unit 200 and may be unable to decode a duration indication included in a MAC header of the data unit 200, in an embodiment. The signal field 390 additionally includes CRC bits 392-6, used to check correctness of the various subfields 392 at the receiving device, and reserved bits 392-8, in an embodiment.

Figure 4A:
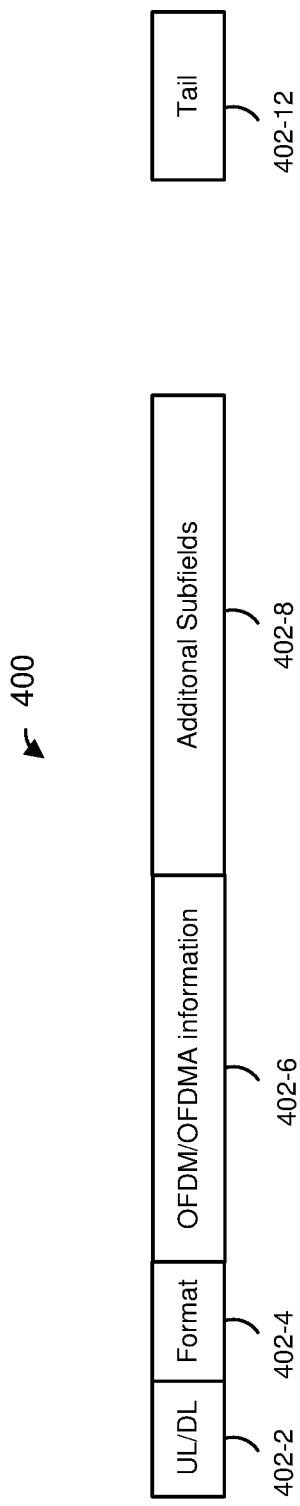
FIG. 4A is a diagram of a signal field, according to an embodiment

FIG. 4A is a diagram of a signal field 400, according to an embodiment. In an embodiment, the signal field 400 corresponds to the HE-SIG-B 222 of the data unit 200 of FIG. 2. For ease of explanation, the signal field 400 is described with reference to the data unit 200 of FIG. 2. However, the signal field 400 is used with data units different from the data unit 200 of FIG. 2, in some embodiments.

The signal field 400 includes a plurality of subfields 402, including an uplink/downlink subfield 402-2, a format subfield 402-4, and an OFDM/OFDMA information subfield 402-6. In an embodiment, the uplink/downlink subfield 402-2 includes an indication to indicate a mode of transmission of the data unit 200. For example, the uplink/downlink subfield 402-2 is set to a logic zero (0) to indicate that the data unit 200 is a downlink transmission or a non-triggered uplink transmission, and is set to a logic one (1) to indicate that the data unit 200 is a triggered uplink transmission, in an embodiment. As another example, the uplink/downlink subfield 402-2 is set to a logic one (1) to indicate that the data unit 200 is a downlink transmission or a non-triggered uplink transmission, and is set to a logic zero (0) to indicate that the data unit 200 is a triggered uplink transmission, in another embodiment.

The format subfield 402-4 indicates whether the data unit 200 is an OFDM or an OFDMA, in an embodiment. The OFDM/OFDMA information subfield 402-6 includes OFDM transmission parameters used for transmission of the data unit 200 or OFDMA transmission parameters used for transmission of the data unit 200, depending on the format indicated by the format subfield 402-4, in an embodiment. The signal field 400 includes additional subfields 402-8, in some embodiments. Some example additional subfields 402-8 included in the signal field 400 are described below with respect to FIG. 4B. CRC bits 402-10 include bits used to check correctness of the various subfields of the signal field 400 at a receiving device, in an embodiment. Tail bits 402-12 include tail bits required to terminate the trellis of the convolution coder for proper operation, in an embodiment.

Figure 4B:
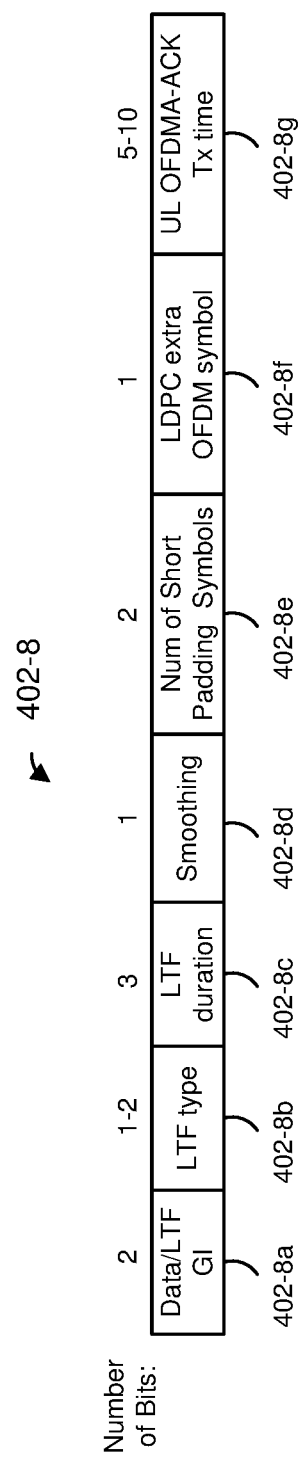
FIG. 4B is a diagram of a set of subfields of a signal field, according to an embodiment.

The additional subfields 402-8 include additional formatting information for the data unit 200, in an embodiment. FIG. 4B is a diagram of the additional subfields 402-8, according to an embodiment. The number of bits allocated to each subfield 402-8, according to an example embodiment, is indicated in FIG. 4B above the corresponding subfield 402-8. Other suitable numbers of bits are allocated to at least some of the subfields 402-8, in other embodiments. The subfields 402-8 include a data/LTF guard interval (GI) subfield 408-2a, an LTF type subfield 402-8b, an LTF duration subfield 402-8c, a smoothing subfield 402-8d, a number of short padding symbols subfield 402-8e, an LDPC extra OFDM symbol subfield 402-8f, and an UL OFDMA acknowledgement (ACK) Tx time subfield 402-8g. The data/LTF GI subfield 402-8a indicates a guard interval used with the LTFs 230 and/or the data portion 240 of the data unit 200. For example, the data/LTF GI subfield 402-8a includes two bits to indicate whether a 0.8 us, a 1.6 us, or another suitable guard interval duration, is being used, in an example embodiment. As another example, in another embodiment, the data/LTF GI subfield 402-8a includes one bit to indicate a change of the guard interval relative to the guard interval used in the signal field 400. For example, in an embodiment, if a 0.8 us guard interval is used with the signal field 400, the guard interval indication bit is set to a logic zero (0) to indicate that the same guard interval (0.8 us) is also used with the long training fields and/or the data portion, or is set to a logic (1) (or vice-versa) to indicate that a pre-determined (e.g., known a priori to a receiver device) shorter guard interval (e.g., 0.4 us) is used with the long training fields and/or the data portion, in an embodiment. As just another example, if a 1.6 us guard interval is used with the signal field 400, the guard interval indication bit is set to a logic zero (0) to indicate that the same guard interval (1.6 us) is also used with the long training fields and/or the data portion, or is set to a logic (1) (or vice-versa) to indicate that a pre-determined (e.g., known a priori to a receiver device) longer guard interval (e.g., 2.4 us) is used with the long training fields and/or the data portion, in an embodiment.

The LTF type subfield 402-8b indicates a mode of OFDM symbol compression (e.g., 1×, 2×, 4×, etc.) used with the LTF fields 230, in an embodiment. In another embodiment, LTF type indication is combined with GI indication, and the LTF type subfield 402-8b is omitted from the additional subfields 402-8. The LTF duration subfield 402-8c indicates a total number of OFDM symbols spun by the LTF fields 230 in the data unit 200, in an embodiment. In an embodiment, the LTF duration subfield 402-8C is included in the signal field 400 or is omitted from the signal field 400 depending on the compression mode used with the LTF fields 230 as indicated by the LTF type subfield 402-8b. For example, the LTF duration subfield 402-8b is omitted from the signal field 400 if LTF fields 230 are uncompressed (1× compression) and if 4x compression is used with the LTF fields 230, and is included in the signal field 400 if a compression other than 1× compression or 4× compression is used with the LTF fields 230, in an embodiment. In another embodiment, the LTF duration subfield 402-8b is included in the signal field 400 regardless of compression mode used with the LTF fields 230. In an embodiment, the LTF duration subfield 402-8c is included in the subfields 402-8 if the data unit 200 is an OFDMA data unit, and is omitted from the subfields 402-8 if the data unit 200 is an OFDM data unit. In another embodiment, criteria used for including or omitting the LTF duration subfield 402-8c in an OFDM data unit are the same as the criteria used for including or omitting the LTF duration subfield 402-8c in an OFDMA data unit. In an embodiment, the LTF duration subfield 402-8c includes, or is replaced by, an LTF alignment indication that indicates whether LTFs in different sub-bands of the data unit 200 are aligned (e.g., end at the same OFDM symbol). The LTF alignment indication is included in the subfields 402-8 when uncompressed OFDM symbols are used with the LTF fields 230, and is omitted when OFDM symbol compression is used with the LTF fields 230, as indicated by the LTF type subfield 402-8c, in an embodiment.

The smoothing subfield 402-8d includes one bit set to a logic one (1) to indicate that smoothing can be used over LTF fields 230 for channel estimation, and interpolation can be used with bandwidths greater than 20 MHz, or set to logic zero (0) to indicate that smoothing cannot be used, or vice versa, in an embodiment. The smoothing subfield 402-8d is included in the subfields 402-8 when uncompressed OFDM symbols are used with the LTF fields 230, and is omitted when OFDM symbol compression is used with the LTF fields 230, as indicated by the LTF type subfield 402-8c, in an embodiment.

The number of short padding symbols subfield 402-8e indicates a number of short, uncompressed, OFDM symbols at the end of the data portion 240, in an embodiment. LTPC extra OFDM symbol subfield 402-8f includes one bit set to a logic one (1) to indicate that the data portion 240 includes extra one or more OFDM symbols added by low-density parity check (LDPC) encoding process, or is set to a logic zero (0) to indicate that no extra OFDM symbols are added as a result of LDPC encoding, or vice versa, in an embodiment. The UL OFDMA ACK Tx time subfield 402-8g indicates a duration of time needed for transmission of one or more acknowledgment frames to acknowledge receipt of the data unit 200, in some embodiments. The UL OFDMA ACK Tx time subfield 402-8g indicates the duration of time in terms of number of OFDM symbols, number of bytes assuming a particular MCS used for transmission of the acknowledgement frames, or in terms of time (e.g., seconds) with a particular signaling granularity, in various embodiments.

In some embodiments, one or more of the subfields 402-8 illustrated in FIG. 4B are omitted from the signal field 400 and/or one or more additional subfields that are not illustrated in FIG. 4B are included on the signal field 400. In some embodiments, if the data unit 200 is an OFDMA data unit, all or some of the subfields 402-8 are included in individual resource allocation configuration subfields included in the OFDM/OFDMA information subfield 402-6. In some embodiments, some or all of the subfields 402-8 are included in some individual resource allocation configuration subfields in the OFDM/OFDMA information subfield 402-6 and are omitted from other individual resource allocation configuration subfields in the OFDM/OFDMA information subfield 402-6. The all or some of the subfields 402-8 that are included in individual resource allocation configuration subfields in the OFDM/OFDMA information subfield 402-6 are omitted from the additional subfields 402-8, in an embodiment.

Figure 5:
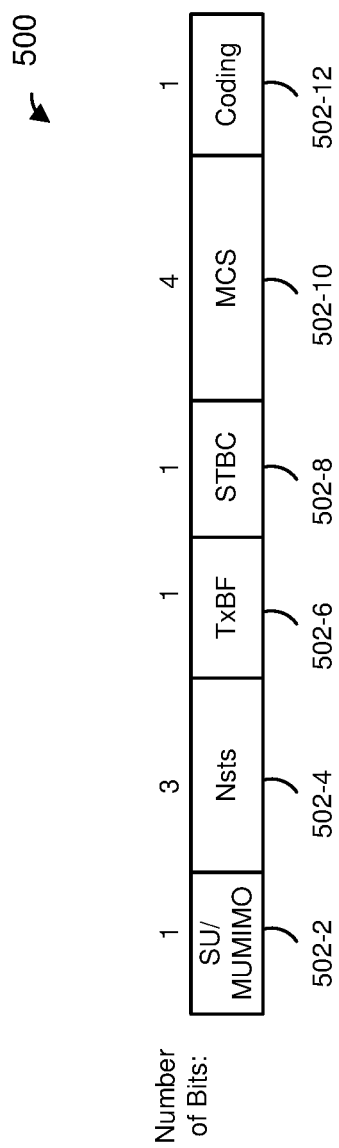
FIG. 5 is a diagram of a single user OFDM information element, according to an embodiment.

FIG. 5 is a diagram of an OFDM information element 500, according to an embodiment. In an embodiment the OFDM information element 500 is included in the OFDM/OFDMA information subfield 402-6 of FIG. 4A. For example, the OFDM information element 500 is included in the OFDM/OFDMA information subfield 402-6 when the format subfield 402-4 indicates OFDM format, in an embodiment. The OFDM information element 500 corresponds to single user mode, and includes transmission parameters used for transmission of data to a single client station 25, in an embodiment.

The OFDM information element 500 includes a plurality of subfields 502. The number of bits allocated to each subfield 502, according to an example embodiment, is indicated in FIG. 5 above the corresponding subfield 502. Other suitable numbers of bits are allocated to at least some of the subfields 502, in other embodiments. The subfields 502 include an SU/MUMIMO subfield 502-2, a number of space time streams (Nsts) subfield 502-4, a transmit beamforming (TxBF) subfield 502-6, a space time block coding (STBC) subfield 502-8, a modulation and coding (MCS) subfield 502-10 and a coding subfield 502-12. The SU/MUMIMO subfield 502-2 includes an indication that the data unit 200 is a single user data unit, in the illustrated embodiment. For example, the SU/MUMIMO subfield 502-2 includes a single bit set to a logic zero (0) to indicate that the data unit 200 is a single-user data unit, in an embodiment. The SU/MUMIMO subfield 502-2 includes a single bit set to a logic one (1) to indicate that the data unit 200 is a single-user data unit, in another embodiment. The Nsts indication 502-4 includes an indication of the number of spatial streams, or the number of space time streams if block coding is being used, used for transmission of data (e.g., in a data portion) in the data unit 200. The TxBF subfield 502-6 includes an indication whether transmit beamforming is used to shape transmission of the data unit. STBC subfield 502-8 includes an indication of whether space time block coding is being used in the data portion of the data unit. MCS subfield 502-10 includes an indication of the modulation and coding scheme being used in the data portion of the data unit. The coding subfield 502-12 includes an indication of a coding type being used, such as whether binary convolutional coding (BCC) or low-density parity check (LDPC) coding is being used for the data portion, in an embodiment.

Figure 6:
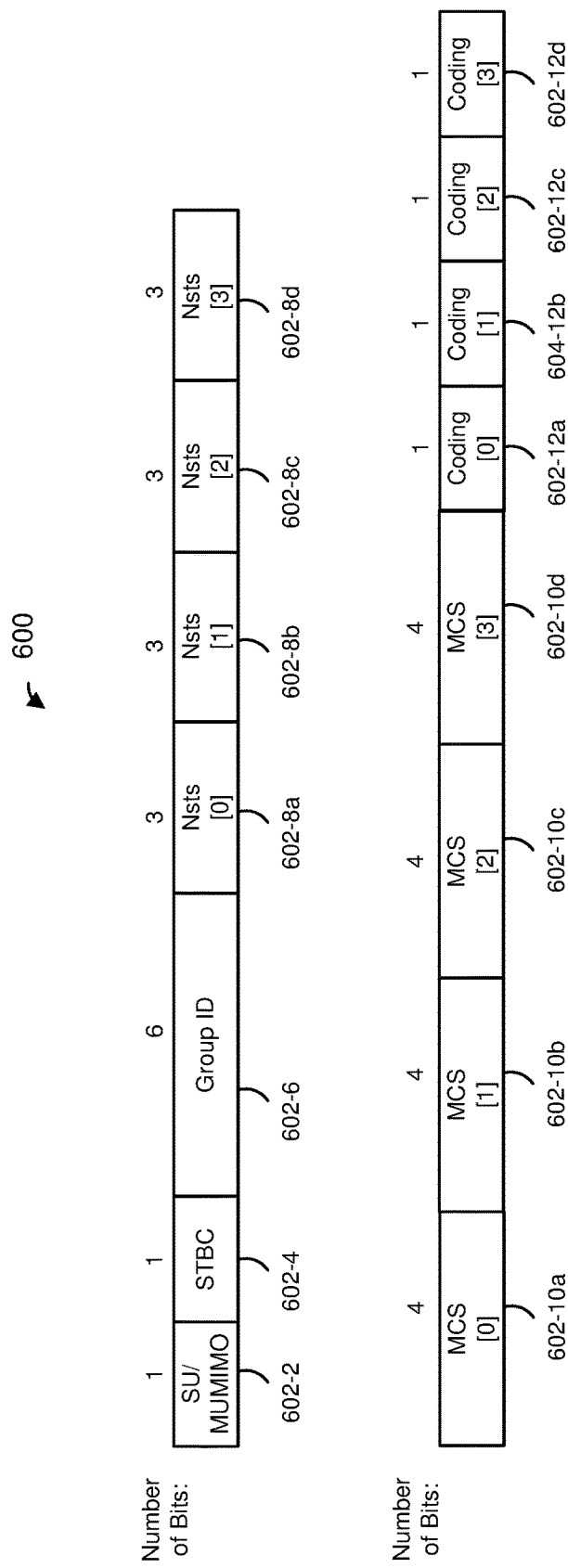
FIG. 6 is a diagram of a multi-user OFDM information element, according to an embodiment.

FIG. 6 is a diagram of a multi-user OFDM information element 600, according to an embodiment. In an embodiment, the OFDM information element 600 is included in the OFDM/OFDMA information subfield 402-6 of FIG. 4A. For example, the OFDM information element 600 is included in the OFDM/OFDMA information element subfield 402-4 when the format subfield 402-6 indicates OFDM format, in an embodiment. The OFDM information element 500 corresponds to multi-user mode, and includes respective transmission parameters used for transmission of data to a multiple client stations 25, in an embodiment. The OFDM information element 600 includes a plurality of subfields 602. The number of bits allocated to each subfield 602, according to an example embodiment, is indicated in FIG. 6 above the corresponding subfield 602. Other suitable numbers of bits are allocated to at least some of the subfields 602 in other embodiments.

The subfields 602 include an SU/MUMIMO subfield 602-2, a space time block coding (STBC) subfield 602-4, a Group Identifier (ID) subfield 602-6, a plurality of Nsts subfields 602-8, a plurality of MCS subfield 602-10, and a plurality of coding subfields 602-12. The SU/MUMIMO subfield 602-1 indicates that the data unit 200 is a multi-user data unit, in the illustrated embodiment. For example, the SU/MUMIMO subfield 602-2 includes a single bit set to a logic one (1) to indicate that the data unit 200 is a single-user data unit, in an embodiment. The SU/MUMIMO subfield 602-2 includes a single bit set to a logic zero (0) to indicate that the data unit 200 is a single-user data unit, in another embodiment. The STBC subfield 602-4 indicates whether space time block coding is being utilized in the data portion of the data unit, in an embodiment. The Group ID subfield 602-6 includes an identification of an MU group to which the data unit 200 is directed. In an embodiment, the Group ID subfield 602-6 indicates an MU group that includes up to four users. In another embodiment, the group ID subfield 602-6 indicates an MU group that includes another suitable number (e.g., 2, 3, 5, 6, 7, 8, etc.) of users. The Nsts subfields 602-8 include four Nsts subfields 602-8a through 602-8d to indicate respective numbers of spatial or space time streams for each of a maximum of four users included in the MU group indicated by the Group ID subfields 602-6, in the illustrated embodiment. Similarly, the MCS subfields 602-10 include four subfields 602-10a through 602-10d to indicate respective modulation and coding schemes used for each of a maximum of four users included in the MU group indicated by the Group ID subfields 602-6, and the coding subfields 602-12 include four coding subfields 602-12a through 602-12d for indicating a respective coding type (e.g., BCC or LDPC) used for each of a maximum of four users included in the MU group indicated by the group ID subfields 602-6, in the illustrated embodiment. In other embodiments, the OFDM information element 600 includes other suitable numbers of Nsts subfields 602-8, MCS subfields 602-10 and coding subfields 602-12 corresponding to other suitable numbers of users included in the MU group indicated by the group ID subfields 602-6.

Figure 7:
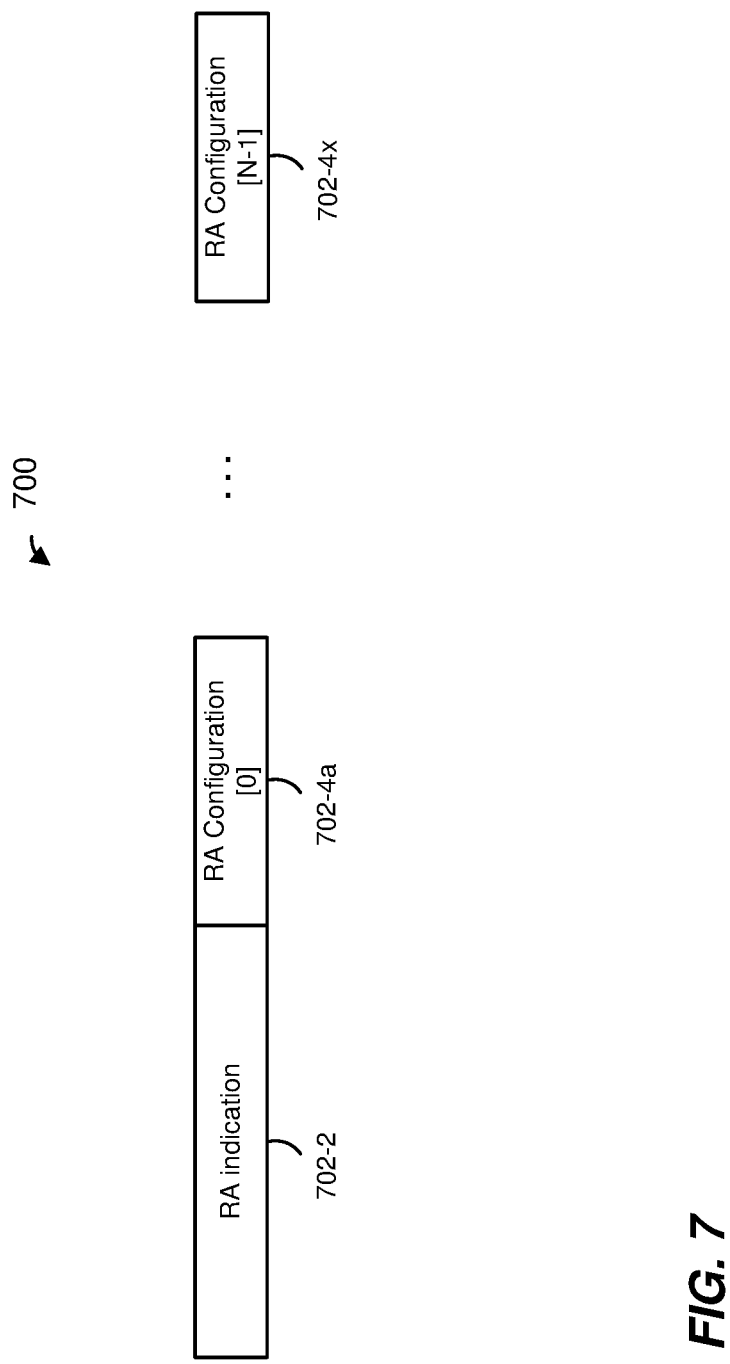
FIG. 7 is a diagram of an OFDMA information element, according to an embodiment.

FIG. 7 is a diagram of an OFDMA information element 700, according to an embodiment. In an embodiment the OFDMA information element 700 is included in the OFDM/OFDMA information subfield 402-6 of FIG. 4A. For example, the OFDMA information element 700 in included in the OFDM/OFDMA information subfield 402-6 when the format subfield 402-4 indicates OFDMA format, in an embodiment. The OFDMA information element 700 includes a plurality of subfields 702. The subfields 702 include a resource allocation (RA) subfield 702-2 and a plurality of RA configuration subfields 702-4. In an embodiment, the resource allocation subfield 702-2 indicates a mapping between subcarrier blocks (e.g., basic resource units, as described above) and resource units in the data unit 200. For example, the RA subfield 702-2 includes a bitmap with bits corresponding to basic resource units in the data unit 200, wherein the respective bits indicate allocation of the basic resource units to particular resource units in the data unit 200. In another embodiment, the RA subfield 702-2 includes a codebook, other than a bitmap, that indicates a mapping a mapping between basic resource units and resource units. Each resource unit is allocated to transmission of data to a single client station 25, as is the case with a single user resource unit, or is allocated to transmission of data to an MU-MIMO group of client stations 25, as is the case with a multi-user resource unit, in an embodiment. The RA configuration subfields 702-4 correspond to particular ones of the resource units, and indicate respective transmission parameters used for the corresponding ones of the resource units in the data unit 200, in an embodiment. Accordingly, the number of RA configuration subfields 702-4 in the OFDMA information element 700 corresponds to the number of allocated resource units in the data unit 200 as indicated by the RA subfield 702-2, in an embodiment. Each RA configuration subfield 702-4 includes transmission parameters used for a single client station 25 or used for respective client stations 25 in an MU-MIMO group of client stations 25, in an embodiment.

With continued reference to FIG. 7, in an embodiment, the RA subfield 702-2 includes a variable number of bits, wherein the particular number of bits in the RA subfield 792-2 depends on the bandwidth of the data unit 200. For example, more bits are used to indicate resource allocation in a data unit with a relatively wider bandwidth as compared to the number of bits used to indicate resource allocation in a data unit with a relatively narrower bandwidth, in an embodiment. In an embodiment, the RA configuration subfields 702-4 include variable numbers of bits, wherein the particular number of bits in an RA configuration subfield 702-4 depends, for example, on whether the RA configuration subfield 702-4 corresponds to a single user resource unit or a multiple using resource unit.

Figure 8:
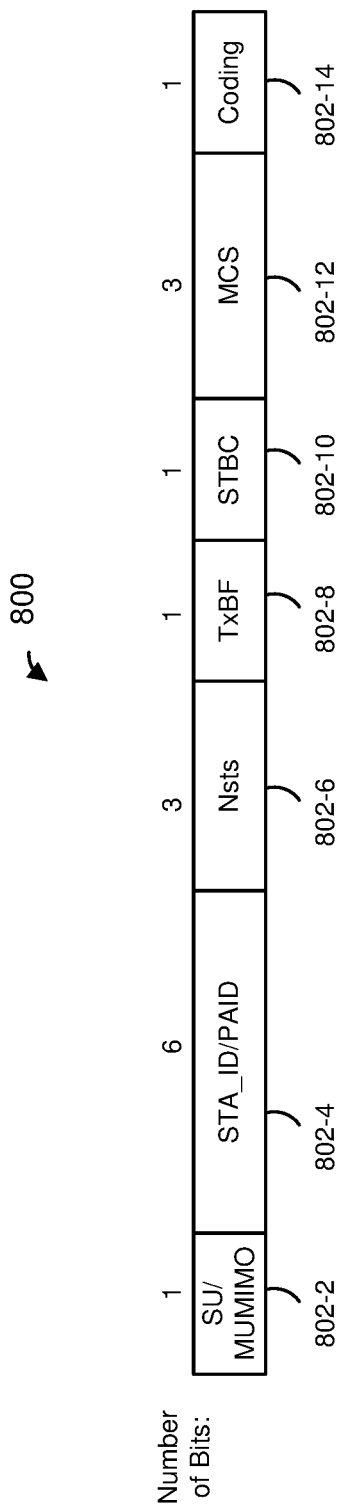
FIG. 8 is a diagram of a resource allocation configuration subfield included in an OFDMA information element, according to an embodiment.

FIG. 8 is a diagram of a resource allocation configuration subfield 800 included in an OFDMA information element, according to an embodiment. The resource allocation configuration subfield 800 corresponds to a single user resource unit, and includes configuration information for a single client station 25 to which the single user resource unit is allocated, in an embodiment. In an embodiment, the resource allocation configuration subfield 800 corresponds to one or more of the RA configuration subfields 702-4.

The resource allocation configuration subfield 800, itself, includes a plurality of subfields 802. The number of bits allocated to each subfield 802, according to an example embodiment, is indicated in FIG. 8 above the corresponding subfield 802. Other suitable numbers of bits are allocated to at least some of the subfields 802, in other embodiments. The subfields 802 include an SU/MUMIMO subfield 802-2, a station identifier (ID) subfield 802-4, a number of space time streams (Nsts) subfield 802-6, a transmit beamforming (TxBF) subfield 802-8, a space time block coding (STBC) subfield 802-10, a modulation and coding (MCS) subfield 802-12, and a coding subfield 802-14. The SU/MUMIMO subfield 802-2 indicates that the allocation configuration subfield 800 corresponds to a single user RU allocated to a single client station 25, in the illustrated embodiment. The station ID subfield 802-4 includes an identifier, such as an association identifier (AID) or a partial association identifier (PAID), of the single client station 25 to which the corresponding RU is allocated, in an embodiment. Subfields 802-6 to 802-14 indicate various transmission parameters used for transmission of data to the single client station 25 identified by the station ID subfield 802-4. Subfields 802-6 to 802-14 are generally the same as the corresponding subfields in the OFDM information element 500 of FIG. 5, in an embodiment.

In an embodiment, the resource allocation configuration subfield 800 omits one or more of the subfields 802. For example, the resource allocation configuration subfield 800 omits one or both of the MCS subfield 802-12 and the coding subfield 802-14, in an embodiment. Referring to FIG. 2, in an embodiment, the omitted one or both of MCS subfield 802-12 and the coding subfield 802-14 are included in the HE-SIG-C 235.

Figure 9:
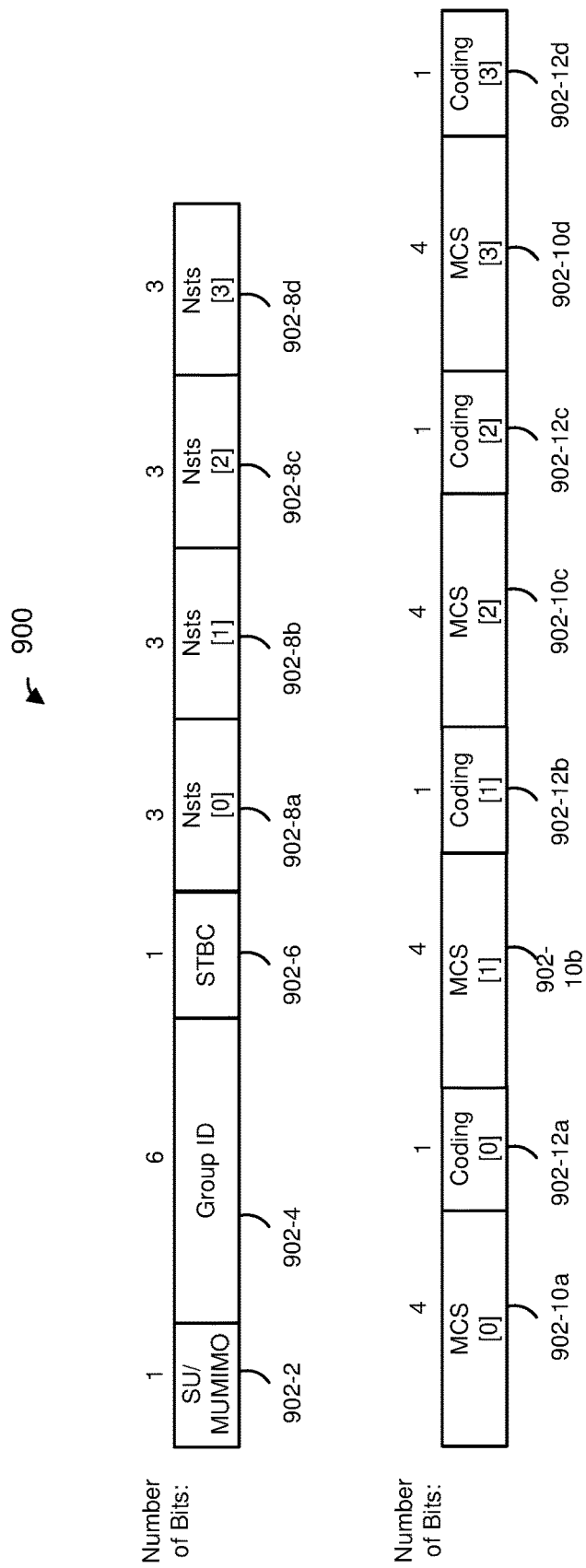
FIG. 9 is a diagram of a resource allocation configuration subfield included in an OFDMA information element, according to an embodiment.

FIG. 9 is a diagram of a resource allocation configuration subfield 900 included in an OFDMA information element, according to an embodiment. The resource allocation configuration subfield 900 corresponds to a multi-user RU, and indicates transmission parameters used for transmission of data to respective client stations 25 of the multiple client stations 25 to which the multi-user RU is allocated, in an embodiment. In an embodiment, the resource allocation configuration subfield 900 corresponds to one or more RA configuration subfields 702-4.

The resource allocation configuration subfield 900, itself, includes a plurality of subfields 902. The number of bits allocated to each subfield 902, according to an example embodiment, is indicated in FIG. 9 above the corresponding subfield 902. Other suitable numbers of bits are allocated to the subfields 902, in other embodiments. The subfields 902 include an SU/MUMIMO subfield 902-2, a group ID subfield 902-4, a space time block coding (STBC) subfield 902-6, a plurality of Nsts subfields 902-8a through 902-8d, a plurality of MCS subfields 902-10a through 902-10d, and a plurality of coding subfields 902-12a through 902-12d. The SU/MUMIMO subfield 902-2 is set to indicate that the allocation configuration subfield 900 corresponds to a multi-user RU allocated to an MU-MIMO group of client stations 25, in the illustrated embodiment. The group ID subfield 902-4 includes a group identifier that identifies the group to which the corresponding RU is allocated, in an embodiment. Subfields 902-6 to 902-12 indicate various transmission parameters used for transmission of data to the multiple client stations 25. Subfields 902-6 to 802-12 are generally the same as the corresponding subfields in the OFDM information element 600 of FIG. 6, in an embodiment.

In an embodiment, the resource allocation configuration subfield 900 omits one or more of the subfields 902. For example, the resource allocation configuration subfield 900 omits one or both of (i) the MCS subfields 902-10 and (ii) the coding subfields 902-12, in an embodiment. With reference to FIG. 2, in an embodiment, the omitted one or both of MCS (i) the MCS subfields 902-10 and (ii) the coding subfields 902-12 are included in the HE-SIG-C 235.

Figure 10:
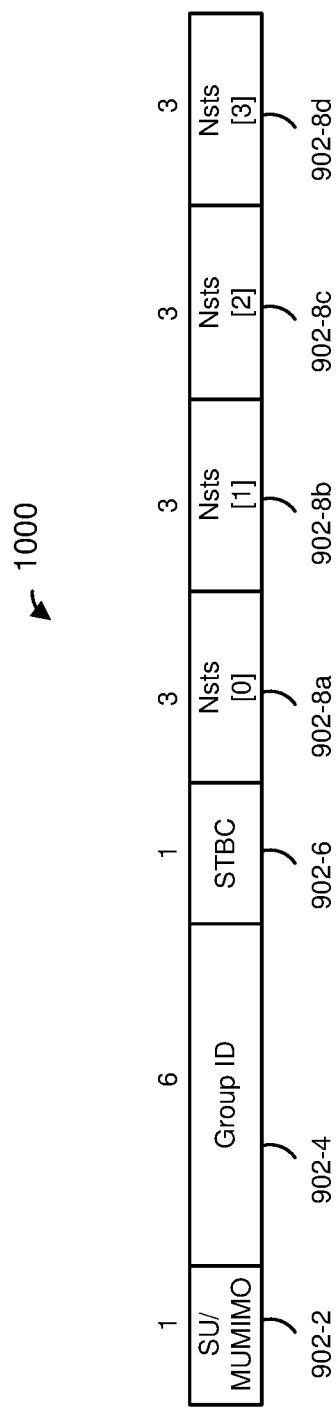
FIG. 10 is a diagram of a resource allocation configuration subfield included in an OFDMA information element, according to another embodiment.

FIG. 10 is a diagram of a resource allocation configuration subfield 1000 included in an OFDMA information element, according to another embodiment. The resource allocation configuration subfield 1000 corresponds to a multi-user RU, and includes configuration information, or transmission parameters, for multiple client stations 25 to which the multi-user RU is allocated, in an embodiment. In an embodiment, the resource allocation configuration subfield 1000 corresponds to one or more RA configuration subfields 702-2.

The resource allocation configuration subfield 1000 is generally the same as the resource allocation configuration subfield 9 of FIG. 9 except that the resource allocation configuration subfield 1000 omits the MCS subfields 902-10 and the coding subfields 902-12. For example, the MCS subfields 902-10 and the coding subfields 902-12 are included in the HE-SIG-C 235 of the data unit 200, and are omitted from the HE-SIG-B 222 of the data unit 200, in an embodiment. On the other hand, the Nss subfields 902-8 are included in the HE-SIG-B 222, in the illustrated embodiment. In an embodiment, because the Nss subfields 902-8 are included in the HE-SIG-B field 222 and before the HE-LTFs 230, a receiving device determines which spatial streams are allocated to the receiving device prior to receiving the HE-LTFs 230 and to obtain a channel estimate for the corresponding spatial streams, in an embodiment. The receiving device then uses the obtained channel estimate to decode the HE-SIG-C 235 and to obtain other transmission parameters (e.g., MCS and coding parameters) used for transmission of data in the data portion 240 to the receiving device, in an embodiment, in an embodiment.

FIG. 11A is a diagram of a resource allocation configuration element 1100 included in an OFDMA information element, according another embodiment. In an embodiment, the resource allocation configuration subfield 1100 is included in one or more of the RA configuration subfields 702-4. The resource allocation configuration element 1100 corresponds to a multi-user resource unit, and indicates respective transmission parameters used for transmission of data to multiple client stations 25 to which the multi-user resource unit is allocated, in an embodiment. The resource allocation configuration subfield 1100 is similar to the resource allocation configuration subfield 900 of FIG. 9 except that the resource allocation configuration subfield 1100 includes individual allocation configuration elements corresponding to each of the client stations 25 to which the corresponding multi-user resource unit is allocated, in an embodiment.

FIG. 11A is a diagram of a resource allocation configuration element 1100 that corresponds to a particular user of a multi-user group. In an embodiment, an RA configuration subfield 702-4 that corresponds to multiple client stations 25 includes respective a resource configuration element such as the resource configuration element 1100 corresponding to each of the client stations 25 to which the corresponding resource unit is allocated. The resource allocation configuration element 1100 includes a plurality of subfields 1102. The number of bits allocated to each subfield 1102, according to an example embodiment, is indicated in FIG. 11A above the corresponding subfield 1102. Other suitable numbers of bits are allocated to the subfields 1102, in other embodiments. The plurality of subfields 1102 include an SU/MUMIMO subfield 1102-2, a group ID subfield 1102-4, a member ID subfield 1102-6, an STBC subfield 1102-8, an Nsts_total subfield 1102-10, a start stream index subfield 1102-12, an Nsts_user subfield 1102-14, an MCS subfield 1102-16, a coding subfield 1102-18 and CRC bits 1102-20.

In an embodiment, the group ID subfield 1102-4 identifies a group to which the corresponding RU is allocated, and the member ID subfield 1102-6 identifies a client station 25 within the group. For example, in an embodiment, the member ID subfield 1102-6 includes an indication of a user position of the client station 25 within the group identified by the group ID subfield 1102-4, in an embodiment. The STBS subfield 1102-8 indicates whether space time block coding is used for transmission of data to the client station 25 identified by the member ID subfield 1102-6, in an embodiment. The Nsts_total subfield 1102-10 indicates the total number of space time streams used for transmission of data within the corresponding RU. The start stream index 1102-12 indicates an index of a first space time stream of a total number of space time streams allocated to the client station 25 identified by the member ID subfield 1102-7, and the Nsts_user subfield 1102-14 indicates the total number of space time streams allocated to the client station 25 identified by the member ID subfield 1102-7. Accordingly, the start stream index 1102-12 and the Nsts_user subfield 1102-14 together identify the particular one or more space time streams allocated to the client station 25 identified by the member ID subfield 1102-6. The MCS subfield 1102-16 and the coding subfields 1102-18 indicate an MCS and a coding type, respectively, used for transmission of data to the client station 25 identified by the member ID subfield 1102-6, in an embodiment. CRC bits 1102-20 bits used for checking correctness of the various subfields 1102, in an embodiment.

In some embodiments, one or more of the subfields 1102 are omitted from the resource allocation configuration element 1100 and/or are replaced by other subfields not shown in FIG. 11A. For example, the group ID subfield 1102-4 and the member ID subfield 1102-6 are replaced by a single subfield that includes an identifier of a client station 25, such as an AID or a partial AID of the client station 25, in an embodiment. As another example, the start stream index subfield 1102-12 and the Nsts_user subfield 1102-14 are replaced by a single subfield that jointly indicates the one or more space time streams allocated to the identified client station 25.

FIG. 11B is a diagram of a resource allocation configuration subfield 1150 included in an OFDMA information element, according to another embodiment. In an embodiment, the resource allocation configuration element 1150 is included in each of one or more of the RA configuration subfields 702-4. The resource allocation configuration subfield 1150 is similar to the resource allocation configuration subfield 1100 and includes many of the same subfields 1102 as the resource allocation configuration subfield 1100, with several exceptions. In the resource allocation configuration subfield 1150, the group ID subfield 1102-4 and the member ID subfield 1102-6 are replaced by a single STA-ID/PAID subfield 1152-2 that includes an identifier of a client station 25, such as an AID or a partial AID of the client station 25. Additionally, the start stream index 1102-12 and the Nsts_user subfield 1102-14 are replaced by a single subfield 1152-4 that includes joint index of (start stream and Nsts_user) that identifies one or more space time streams allocated to the client station 25 identified by the STA-ID/PAID subfield 1152-2, in the illustrated embodiment.

Figure 11C:
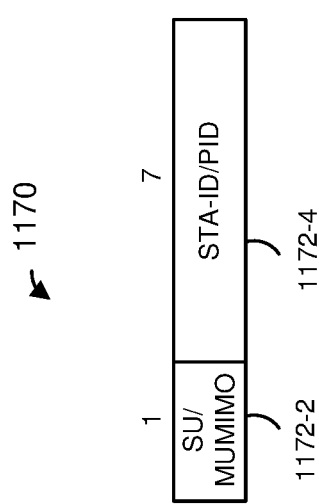
FIG. 11C is a diagram of a resource allocation configuration subfield corresponding to a resource unit that is not allocated for transmission of data to any client station, according to an embodiment.

In some embodiments and/or scenarios, resource allocation used with the data unit 200 includes one or more OFDM tone blocks that are not allocated for transmission of data to any client station 25. For example, one or more resource units in the data unit 200 are not allocated for transmission of data to any client station 25, in some embodiments and scenarios. FIG. 11C is a diagram of a resource allocation configuration subfield 1170 corresponding to a resource unit that is not allocated for transmission of data to any client station 25, according to an embodiment. The resource allocation configuration subfield 1170 corresponds to one or more of the resource allocation subfields 704, in an embodiment. The resource allocation subfield 1100 includes an SU/MU MIMO subfield 1172-2 and an STA-ID/PID subfield 1172-4. The SU/MU MIMO indication subfield 1172-2 is set to indicate that the resource allocation configuration subfield 1170 corresponds to a single user resource unit, in an embodiment. However, the STA-ID/PID subfield 1172-4 includes a value that is not associated with any client station 25 to which the data unit 200 is directed. For example, the STA-ID/PID subfield 1172-4 includes a reserved value, in an embodiment. In an embodiment, the reserved value indicates to a receiving device that the corresponding resource unit is unused. As an example, in an embodiment, the reserved value is "1111111". In another embodiment, the reserved value is an ID that is not associated with any client station 25 to which the data unit 200 is directed.

In the embodiment of FIG. 11C, resource allocation configuration information subfields, such as the STBC subfield, TxBF subfield, an Nss subfield, an MCS subfield, a coding subfield, etc., are omitted from the resource allocation configuration subfield 1170. Thus, the resource allocation configuration subfield 1170 is shorter as compared to an RA configuration subfield that corresponds to a scheduled resource unit. In other embodiments, the format of the resource allocation subfield 1170 is the same as format of a resource allocation configuration subfield that corresponds to a scheduled resource unit, such as one of the RA configuration subfields 800 of FIG. 8 or the RA configuration subfield 900 of FIG. 9, for example. In such embodiments, resource configuration information subfields, such as an STBC subfield, TxBF subfield, an Nss subfield, an MCS subfield, a coding subfield, etc. are reserved or are used for purposes other than signaling resource unit transmission parameter, in various embodiments.

A receiving device detects the reserved value in the STA-ID/PID subfield 1172-2 and determines, based on detecting the reserved value in the STA-ID/PID subfield 1172-2, that the RA configuration subfield 1700 is a short RA configuration subfield that omits RA configuration subfield, such as an STBC subfield, TxBF subfield, an Nss subfield, an MCS subfield, a coding subfield, etc., in an embodiment. Similarly, a receiving device, upon detecting, based on detecting an identification value in the STA-ID subfield 1170-2, that the RA configuration subfield 1700 does not include information for the receiving device, the receiving device discards the remainder of the RA configuration subfield 1700, in an embodiment.

Referring again to FIG. 7, in some embodiments, the RA subfield 702-2 is replaced by "a number of RUs" indication that indicates a number of resource units in the data unit 200. Further, each RA configuration subfield 702-4 corresponds to a particular one of the resource units and, in addition to transmission parameters used for transmission of data in the particular resource unit, includes an indication of a number of basic resource units included in the particular resource unit, in such embodiments.

Figure 12:
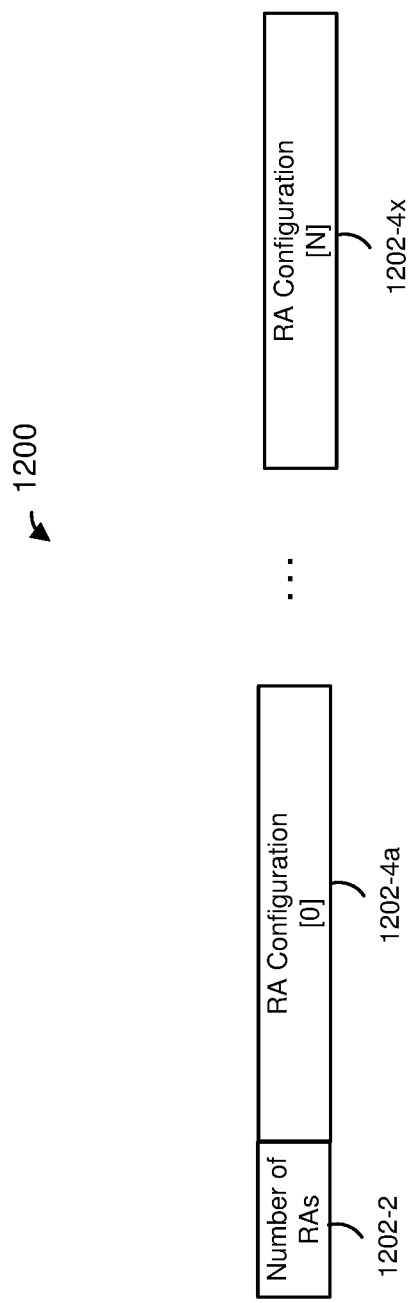
FIG. 12 is a diagram of an OFDM/OFDMA information element, according to an embodiment.

FIG. 12 is a diagram of an OFDM/OFDMA information element 1200, according to one such embodiment. The OFDMA information element 1200 is included in the OFDM/OFDMA information subfield 402-6 when the format subfield 402-4 indicates OFDMA format, in an embodiment. The OFDMA information element 1200 includes a plurality of subfields 1202 including a "number of RUs" subfield 1202-2 and a plurality of RA configuration subfields 1202-4. The number of RUs subfield 1202-2 includes an indication of a number of resource units within the data unit 200, wherein each resource unit includes one or more basic resource units within the data unit 200, and each of the RA configuration subfields 1102-4 corresponds to a respective one of the resource units within the data unit 200. Each of the RA configuration subfields 1102-4 indicates the number of basic resource unit blocks included in corresponding resource unit, and includes formatting information used transmission of data within the corresponding resource unit, in an embodiment.

FIG. 13 is a diagram of an example resource allocation configuration element 1300, according to an embodiment. In an embodiment, the resource allocation configuration element 1300 corresponds to one or more of the RA configuration subfields 1202-2. The resource allocation configuration element 1300 corresponds to a single user RU, and includes configuration information for a single client station 25 to which the single user RU is allocated, in an embodiment.

The resource allocation configuration element 1300 is generally the same as the resource allocation configuration element 800 of FIG. 8 and includes many of the same subfields as the resource allocation configuration element 800 of FIG. 8. Additionally, the resource allocation configuration subfield 1300 includes a number of RUs subfield 1302 that indicates the number of basic resource units included in the resource unit corresponding to the resource allocation configuration element 1300, in an embodiment.

Figure 14:
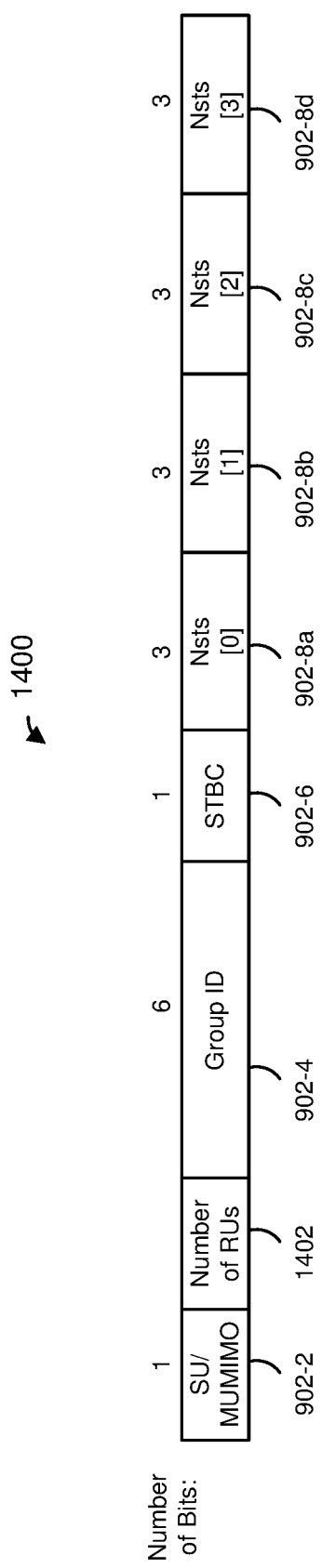
FIG. 14 is a diagram of another example resource allocation configuration element, according to an embodiment.

FIG. 14 is a diagram of an example resource allocation configuration element 1400, according to an embodiment. In an embodiment, the resource allocation configuration element 1400 corresponds to one or more RA configuration subfields 1202-2. The resource allocation configuration element 1400 corresponds to a multi-user RU, and includes configuration information for multiple client stations 25 to which the single user RU is allocated, in an embodiment.

The resource allocation configuration element 1400 is generally the same as the resource allocation configuration element 1000 of FIG. 10 and includes many of the same subfields as the resource allocation configuration element 1000 of FIG. 10. Additionally, the resource allocation configuration subfield 1400 includes a number of RUs subfield 1402 that indicates the number of basic resource units included in the resource unit corresponding to the resource allocation configuration element 1300, in an embodiment.

Figure 15:
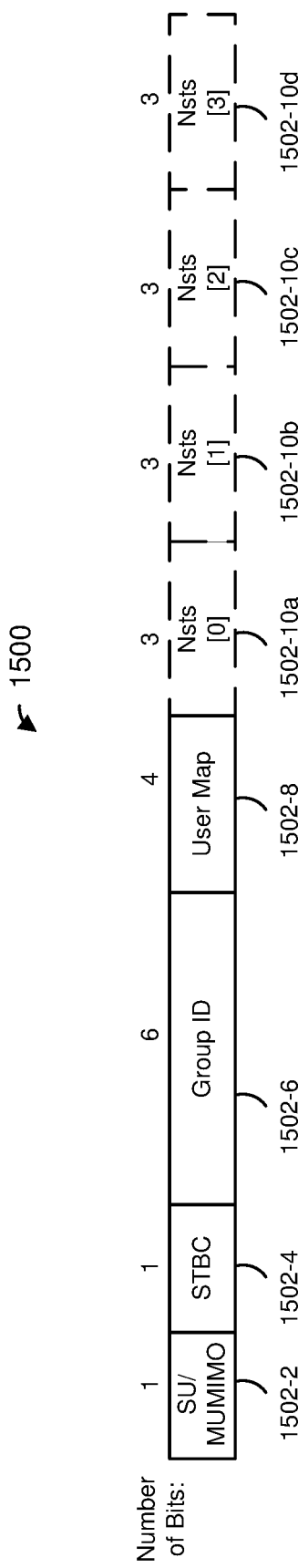
FIG. 15 is a diagram of a multi-user resource allocation configuration element, according to an embodiment.

In embodiments described above in which the OFDM/OFDMA information subfield 402-6 includes indications of transmission parameters, such as Nss, MCS and coding type, for a plurality of users in a multi-user group, the OFDM/OFDMA information subfield 402-6 includes respective subfields, such as respective Nss subfields, MCS subfields, and Coding subfields, corresponding to a maximum number of users (e.g., four users) included in the multi-user group, although not all of the users are scheduled to receive, or transmit, data in the particular data unit that includes the OFDM/OFDMA information subfield 402-6. Alternatively, in another embodiment, the OFDM/OFDMA information subfield 402-6 includes a reduced number of subfields in situations in which not all members of a multi-user group are scheduled to receive, or transmit, data in the particular data unit that includes the OFDM/OFDMA information subfield 402-6. FIG. 15 is a diagram of a multi-user resource allocation configuration element 1500, according to one such embodiment. In various embodiments, one or more multi-user resource allocation configuration elements the same as or similar to the element 1500 is included in the OFDM/OFDMA information subfield 402-6. In an embodiment in which the data unit 200 is an OFDMA data unit, an information element the same as or similar to the information element 1500 is included in a resource allocation configuration element corresponding to an MU-MIMO resource unit.

The multi-user resource allocation configuration element 1500 includes a plurality of subfields 1502. The number of bits allocated to each subfield 1502, according to an example embodiment, is indicated in FIG. 15 above the corresponding subfield 1502. Other suitable numbers of bits are allocated to the subfields 1502, in other embodiments. The subfields 1502 include an SU/MUMIMO subfield 1502-2, a space time block coding (STBC) subfield 1502-4, a group ID subfield 1502-6, a user map subfield 1502-8, and one or more Nsts subfields 1502-10. In an embodiment, the group ID subfield 1502-6 includes a group identifier that identifies a multi-user group, and the user map subfield 1502-8 identifies members of the multi-user group that are scheduled to receive data in the data unit 200, in an embodiment. For example, in an embodiment, the user map subfield 1502-8 includes a plurality of bits, each bit corresponding to a particular client station 25 that is a member of the multi-user group. In this embodiment, each bit is set to indicate whether the corresponding client station 25 is scheduled to receive data in the data unit 200. For example, in an embodiment in which four client stations 25 are included in the MU-MIMO group, the user map subfield 1502-2 includes four bits, each bit set of a logic one (1) to indicate that the corresponding client station 25 is scheduled to receive data in the data unit 200 or to a logic zero (0) to indicate that the corresponding client station 25 is not scheduled to receive data in the data unit 200. A client station that is indicated by the user map subfield 1502-8 as scheduled to receive data in the data unit 200 is sometimes referred to herein as a "scheduled client station."

Respective ones of the one or more Nss subfields 1502-10 indicate numbers of spatial streams allocated to the scheduled client stations 25 identified by the user map subfields 1502-8, in an embodiment. The number of the Nss subfields 1502-10 included in the multi-user resource allocation configuration element 1500 corresponds to the number of scheduled client stations 25 that are identified by the user map subfield 1502-8, in an embodiment. Thus, for example, if only one client station 25, among the client stations 25 that are members of the multi-user group identified by the group ID subfields 1502-6, is indicated as scheduled to receive data in the data unit 200, then the multi-user resource allocation configuration element 1500 includes only one Nss subfield 1502-10. Similarly, if two client stations 25, among the client stations 25 that are members of the multi-user group identified by the group ID subfields 1502-6, are indicated as scheduled to receive data in the data unit 200, then the multi-user resource allocation configuration element 1500 includes two Nss subfields 1502-10, etc. in an embodiment.

Each Nss subfield 1502-10 includes two bits to indicate a number of spatial streams, of a maximum of four spatial streams, allocated to a corresponding client station 25 that is indicated as scheduled to receive data in the data unit 200, in an embodiment. As just as an example, a binary value of "1101" in the user subfield 1502-8 user number zero, user number one and user number three in the multi-user group are scheduled to receive data in the data unit 200. Further, continuing with the same example, binary values of "10" "11" and "00" of the three Nss subfields 1502-10 included in the multi-user resource allocation configuration element 1500 indicate that three spatial streams are allocated to user zero, four spatial streams are allocated to user one and one spatial stream is allocated to user three, in an example scenario. As just another example, in another example scenario, a binary value of "0010" in the user map subfield 1502-8 indicates that only user number two in the multi-user group is scheduled to receive data in the data unit 200. In this example scenario, only one Nss subfield 1502-10 is included in the multi-user resource allocation configuration element 1500, wherein the one Nss subfield 1502-10 indicates the number of spatial streams used for transmission of data to the client station 25 that is user number two in the multi-user group, in an embodiment.

Although in the embodiment of FIG. 15 the multi-user resource allocation configuration element 1500 does not include indications of transmission parameters other than numbers of spatial streams, other transmission parameters, in addition to the numbers of spatial streams, are included in the multi-user resource allocation configuration element 1500 in other embodiments. For example, in an embodiment, the multi-user resource allocation configuration element 1500 includes one or more MCS subfields (e.g., each MCS subfield having four bits) to indicate MCS used for each scheduled client station 25 and/or one or more coding subfields (e.g., each coding subfield having one bit) to indicate the coding type used for each scheduled client station 25. The number of each of the one or more MCS subfields and/or the one or more coding subfields corresponds to the number of scheduled client stations 25, in an embodiment.

Because the number of Nss subfields 1502-10, and, in some embodiments, the number of respective subfields that indicate transmission parameters other than the number of spatial streams (e.g., MCS and coding), corresponds to the number of scheduled client stations 25 in a multi-user group. Accordingly, the total number of bits in the multi-user resource allocation configuration element 1500 is variable and depends on the number of schedule client stations 25 in the multi-user group, in such embodiments. For example, in an embodiment in which a maximum of four client stations 25 are included in a multi-user group, the multi-user resource allocation configuration element 1500 includes up to 20 bits if transmission parameters other than Nss are not included in the multi-user resource allocation configuration element 1500 or up to 40 bits if MCS and coding parameters, in addition to Nss, are included in the element 1500, in various example embodiments.

In some embodiments, the format of the HE-SIG-B 222, rather than the format of the HE-SIG-A 220, depends on the mode of transmission of the data unit 200. For example, a regular format HE-SIG-B 222 is used when the data unit 200 is a downlink transmission or a non-triggered uplink transmission, while a short format HE-SIG-B 222 is used when the data unit 200 is a triggered uplink transmission. The regular format HE-SIB-B 222 includes indications of various transmission parameters used for transmission of the data unit 200, in an embodiment. The short format HE-SIG-B 222 includes an indication of a duration of the data unit 200, or an indication of a duration of the TxOP during which the data unit 200 is transmitted, in an embodiment. Additionally, the short format HE-SIG-B 222 omits various transmission parameters used for transmission of data in the data unit 200 because the short format HE-SIG-B 222 is transmitted in a scenario in which the receiving device knows such transmission parameters a priori, in an embodiment. Regular format HE-SIG-B 222 corresponds to the signal field 400 of FIG. 4A, and the short format HE-SIG-B 222 corresponds to a signal field 1600 described below with respect to FIG. 16, in some embodiments. Other suitable regular format HE-SIG-B fields and/or short format HE-SIG-B fields are used in other embodiments.

Figure 16:
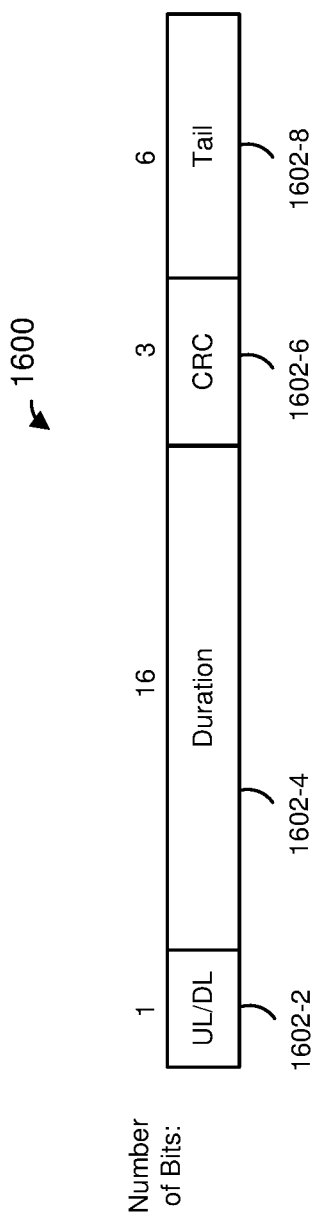
FIG. 16 is a diagram of a short format signal field, according to an embodiment.

Referring to FIG. 16, the short format signal field 1600 corresponds to HE-SIG-B 222 of the data unit 200 when the data unit 200 is a triggered uplink OFDMA data unit, according to an embodiment. For ease of explanation, the short format signal field 1600 is described with reference to the data unit 200. However, the short format signal field 1600 is used with data units different from the data unit 200 of FIG. 2, in some embodiments.

The short format signal field 1600 includes a plurality of subfields 1602. The number of bits allocated to each subfield 1602, according to an example embodiment, is indicated in FIG. 10 above the corresponding subfield 1602. Other suitable numbers of bits are allocated to the subfields 1602, in other embodiments. The subfields 1602 include a UL/DL subfield 1602-2, a duration subfield 1602-4, CRC bits 1602-6, and tail bits 1602-8. The UL/DL subfield 1602-2 indicates that the data unit 200 is a triggered uplink data unit, in the illustrated embodiment. The duration subfield 1502-4 includes an indication of a duration of the data unit 200, or an indication of a duration of a transmit opportunity (TxOP) during which the data unit 200 is transmitted, in various embodiments. The duration subfield 1502-4 is used to indicate the duration to a communication device that is not an intended recipient of the data unit and may be unable to decode a duration indication included in a MAC header of the data unit 200, in an embodiment.

In some embodiments, polarity of modulation of the L-SIG field 215 is used to signal formatting of the HE-SIG-A 220 and/or the HE-SIG-B 222. Additionally or alternatively, one or more bits of the L-SIG field 215 are used to signal formatting of the HE-SIG-A 220 and/or the HE-SIG-B 222, or to signal information about the data unit 200 that is not signaled in the HE-SIG-A 220 and/or the HE-SIG-B 222, in some embodiments. For example, in an embodiment, the L-SIG field 215 includes a bit that indicates whether the data unit 200 is a simultaneous transmission by multiple communication devices. For example, the bit is set to a logic zero (0) is the data unit is a multi-user simultaneous transmission, such as an uplink multi-user frame that includes simultaneous transmissions by multiple client stations 25, a frame that includes multiple clear-to-send (CTS) frames simultaneously transmitted by multiple client stations 25, a joint transmission that includes simultaneous transmissions by multiple APs, etc., and is set to a logic one (1) to indicate that the data unit 200 is a transmission from a single communication device, or vice-versa, in an embodiment.

In some embodiments, the data unit 200 serves as a trigger frame for transmission of one or more uplink data units by one or more client stations 25 that receive the data unit 200. In some such embodiments, a signal field of the data unit 200, such as HE-SIG-B 222 includes (i) indications of downlink transmission parameters used for transmission of the data unit 200 to one or more client stations 25 and (ii) indications of uplink transmission parameters to be used for transmission of respective data units by one or more of the one or more client stations 25. In some such embodiments, a compression method is used to reduce the amount of information transmitted in the signal field. As an example, in an embodiment, same resource unit allocation is used for transmission of the downlink data unit 200 and transmission of one or more uplink data units triggered by the data unit 200, in an embodiment. Accordingly, a single RA subfield, such as the RA subfield 702-2 serves as indication of both downlink and uplink resource unit allocation, in this embodiment. An RA configuration subfield 702-4 that corresponds to a single user includes a single station ID subfield to identify the single client station 25 to which the corresponding RU is allocated for transmission of data to the client station 25 in the data unit 200 and for transmission of a triggered uplink data unit by the client station 25, in an embodiment. Similarly, an RA configuration subfield 702-4 that corresponds to a multi-user group of client stations 25 includes a group ID subfield to identify the multi-user group of client stations 25 to which the corresponding RU is allocated for transmission of data to the client stations 25 in the data unit 200 and for transmission of respective triggered uplink data units by the client stations 25, in an embodiment. Additionally or alternatively, in some embodiments, at least some transmission parameters (e.g., Nss, MCS, coding type, etc.) are defined to be the same for downlink transmission and the following triggered uplink transmission, and only a single indication for each of such transmission parameters. Further, in some embodiments, at least some transmission parameters for uplink transmission are indicated in an RA configuration subfield 702-4 incrementally with respect to corresponding parameters indicated for downlink transmission in the RA configuration subfield 702-4. As an example, in some embodiments and scenarios, fewer space time streams and/or lower MCSs are typically used for uplink transmission as compared to downlink transmission, for example due to typically worse channel conditions in uplink channels as compared to uplink channels. In such embodiments and scenarios, the Nss and/or MCS parameters for uplink transmission are indicated in the RA configuration subfield 702-4 as a difference (delta) in these parameters relative to the corresponding parameters indicated in the RA configuration subfield 702-4 for downlink transmission.

FIG. 17A is a diagram of a resource allocation configuration subfield 1700 included in an OFDMA information element of a downlink data unit that triggers uplink transmission, according to an embodiment. The resource allocation configuration subfield 1700 corresponds to a single-user resource unit, and indicates (i) downlink transmission parameters used for transmission of data to a single client station 25 using the resource unit and (ii) uplink transmission parameters to be used by the triggered uplink transmission by the single client station 25 using the same resource unit, in an embodiment. In an embodiment, the resource allocation configuration subfield 1700 corresponds to one or more RA configuration subfields 702-4 of FIG. 7. For ease of explanation, the resource allocation configuration subfield 1700 is described with reference to the data unit 200 of FIG. 2. However, the resource allocation configuration subfield 1700 is used with data units different from the data unit 200 of FIG. 2, in some embodiments.

The resource allocation subfield 1700, itself, includes a plurality of subfields 1702. The subfields 1702 include an SU/MU subfield 1702-2, a station ID subfield 1702-4, a downlink Nss subfield 1702-6, a downlink TxBF subfield 1702-8, a downlink STBC subfield 1702-10, a downlink MCS subfield 1702-12, an uplink Nss subfield 1702-14, an uplink TxBF subfield 1702-16, an uplink STBC subfield 1702-18, an uplink MCS subfield 1702-20, and a coding subfield 1702-22. The SU/MU subfield 1702-2 indicates that the resource allocation configuration subfield 1700 corresponds to a single user resource unit, and the station ID subfield 1702-4 includes an identification of the single client station 25 to which the corresponding resource unit is allocated for both the downlink transmission and the triggered uplink transmission, in the illustrated embodiment. The downlink Nss subfield 1702-6, the downlink TxBF subfield 1702-8, the downlink STBC subfield 1702-10, and the downlink MCS subfield 1702-12 indicate corresponding transmission parameters used for downlink transmission of data in the data unit 200 to the client station 25 identified by the station ID subfield 1702-4, in an embodiment. The uplink Nss subfield 1702-14, the uplink TxBF subfield 1702-16, the uplink STBC subfield 1702-18, and the uplink MCS subfield 1702-20 indicate corresponding transmission parameters to be used for the uplink transmission, by the client station 25 identified by the station ID subfield 1702-4, triggered by the data unit 200, in an embodiment. The coding subfield 1702-22 includes an indication of a coding type used for both (i) downlink transmission of data in the data unit 200 and (ii) uplink transmission triggered by the data unit 200, in an embodiment.

FIG. 17B is a diagram of a resource allocation configuration subfield 1750 included in an OFDMA information element of a downlink data unit that triggers uplink transmission, according to an embodiment. The resource allocation configuration subfield 1750 corresponds to a single-user resource, and indicates (i) downlink transmission parameters used for transmission of data to a single client station 25 using the resource unit and (ii) uplink transmission parameters to be used by the triggered uplink transmission by the single client station 25 using the same resource unit, in an embodiment. In an embodiment, the resource allocation configuration subfield 1750 corresponds to one or more RA configuration subfields 702-4 of FIG. 7. For ease of explanation, the resource allocation configuration subfield 1750 is described with reference to the data unit 200 of FIG. 2. However, the resource allocation configuration subfield 1750 is used with data units different from the data unit 200 of FIG. 2, in some embodiments.

The resource allocation configuration subfield 1750 is similar to the resource allocation subfield 1700 of FIG. 17A and includes many of the same-numbered elements with the resource allocation subfield 1700 of FIG. 17A. The uplink Nss subfield 1702-14 is replaced with an uplink delta Nss subfield 1752-2. The uplink delta Nss subfield 1752-2 indicates a difference between the number of space time streams used for downlink transmission indicated by the downlink Nss subfield 1702-6 and the number of space time streams to be used for uplink transmission, in an embodiment. Indicating a difference between the number of space time streams used for downlink transmission and the number of space time streams to be used for uplink transmission can be done using fewer bits as compared to the number of bits needed to independently indicate the number of space time streams to be used for uplink transmission. Accordingly, the uplink delta Nss subfield 1752-2 includes fewer bits as compared to the uplink Nss subfield 1702-14, in an embodiment. As merely an example, whereas the uplink Nss subfield 1702-14 includes two bits, the uplink delta Nss subfield 1752-2 includes only a single bit, in an example embodiment.

In an embodiment, the uplink MCS subfield 1702-20 in the resource allocation configuration subfield 1700 of Fig. A is replaced with an uplink delta MCS subfield 1752-4 in the resource allocation configuration subfield 1750 of FIG. 17B. The uplink delta MCS subfield 1752-4 indicates a difference between the MCS used for downlink transmission indicated by the downlink MCS subfield 1702-12 and the MCS to be used for uplink transmission, in an embodiment. Because the MCS to be used for uplink transmission is indicated as a difference relative to the MCS used for downlink transmission, fewer bits are used to indicate the MCS for uplink transmission as compared to the number of bits needed to independently indicate the MCS, in at least some embodiments. Accordingly, the uplink delta MCS subfield 1752-4 includes fewer bits as compared to the uplink MCS subfield 1702-20, in an embodiment. As merely an example, whereas the uplink MCS subfield 1702-20 includes four bits, the uplink delta MCS subfield 1752-4 includes fewer than four bits, such as only three bits, only two bits or only one bit, in various embodiments.

In some embodiments, resource unit allocation for downlink transmission to a plurality of client stations is different from resource unit allocation for the triggered uplink transmission by the plurality of client stations. However, in some such embodiments, relative order of resource units, in frequency domain, is the same for both the downlink transmission to a plurality of client stations and the triggered uplink transmission by the plurality of client stations. That is, if a resource unit k allocated for downlink transmission to a first client station, or to a first multi-user group of client stations, is in lower frequency range than a resource unit l allocated to a second client station, or to a second multi-user group of client stations, then a resource unit b allocated for the triggered uplink transmission by the first client station, or the first multi-user group of client stations, is also in lower frequency range than a resource unit d allocated for the triggered uplink transmission by the second client station, or by the second multi-user group of client stations, in such embodiments.

Figure 18:
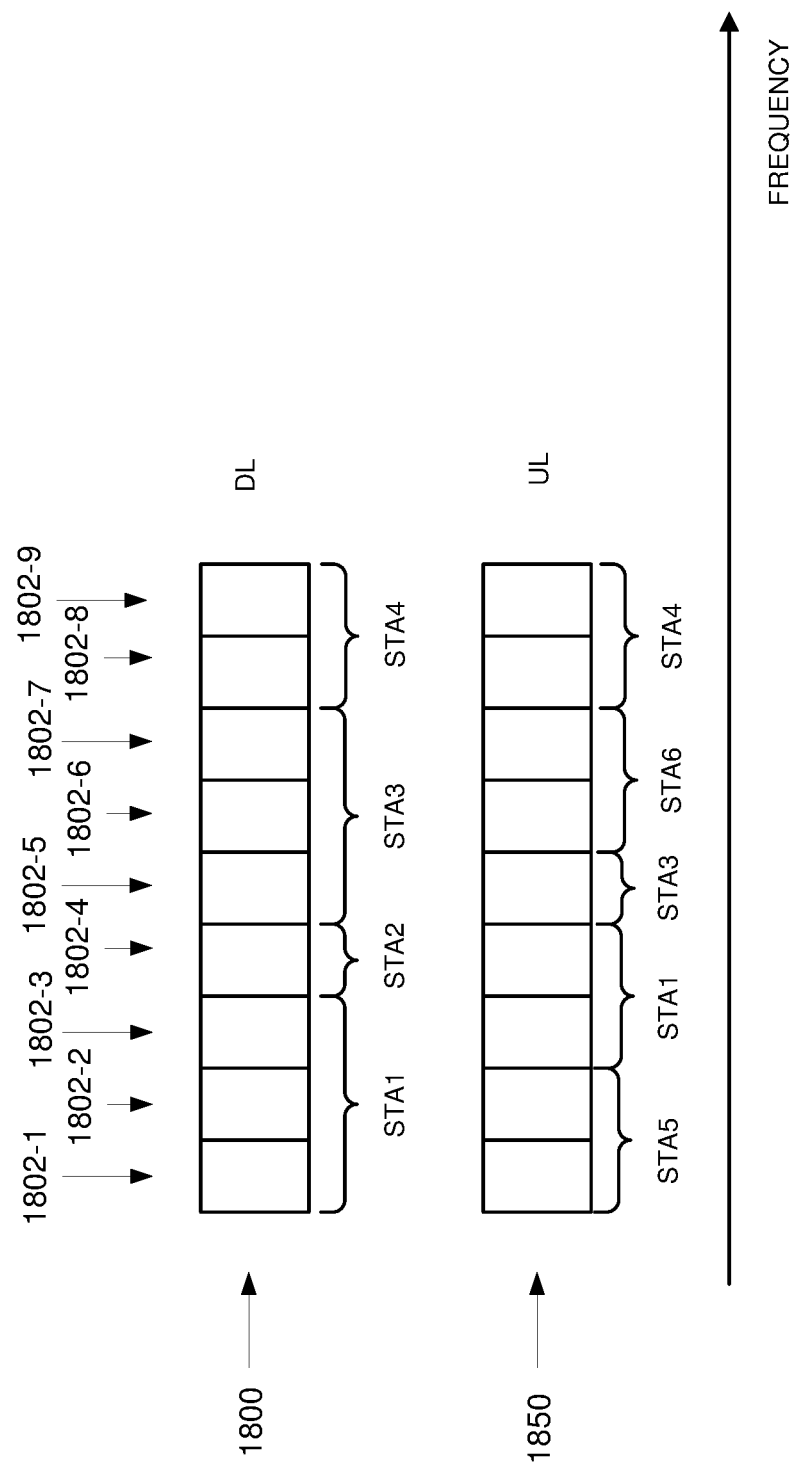
FIG. 18 is a diagram showing resource allocation for a downlink transmission, and resource allocation for an uplink transmission triggered by the data unit that utilizes the downlink transmission, according to an embodiment.

FIG. 18 is a diagram showing resource allocation 1800 for a downlink transmission, and resource allocation 1850 for an uplink transmission triggered by the data unit that utilizes the downlink allocation 1800, in a 20 MHz-wide channel having nice basic resource units 1802, according to an embodiment. As illustrated in FIG. 18, in the downlink allocation 1800, basic resource units 1802-1, 1802-2 and 1802-3 are allocated to a first client station 25 (STA1), basic resource unit 1802-4 is allocated to a second client station 25 (STA2), basic resource units 1802-5, 1802-6 and 1802-7 are allocated to a third client station 25 (STA3), and basic resource units 1802-8 and 1802-9 are allocated to a fourth client station 25 (STA4). Further, in the uplink resource unit allocation 1850, basic resource units 1802-1 and 1802-2 are allocated to a fifth client station 25 (STA5), basic resource units 1802-3 and 1802-4 are allocated to the first client station 25 (STA1), basic resource unit 1802-5 is allocated to the third client station 25 (STA3), basic resource units 1802-6 and 1802-7 are allocated to a sixth client station 25 (STAG), and basic resource units 1802-8 and 1802-9 are allocated to the fourth client station 25 (STA4). Relative frequency-domain order of resource unit allocation to a particular client station 25 in the uplink resource allocation 1850 as in the downlink resource allocation 1800, in the illustrated embodiment. Thus, for example, resource unit allocation for the client station STA1 is lower, in frequency, than the resource unit allocation for the client station STA3 and STA4 in both the uplink resource allocation 1850 as in the downlink resource allocation 1800, in this embodiment. Similarly, resource unit allocation for the client station STA3 is lower, in frequency, than the resource unit allocation for STA4 in both the uplink resource allocation 1850 as in the downlink resource allocation 1800, in this embodiment.

In some embodiments in which relative frequency-domain order of resource unit allocation for downlink transmission is maintained for uplink transmission, the OFDM/OFDMA information element 700 includes respective resource allocation subfields, such as respective resource allocation subfields 702-4, to indicate respective resource units used for downlink and uplink transmission. Continuing with the same embodiment, the OFDM/OFDMA information element 700 includes a respective RA configuration subfield 704-4 corresponding to each scheduled client station and/or each scheduled multi-user group of client stations for both uplink transmission and downlink transmission, in an embodiment. In an embodiment, the RA configuration subfields 704-4 are ordered according to the relative order or resource unit allocations, in an embodiment. Thus, in the resource allocation example described with respect to FIG. 18, the RA configuration subfields 704-4 are ordered as following: RA(STA5), RA(STA1), RA(STA2), RA(STA3), RA(STA6 and RA(STA4), in an embodiment. Each of the RA configuration subfields 704-4 includes a DL/UL/both indication of whether the RA configuration subfield 704-4 includes downlink transmission parameters, uplink transmission parameters or both downlink and uplink transmission parameters, in an embodiment. When the DL/UL/both indication indicates that both downlink and uplink transmission parameters are included in the RA configuration subfield 704-2, the remaining subfields of the RA configuration subfield 704-4 are generally the same as those discussed above with respect to FIGS. 17A-17B, in various embodiments. When the DL/UL/both indication indicates that only downlink or only uplink transmission parameters are included in the RA configuration subfield 704-2, the remaining subfields of the RA configuration subfield 704-4 are generally the same as those discussed above with respect to FIGS. 8-15, in various embodiments.

FIG. 19 is a diagram of a resource allocation configuration subfield 1900 included in an OFDMA information element of a downlink data unit that triggers uplink transmission, according to an embodiment. The resource allocation configuration subfield 1900 is generally the same as the resource allocation configuration subfield 1700 of FIG. 17A except that the resource allocation configuration subfield 1700 additionally includes a DL/UL/both subfield 1902-1 that indicates that the resource allocation configuration subfield 1900 includes both downlink and uplink transmission parameters for the client station 25 identified by the station ID subfield 1702-4. The client station 25 utilizes the downlink transmission parameters in the resource allocation configuration subfield 1900 to receive data transmitted to the client station 25 using the resource unit allocated for downlink transmission to the client station 25, and utilizes the uplink transmission parameters in the resource allocation configuration subfield 1900 to transmit data using the resource unit allocated for uplink transmission by the client station 25, in an embodiment.

Figure 20:
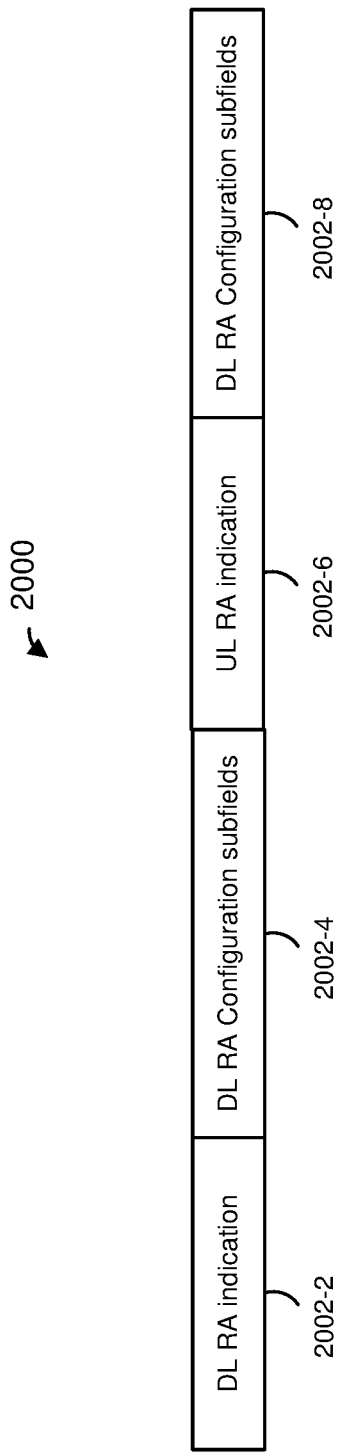
FIG. 20 is a diagram of an OFDM/OFDMA information subfield according an embodiment.

Alternatively, for example in embodiments in which relative frequency-domain order of resource unit allocation for downlink transmission is not maintained for uplink transmission, the OFDM/OFDMA information element includes respective resource allocation subfields, such as respective resource allocation subfields, to indicate respective resource units used for downlink and uplink transmission, and also includes a respective resource allocation configuration subfield corresponding to each downlink resource unit and a respective resource allocation configuration subfield corresponding to each uplink resource, in some embodiments. FIG. 20 is a diagram of an OFDM/OFDMA information subfield 2000 according to one such embodiment. The OFDM/OFDMA information subfield 2000 corresponds to the OFDM/OFDMA information subfield 402-6, in an embodiment. The OFDM/OFDMA information subfield 2000 includes a downlink resource allocation subfield 2002-2, a plurality of downlink RA configuration subfields 2302-4, an uplink resource allocation subfield 2002-6, and plurality of uplink RA configuration subfields 2002-8.

In an embodiment in which the OFDM/OFDMA information subfield 2000 is included in the HE-SIG-B 222, the total number of OFDM symbols in the HE-SIG-B 222 is signaled by a "number of OFDM symbols in SIG-B" indication included in the HE-SIG-A 220. Alternatively, in another embodiment in which the OFDM/OFDMA information subfield 2000 is included in the HE-SIG-B 222, a "number of OFDM symbols in SIG-B" indication included in the HE-SIG-A 220 indicates a number of OFDM symbols that cover the DL parameter portion, and an additional subfield is included in the DL parameter portion to indicate a number of OFDM symbols that cover the UL parameter portion.

In an embodiment, the HE-SIG-B includes a type of UL/DL singling indication to indicate which type of signaling is being used. Alternatively, in another embodiment, the type of UL/DL singling indication is included in HE-SIG-A 220. In an embodiment, the type of UL/DL singling indication includes two bits set to indicate whether (i) identical UL/DL resource unit allocation signaling such as described with respect to FIGS. 17A-17B is used, (ii) non-identical UL/DL resource unit allocation but with same relative order such as described with respect to FIGS. 18-19 is used, or (iii) non-identical UL/DL resource unit allocation and with different relative order, such as described with respect to FIG. 20 is used. In another embodiment, the type of UL/DL singling indication includes any other suitable number of bits.

In some embodiments described above with respect to FIGS. 17-20, a common mode subfield is included in the HE-SIG-B 222 to indicate the type(s) of resource allocation and configuration information that is included in the HE-SIG-B 222. In another embodiment, the common mode subfield is included in the HE-SIG-A 220 instead of the HE-SIG-B 222. In an embodiment, the common mode subfield includes a single bit to indicate whether or not UL allocation and configuration information is included in the HE-SIG-B 222. A client station 25 receiving the data unit 200 detects whether (i) the data unit 200 is a no data packet (NDP) which excludes a data portion or (ii) the data unit 200 includes a data portion, in an embodiment. For example, the client station 25 detects whether (i) the data unit 200 is a no data packet (NDP) which excludes a data portion or (ii) the data unit 200 includes a data portion by checking the PPDU length of the data unit 200 and/or checking the length of the HE-SIG-B 222, in an embodiment. In response to determining that the data unit 200 is an NDP data unit, the client station 25 determines that only UL allocation and configuration information is included in the HE-SIG-B 222 if the common mode subfield is set to indicate that UL allocation and configuration information is present in the HE-SIG-B 222. On the other hand, in response to determining that the data unit 200 is not an NDP data unit, the client station 25 determines that both DL allocation and configuration information and UL allocation and configuration information is included in the HE-SIG-B 222 if the common mode subfield is set to indicate that UL allocation and configuration information is present in the HE-SIG-B 222, in an embodiment.

As another example, in another embodiment, the common mode subfield includes two bits to indicate whether only downlink allocation and configuration, only uplink allocation and configuration information, or both downlink and uplink allocation and configuration information is included in the HE-SIG-B 222.

Additionally or alternatively, implicit signaling is used to indicate to the receiving device whether HE-SIG-B 222 includes only downlink allocation and configuration, only uplink allocation and configuration information, or both downlink and uplink allocation and configuration information, in some embodiments.

In some embodiments describes above in which both downlink RA configuration information and uplink RA configuration information are included in an OFDM/OFDMA information subfield such as the OFDM/OFDMA information subfield 402-6 of FIG. 4A, the downlink RA configuration information and the uplink RA configuration information are jointly encoded using a same encoder. In some such embodiments, a single set of tail bits is needed to decode both the downlink RA configuration information and the uplink RA configuration information at the receiving device. In some such embodiments, the downlink RA configuration information and the uplink RA configuration information are jointly protected using a single set of CRC bits. In other embodiments, the downlink RA configuration information and the uplink RA configuration information are protected individually using separate CRC bits. In yet other embodiments, separate encoders are used to encode the downlink RA configuration information and the uplink RA configuration information, and each portion includes its own CRC bits and tail bits in at least some such embodiments.

In some embodiments in which a data unit similar to the data unit 200 occupies a cumulative bandwidth other than 20 MHz, the HE-SIG-B 222 is repeated over a corresponding number of 20 MHz sub-bands of the whole bandwidth of the data unit. In other embodiments in which a data unit similar to the data unit 200 occupies a cumulative bandwidth other than 20 MHz, at least a portion of the HE-SIG-B 222 is different in each of the 20 MHz sub-bands of the whole bandwidth of the data unit. For example, in an embodiment in which the data unit 200 is an OFDMA data unit in which different data streams are transmitted to respective client stations 25 in different sub-channels of the data unit 200, the HE-SIG-B 222 includes a user-specific portion that includes formatting information for only those client stations 25 for which data streams are transmitted in the corresponding 20 MHz sub-band of the data unit 200. In some embodiments and/or scenarios, redistribution is employed to more evenly distribute user-specific information among the multiple 20 MHz sub-bands of the data unit 200.

Referring again to FIG. 2, as discussed above, the data unit 200 occupies a bandwidth that includes multiple sub-bands corresponding to different channels of the WLAN 10, in some embodiments. In such embodiments, the HE-SIG-B 222 is replicated in each of the sub-bands of the data unit 200, in some embodiments. Thus, for example, in an embodiment in which the data unit 200 occupied a 40 MHz bandwidth, the HE-SIG-B 222 is replicated in each of two 20 MHz sub-bands of the 40 MHz band. As another example, in an embodiment in which the data unit 200 occupied an 80 MHz bandwidth, the HE-SIG-B 222 is replicated in each of four 20 MHz sub-bands of the 80 MHz band.

Alternatively, in an embodiment and scenario in which the data unit 200 is an OFDM data unit, an individually coded HE-SIG-B 222 occupies the entire bandwidth of the data unit 200. Further, in an embodiment and scenario in which the data unit 200 is an OFDMA data unit, HE-SIG-B 222 includes respective different individually coded signal field portions that are transmitted in parallel in each of the sub-bands of the data unit 200. For example, in an embodiment, respective different signal field portions of the HE-SIG-B 222 include respective different user-specific information subfields corresponding to client stations 25 that are scheduled to receive data in the corresponding sub-band of the data unit 200. Additionally, the HE-SIG-B 222 includes common information commonly needed by all client stations 25 that are scheduled to receive data in the data unit 200. The common information is included in one or more of the sub-bands of the data unit 200. For example, the common information is always included in the sub-band that corresponds to the primary channel of the WLAN 10 and is omitted from any sub-band that corresponds to a non-primary channel of the WLAN 10, in an embodiment. In another embodiment, location of the common subfield is dynamically selected by the AP 14. For example, the signal field portion that includes the least amount of user-specific information is selected for transmission of the common information subfield, in an embodiment. In an embodiment in which the location of the common information subfield is dynamically selected, the selected location is explicitly or implicitly signaled in the preamble of the data unit 200. Alternatively, in some embodiments, the common information subfield is replicated in each sub-band of the data unit 200.

Figure 21:
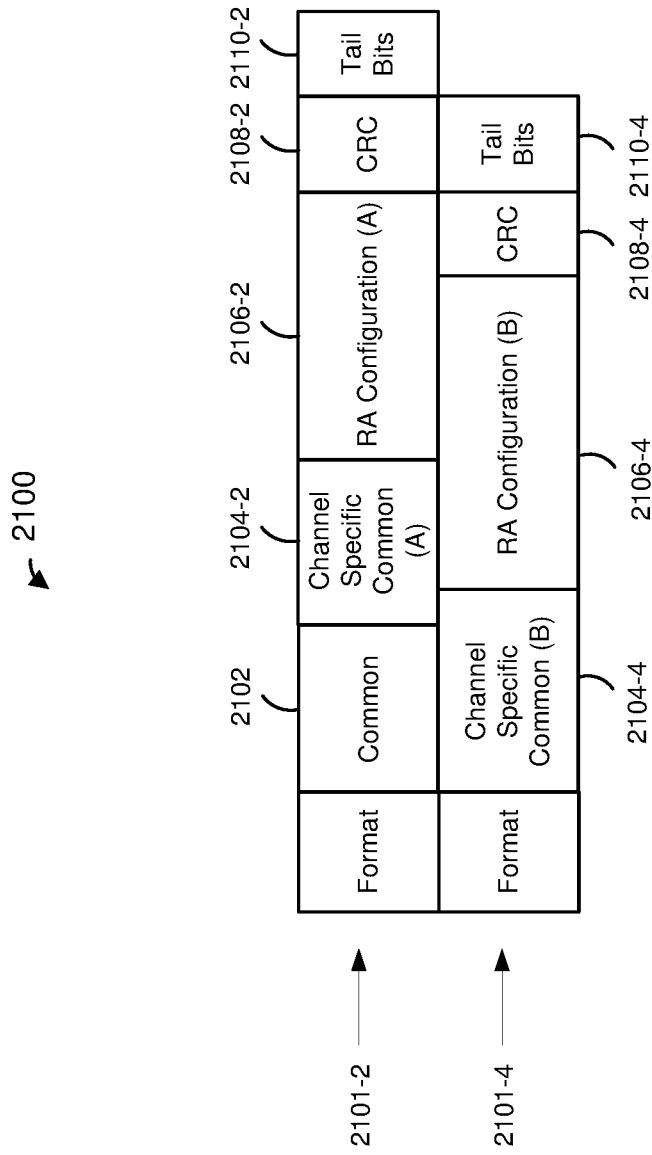
FIG. 21 is a diagram of a signal field of a data unit that occupies a bandwidth that is greater than the narrowest channel used by a WLAN and includes multiple sub-bands corresponding to each narrowest channel of the WLAN, according to an embodiment.

FIG. 21 is a diagram of a signal field 2100 of a data unit that occupies a bandwidth that is greater than the narrowest channel used by the WLAN 10 and includes multiple sub-bands corresponding to each narrowest channel of the WLAN 10, according to an embodiment. For example, the signal field 2100 is included in a data unit that occupies a 40 MHz bandwidth and includes two 20 MHz sub-bands corresponding to two 20 MHz channels of the WLAN 10, in an embodiment. In an embodiment, the signal field 2100 corresponds to the HE-SIG-B 222 of the data unit 200 of FIG. 2. For ease of explanation, the signal field 2100 is described with reference to the data unit 200 of FIG. 2. However, the signal field 2100 is used with a data unit different from the data unit 200 of FIG. 2, in some embodiments.

The signal field 2100 includes a first signal field portion 2101-2 corresponding to a first sub-band of the data unit 200 and a second signal field portion 2101-4 corresponding to a second sub-band of the data unit 200. In an embodiment, the first sub-band corresponds to the primary 20 MHz channel of the WLAN 10 and the second sub-band corresponds to the non-primary, or secondary, 20 MHz channel of the WLAN 10. In another embodiment, the second sub-band corresponds to the primary 20 MHz channel of the WLAN 10 and the first sub-band corresponds to the non-primary, or secondary, 20 MHz channel of the WLAN 10. The first signal field portion 2101-2 includes a common information subfield 2102, a channel specific common information subfield 2104-2, and RA configuration subfield 2106-2. The first signal field portion 2101-2 also includes CRC bits 2108-2 and tail bits 2110-2. The second signal field portion 2101-2 includes a channel specific common information subfield 2104-2 and RA configuration subfield 2106-4. The second signal field portion 2101-2 also includes CRC bits 2108-4 and tail bits 2110-4.

In an embodiment, the common information subfield 2102 generally includes information commonly needed by all intended recipients of the data unit 200, in an embodiment. For example, the common information subfield 2102 includes one or more of the additional subfields 402-8 described above with respect to FIG. 4B, in an embodiment. Additionally or alternatively, the common information subfield 2102 includes scheduling information that signals, to the client stations 25 that are intended receipts of the data unit 200, the particular sub-bands of the data unit 200 in which the client stations 25 are scheduled to receive data, in an embodiment. In the embodiment of FIG. 21, the common information subfield 2102 is included in the first signal field portion 2101-2 corresponding to the primary channel of the WLAN 10. In another embodiment, location of the common information subfield 2102 is dynamically selected by the AP 14. In yet another embodiment, the common information subfield is replicated in the first signal field portion 2101-2 and in the second signal field portion 2101-4.

Each channel specific common information subfield 2104 includes information commonly needed by client stations 25 that are scheduled to receive data in the sub-band that includes the channel specific common element 2104, in an embodiment. For example, each channel specific common information subfield 2104 includes a resource allocation subfield that indicates a mapping between subcarrier blocks (e.g., basic resource units, as described above) and resource units included in the corresponding sub-band of the data unit 200, in an embodiment. Similarly, each RA configuration subfield 2106 includes configuration information for resource units included in the corresponding sub-band of the data unit 200, in an embodiment. In an embodiment, each channel specific common information subfield 2104 is generally the same as or similar to the resource allocation subfield 702-6 of FIG. 7, and each of the RA configuration subfield 2106 includes one or more RA configuration subfields the same as or similar to the RA configuration subfields 702-4 of FIG. 7. In other embodiments, the channel specific common information subfields 2104 are different from the resource allocation subfield 702-2 of FIG. 7 and/or the RA configuration subfields 2106 include one or more RA configuration subfields that are different from the RA configuration subfields 702-4 of FIG. 7.

In some embodiments, padding bits are added to one or more of the first signal field portion 2101-2 and the second signal field portion 2101-4 to equalize the lengths of the first signal field portion 2101-2 and in the second signal field portion 2101-4. The padding bits are added to the information bits to be included in the first signal field portion 2101-2 and/or in the second signal field portion 2101-4 before encoding the corresponding signal field portion and/or after encoding the corresponding signal field portion, in various embodiments.

Figure 22:
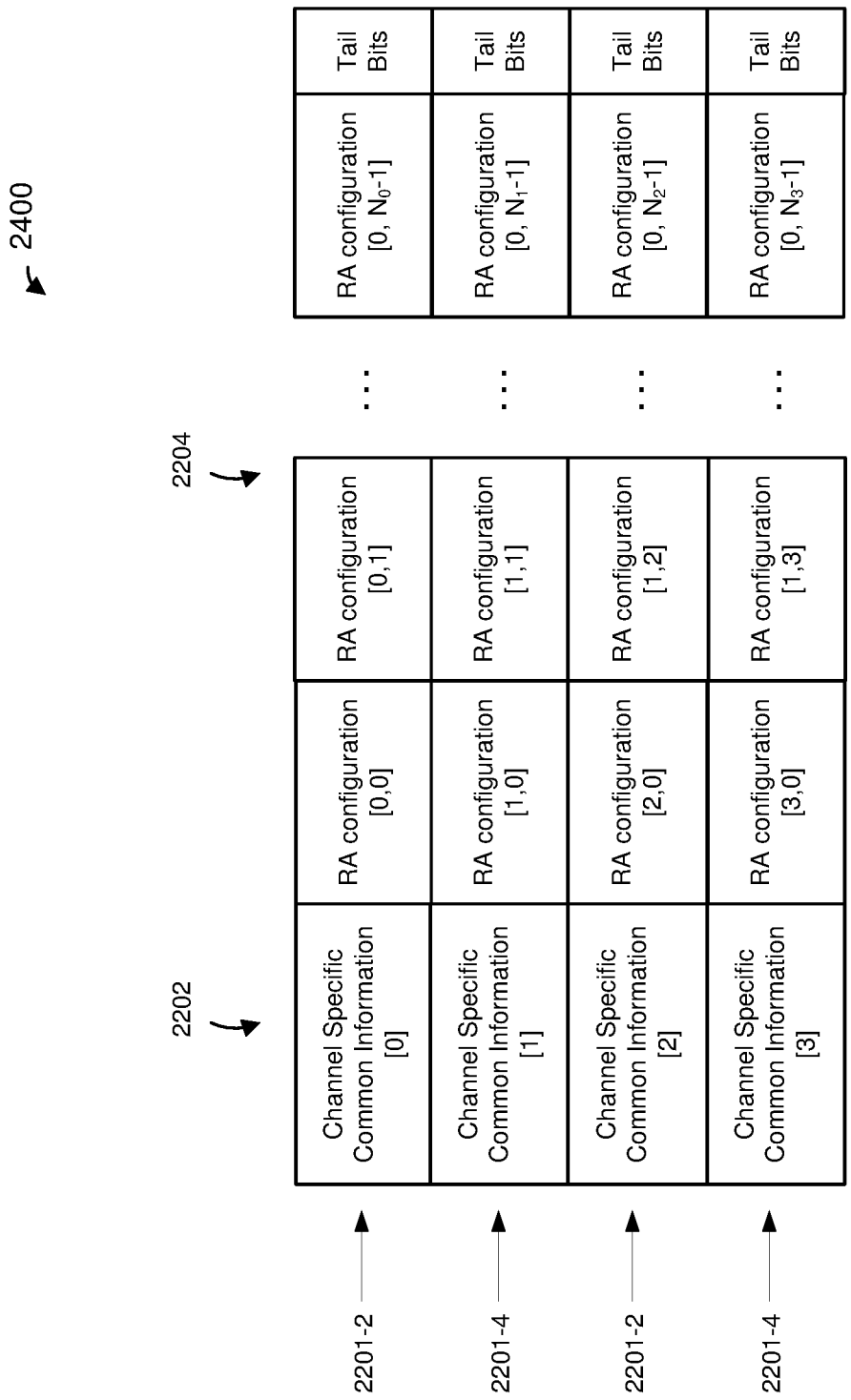
FIG. 22 is a diagram of a signal field of a data unit that occupies a bandwidth that is greater than the narrowest channel used by a WLAN and includes multiple sub-bands corresponding to each narrowest channel of the WLAN, according to another embodiment.

FIG. 22 is a diagram of a signal field 2200 of a data unit that occupies a bandwidth that is greater than the narrowest channel used by the WLAN 10 and includes multiple sub-bands corresponding to each narrowest channel of the WLAN 10, according to another embodiment. For example, the signal field 2200 is included in a data unit that occupies an 80 MHz bandwidth and includes four 20 MHz sub-bands corresponding to four 20 MHz channels of the WLAN 10, in an embodiment. In an embodiment, the signal field 2200 corresponds to the HE-SIG-B 222 of the data unit 200 of FIG. 2. For ease of explanation, the signal field 2200 is described with reference to the data unit 200 of FIG. 2. However, the signal field 2200 is used with a data unit different from the data unit 200 of FIG. 2, in some embodiments.

The signal field 2200 is generally similar to the signal field 2100 of FIG. 21 except that the signal field 2200 omits the common information subfield 2102, in an embodiment. The signal field 2200 includes four signal field portions 2201 corresponding to the four 20 MHz sub-bands of the data unit 200, in the illustrated embodiment. Each of the signal field portions 2204 includes a respective channel specific common information subfield 2204 and a plurality of RA configuration subfields 2204. Each channel specific common information subfield 2202 includes information commonly needed by the client stations 25 that are intended recipients of the data unit 200, in an embodiment. Additionally, each channel specific common information subfield 2202 indicates a mapping between subcarrier blocks (e.g., basic resource units, as described above) and resource units included in the corresponding sub-band of the data unit 200, in an embodiment. The RA configuration subfields 2204 include configuration information for respective resource units in the data unit 200. In an embodiment, the RA configuration subfields 2204 included in a particular sub-band include configuration information for resource units included in the particular sub-band of the data unit 200. In another embodiment, some of the RA configuration subfields 2204 are redistributed to other sub-bands in order to more evenly distribute the RA configuration subfields 2204 across the different sub-bands of the data unit 200.

In an embodiment, RA configuration subfields 2204 in a particular signal field portion 2201 correspond to resource unit allocations in the corresponding sub-band of the data unit 200 and include configuration information for the resource unit allocations in the corresponding sub-band of the data unit 200. In some embodiments, resource allocation in the data unit 200 is such that resource unit allocations in the data unit 200 are not evenly distributed in the sub-bands of the data unit 200, in at least some situations. For example, a first sub-band of the data unit 200 includes a greater number of resource allocations and/or a greater number of users scheduled in the resource allocations as compared to the number of resource unit allocations and/or number of scheduled users in a second sub-band of the data unit 200. In some such embodiments and/or scenarios, RA configuration subfield redistribution is used to more evenly distribute the RA configuration subfields 2204 among the signal field portions 2201.

In an embodiment, at least one of the multiple signal field portions includes one or more RA configuration subfields corresponding to one or more users scheduled to receive data in the resource unit that spans the multiple sub-bands.

The one or more RA configuration subfields are placed in one or more of the signal field portions in any suitable manner. For example, the one or more RA configuration subfields are placed in a first signal field portion until the first signal field portion is filled, then one or more of the remaining RA configuration subfields are place in a second signal field portion until the second signal field portion is filled, and so on, in some embodiments. In some such embodiments, the order of placement of RA configuration subfields in signal field portions is predetermined and is known at the receiver a priori. Alternatively, the order of placement of RA configuration subfields in signal field portions is signaled to the receiving devices, for example, in one or more of (i) another subfield of the HE-SIG-B 222, (ii) the SIG-A field 220, (iii) a management frame transmitted prior to transmission of the data unit 200, (iv) a control frame transmitted prior to transmission of the data unit 200, etc., in some embodiments.

In another embodiment, the one or more RA configuration subfields are equally or almost equally distributed among the multiple signal field portions. For example, a first subset of subfields of RA configuration subfields (e.g., a first subset of consecutive RA configuration subfields) is placed in a first signal field portion, a second subset of RA configuration subfields (e.g., a second subset of consecutive RA configuration subfields) is placed in a second signal field portion, and so on, wherein the subsets of RA configuration subfields are of equal or almost equal sizes, in an embodiment. In an embodiment, the RA configuration subfields are distributed among the multiple signal field portions by placing the RA configuration subfields in the signal field portion in a round robin manner.

In some embodiments, the one or more RA configuration subfields are dynamically distributed to the multiple signal field portions. An indication of a number of RA configuration subfields in each of the signal field portions is included, for example, in a common subfield or in a channel specific subfield in one or more of the multiple signal field portions, or is included in the HE-SIG-A 220, in some such embodiments. Alternatively, in another embodiment, the one or more RA configuration subfields are duplicated in each of the multiple signal field portions.

Figure 23:
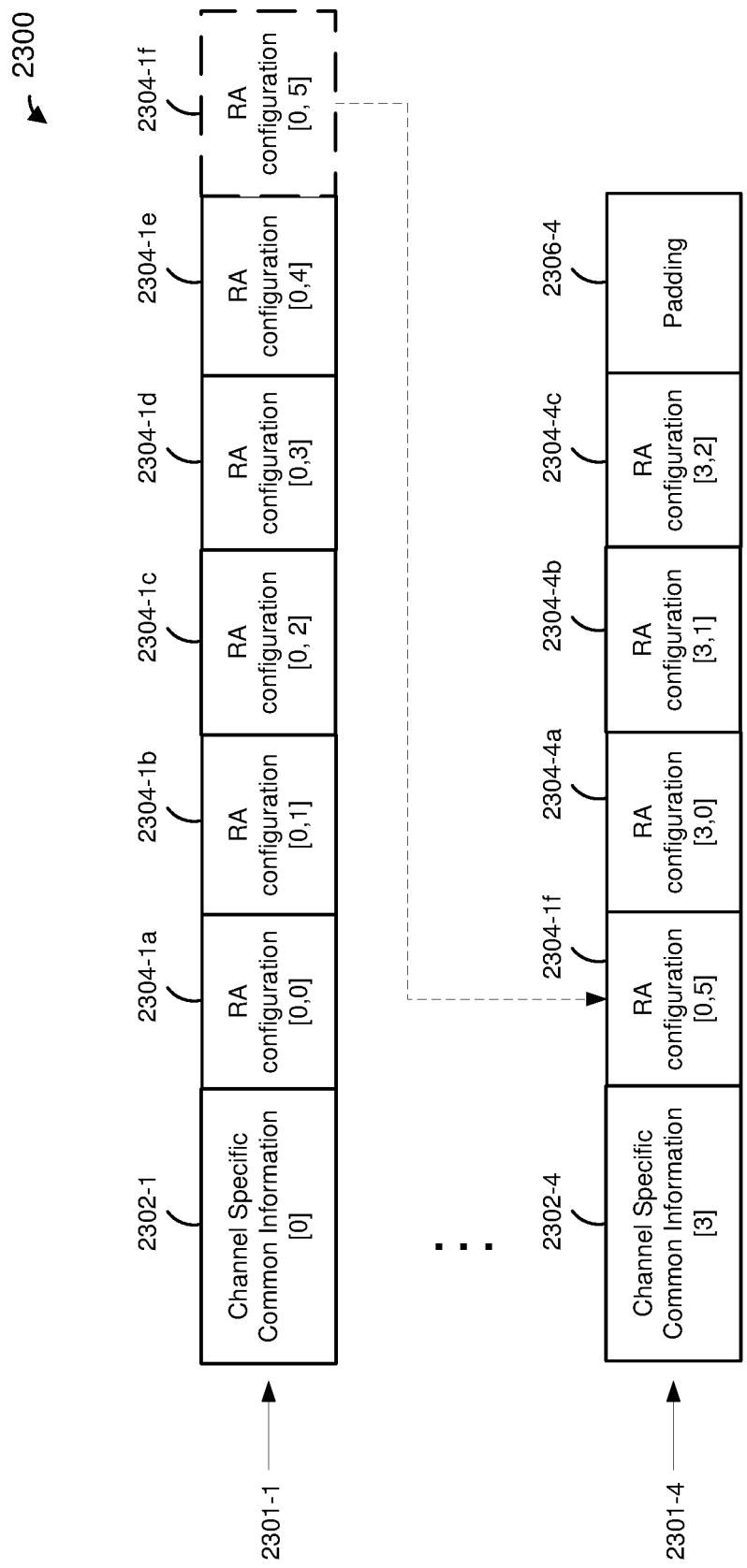
FIG. 23 is a diagram of a signal field included in a data unit in which resource allocation is unevenly distributed among a plurality of sub-bands, according to an embodiment.

FIG. 23 is a diagram of a signal field 2300 included in a data unit, such as the data unit 200, in which resource allocation is unevenly distributed among a plurality of sub-bands, according to an embodiment. The signal field 2300 is generally similar to the signal field 2200 of FIG. 22. The signal field 2300 includes a plurality of signal field portions 2301, including a first signal field portion 2301-1 corresponding to a first sub-band of the data unit and a fourth signal field portion 2301-4 corresponding to a fourth sub-band of the data unit, in an embodiment. In an embodiment, the first sub-band of the data unit includes a greater number of resource unit allocations and/or a greater number of scheduled users as compared to the fourth sub-band of the data unit. For example, the first sub-band of the data unit includes six resource unit allocations, and the fourth sub-band of the data unit includes three resource unit allocations, in the illustrated embodiment.

Each signal field portion 2301 includes a set of one or more RA configuration subfields 2304. Generally, RA configuration subfields 2304 in a particular signal field portion 2301 correspond to the resource unit allocations in the corresponding sub-band of the data unit. Thus, for example, the first signal field portion 2301-1 includes a set of six RA configuration subfields 2304-1 corresponding to six resource unit allocations in the first sub-band of the data unit, and the fourth signal field portion 2301-4 includes a set of three six RA configuration subfields 2304-4 corresponding to three resource unit allocations in the fourth sub-band of the data unit. In another embodiment, redistribution is used to more evenly distribute RA configuration subfields 2204 among signal field portions 2301. For example, one or more of the RA configuration subfields 2304-1 corresponding to six resource unit allocations in the first sub-band of the data unit are moved from the first signal field portion 2301-1 to the fourth signal field portion 2301-3, in an embodiment. For example, in the illustrated embodiment, the RA configuration subfield 2304-1f corresponding to the last resource unit allocation in the first sub-band is prepended to the set of RA configuration subfields 2304-4 in the fourth signal field portion 2301-4. This redistribution of RA configuration subfields 2304 results in five RA configuration subfields 2304 in the first signal field portion 2301-1 and four RA configuration subfields 2304 in the fourth signal field portion 2301-4. In an embodiment, padding bits are added to one or more of the signal field portions 2301 to equalize the lengths of the RA confirmation subfields 2304 in each of the signal field portions 2301. For example, padding bits 2306-4 are added to the set of RA configuration subfields 2304 in the fourth signal field portion 2301-4 to equalize the length of the fourth signal field portion 2304-4 with the first signal field portion 2301-1, in the illustrated embodiment.

Figure 24:
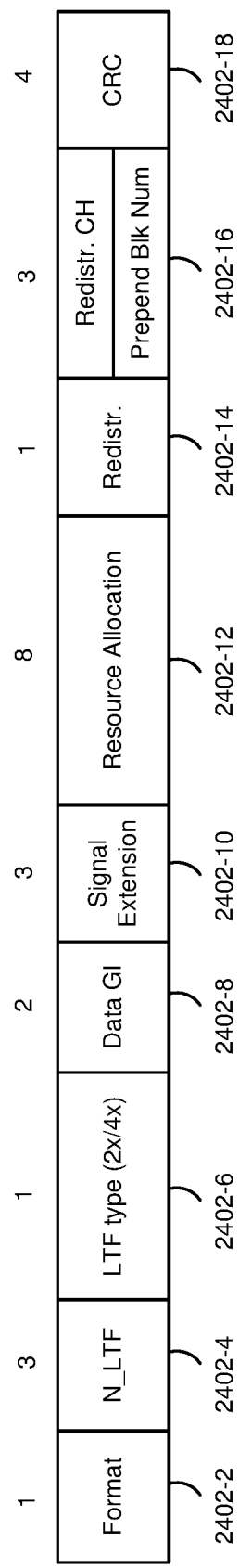
FIG. 24 is a diagram of a channel specific common subfield, according to an embodiment.

FIG. 24 is a diagram of a channel specific common subfield 2400, according to an embodiment. In an embodiment, the channel specific common subfield 2400 corresponds to each of the channel specific common subfields 2202 of FIG. 22 or each of the channel specific common subfields 2302 of FIG. 23. The channel specific common subfield 2400, itself, includes a plurality of subfields 2402. Bit allocation for the subfields 2402, according to an example embodiment, are illustrated above the subfields 2402 in FIG. 24. Other bit allocations are used for the subfields 2402, in other embodiments. In an embodiment, the channel specific common subfield 2400 is included in the HE-SIG-B field 222 of the data unit 200 of FIG. 2. For ease of explanation, the channel specific common subfield 2400 is described with reference to the data unit 200 of FIG. 2. However, the channel specific common subfield 2400 is included in suitable data units different from the data unit 200 of FIG. 2, in some embodiments.

The subfields 2402 include a format subfield 2402-2, a number of LTF fields (N_LTF) subfield 2402-04, a type of LTF subfield 2402-6, a data GI subfield 2402-6, a signal extension subfield 2402-10, a resource allocation (RA) subfield 2402-12, a redistribution subfield 2402-14, a redistribution channel/prepend block number subfield 2402-16, and CRC bits 2402-18. The format subfield 2402-2 includes an indication of a format of the data unit 2000, such as whether the data unit 200 is an OFDM data unit or an OFDMA data unit, in an embodiment. The N_LTF subfield 2402-4 includes an indication of a number of LTF fields included in the data unit 200. The type of LTF subfield 2402-6 includes an indication of a type of LTF compression used with the LTF fields included in the data unit 200. For example, the type of LTF subfield 2402-6 indicates whether 2× or 4× compression used with the with the LTF fields included in the data unit 200. The data GI subfield 2402-8 includes an indication of a guard interval used with OFDM symbols of the data portion 240 of the data unit 200. The signal extension subfield 2402-10 includes an indication of whether or not and extension field is appended to the data unit 200 and/or an indication of a length of the extension field, in embodiments. In some embodiments, one or more of the format subfield 2402-2, the N_LTF subfield 2402-04, the type of LTF subfield 2402-6, the data GI subfield 2402-6, and the signal extension subfield 2402-10 are included in the HE-SIG-A 220 of the data unit 200. In such embodiments, the one or more of the format subfield 2402-2, the number of N_LTF subfield 2402-04, the type of LTF subfield 2402-6, the data GI subfield 2402-6, and the signal extension subfield 2402-10 that are included in the HE-SIG-A 220 of the data unit 200 are omitted from the HE-SIG-B field 222 of the data unit 200.

In an embodiment, the RA subfield 2402-12 indicates resource unit allocations in the corresponding sub-band of the data unit 200 (i.e., the sub-band that includes the channel specific information subfield 2400), in an embodiment. In an embodiment, the RA subfield 2402-12 also indicates a number of client stations 25 scheduled to receive data in each of the resource units allocated in the corresponding sub-band of the data unit 200. In an embodiment, a receiving device determines, based on the RA subfield 2402-12, the number of resource units in the corresponding sub-band of the data unit 200. The receiving device is additionally able to determine which ones of the resource units, if any, are multi-user resource units, and the specific number of users scheduled in each multi-user resource unit, in an embodiment. Such information, in combination with the redistribution information provided by the subfields 2402-12 and 2402-14, allows the receiving device to determine the number and the size of the RA configuration subfields included in the corresponding channel, and the therefore deterministically decode the RA configuration subfields, in an embodiment.

The redistribution subfield 2402-14 and the redistribution channel/prepend block number subfield 2402-16 indicate whether any RA subfields from the sub-band that includes the channel specific common subfield 2400 are relocated to another sub-band, or whether any RA subfields from other sub-bands of the data unit 200 are relocated to the sub-band that includes the channel specific common subfield 2400, in an embodiment. For example, the redistribution subfield 2402-14 includes one bit set to the value of logic one (1) to indicate that one or more RA configuration subfields corresponding from the sub-band of the data unit 200 that includes the channel specific common subfield 2400 are redistributed to other sub-bands of the data unit 200, and set to a logic zero (0) to indicate that none of the RA configuration sub-fields corresponding to one or more resource units in the sub-band of the data unit 200 in which the channel specific common subfield 2400 is being transmitted are redistributed to other sub-bands of the data unit 200, or vice versa, in an embodiment.

The redistribution channel/prepend block number subfield 2402-16 is interpreted depending on the value of the redistribution subfield 2402-12, in an embodiment. In an embodiment, when the redistribution subfield 2402-12 indicates that one or more RA configuration subfields corresponding to one or more resource units in the sub-band of the data unit 200 in which the channel specific common subfield 2400 is being transmitted are redistributed to other sub-bands of the data unit 200, the redistribution channel/prepend block number subfield 2402-16 includes an indication of the channel to which the one or more RA configuration subfields are redistributed. In an embodiment, a value of the redistribution channel/prepend block number subfield 2402-16 that corresponds to the channel in which the channel specific common subfield 2400 indicates that no redistribution for this channel is performed.

On the other hand, if the redistribution subfield 2402-12 indicates that none of the RA configuration subfields corresponding to resource units in the corresponding sub-band of the data unit 200 are redistributed to signal field portions in other sub-bands of the data unit 200, then the redistribution channel/prepend block number subfield 2402-16 includes an indication of a number of RA configuration subfields that are redistributed to the corresponding subband of the data unit 200, in an embodiment. In an embodiment, the redistribution channel/prepend block number subfield 2402-16 includes an indication of a number of RA configuration subfields that are pre-pended to the RA configuration subfields corresponding to the sub-band of the data unit 200 in which the channel specific common subfield 2400 is being transmitted (e.g., included immediately following the corresponding channel specific common information subfield 2400), in an embodiment.

As a more specific example, in an embodiment in which the channel specific common subfield 2400 corresponds to the channel specific common subfields 2302 of FIG. 23, the redistribution subfield 2402-14 in the channel specific common subfield 2302-1 in the first signal field portion 2301-1 is set to the value of logic one (1) to indicate that at least one RA configuration subfield 2304-1 in the set of RA configuration subfields 2304 corresponding to the first sub-band of the data unit is moved out of the first signal field portion 2301-1, in an embodiment. Further, the redistribution channel/prepend block number subfield 2402-14 in in the channel specific common subfield 2305-1 is set to indicate the "move to" signal field portion in the fourth signal field portion 2301-4 corresponding to the fourth sub-band. Continuing with the same embodiment, the redistribution subfield 2402-14 in the channel specific common subfield 2301-4 in the fourth signal field portion 2301-4 is set to the value of logic zero (0) to indicate that none of the RA configuration subfields 2304-4 in the set of RA configuration subfields corresponding to the fourth sub-band of the data unit is moved out of the fourth signal field portion 2301-4, in an embodiment. Additionally, the redistribution channel/prepend block number subfield 2402-14 in in the channel specific common subfield 2302-4 in the fourth signal field portion 2301-4 is set to indicate the one RA configuration subfield 2304 is prepended to the set of RA configuration subfields 2304 corresponding to the fourth sub-band of the data unit.

Referring still to FIG. 23, in an embodiment, a receiver needs to only decode the channel specific common subfield 2302-1 in the first signal field portion 2302-1 in order to properly receive and decode all of the RA configuration subfields 2304 corresponding to the first sub-band of the data unit, including the RA configuration subfield [0, 5] which is located in the fourth signal field portion 2301-4. Similarly, a receiver needs to only decode the channel specific common subfield 2302-4 in the fourth signal field portion 2302-4 in order to properly receive and decode all of the RA configuration subfields 2304-4 corresponding to the fourth sub-band of the data unit, in an embodiment. For example, the receiver determines, based on the redistribution channel/prepend block number subfield 2402-14 in the channel specific common [3] subfield 2302-4, that the signal field portion 2301-4 includes one redistributed RA configuration subfield 2304 prepended to the set of RA configuration subfields 2304-4 corresponding to the fourth sub-band of the data unit and, accordingly, determines that the set of RA configuration subfields 2304-4 begin at the second RA configuration subfield 2304 in the signal field portion 2301-4, in the illustrated embodiment.

Referring back to FIG. 24, in an embodiment, the RA subfield 2402-12 includes eight bits. In this embodiment, the RA subfield 2402-12 indicates one of 256 possible allocations for the resource units included in the corresponding channel in the data unit 200. In some embodiments, the RA subfield 2402-12 includes a number of bits that is greater than eight, and accommodates a number of possible allocations that is greater than 256. In yet another embodiment, the RA subfield 2402-12 includes fewer than eight bits.

The value of the eight-bit subfield 2402-12 indicates the number of resource units allocated in the corresponding channel and also indicates which ones of the resource units, if any, are multi-user resource units, in an embodiment. In some embodiments, some of the total possible allocations are excluded to reduce the total number of possibilities that need to be signaled by the RA subfield 2402-12. As an example, only a certain number, such as only one or two, of the resource units in the channel are allowed include a single basic resource unit (e.g., 26 OFDM tone block), while each of the other resource units in the channel is required to include multiple basic resource units in some embodiments. The one or two resource units that include only one basic resource units are used for client stations 25 that operate in range extension mode, in an embodiment.

In some embodiments, some of the possible allocations that do not utilize the center basic resource unit block (e.g., the center 26-tone block) are allowed to be used. In some embodiments, a minimum number of OFDM tones (or a minimum number of basic resource units) constraint is used for a resource unit to be available for multi-user allocation, in some embodiments. Accordingly, in such embodiments, only relatively larger resource units are allowed to be multi-user resource units. For example, a resource unit can be a multi-user resource unit only if the resource unit includes a number of OFDM tones that is equal to or greater than a certain threshold, such as 106 OFDM tones, in an embodiment. An indication of a resource unit that includes less than 106 OFDM tones also serves as an indication that the resource unit is a single user resource unit, in one such embodiment. In some embodiments in which the minimum size resource unit constraint is used for multi-user resource units, the RA subfield 2402-12 includes a reduced number of bits, such as fewer than eight bits.

In some embodiments and scenarios, at least one resource unit in the data unit 200 spans multiple sub-bands of the data unit 200. As an example, a resource unit includes 484 tones in a 40 MHz bandwidth that spans two 20 MHz sub-bands of the data unit 200, in an example embodiment and scenario. As another example, a resource unit includes 996 tones in an 80 MHz bandwidth that spans four 20 MHz sub-bands of the data unit 200, in an example embodiment and scenario. In an embodiment, each of the sub-bands spun by a single resource unit includes multiple signal field portions of the HE-SIG-B field 222 corresponding to the multiple sub-bands spun by the single resource unit. Each signal field portion includes a common channel specific field such as the common channel specific field 2400 of FIG. 24, in an embodiment. The common channel specific fields in different ones of the multiple signal field portions include same resource allocation information, in an embodiment. For example, the common channel specific fields in different ones of the multiple signal field portions include a same resource allocation sub-field 2402-14, wherein the resource allocation sub-field 24012-14 in each of the multiple signal field portions indicates resource allocation in the entire resource unit that spans the multiple sub-bands, in an embodiment. On the other hand, the common channel specific fields in different ones of the multiple signal field portions include different RA configuration subfield redistribution information, as will be explained in more detail below, in at least embodiments.

Figure 25:
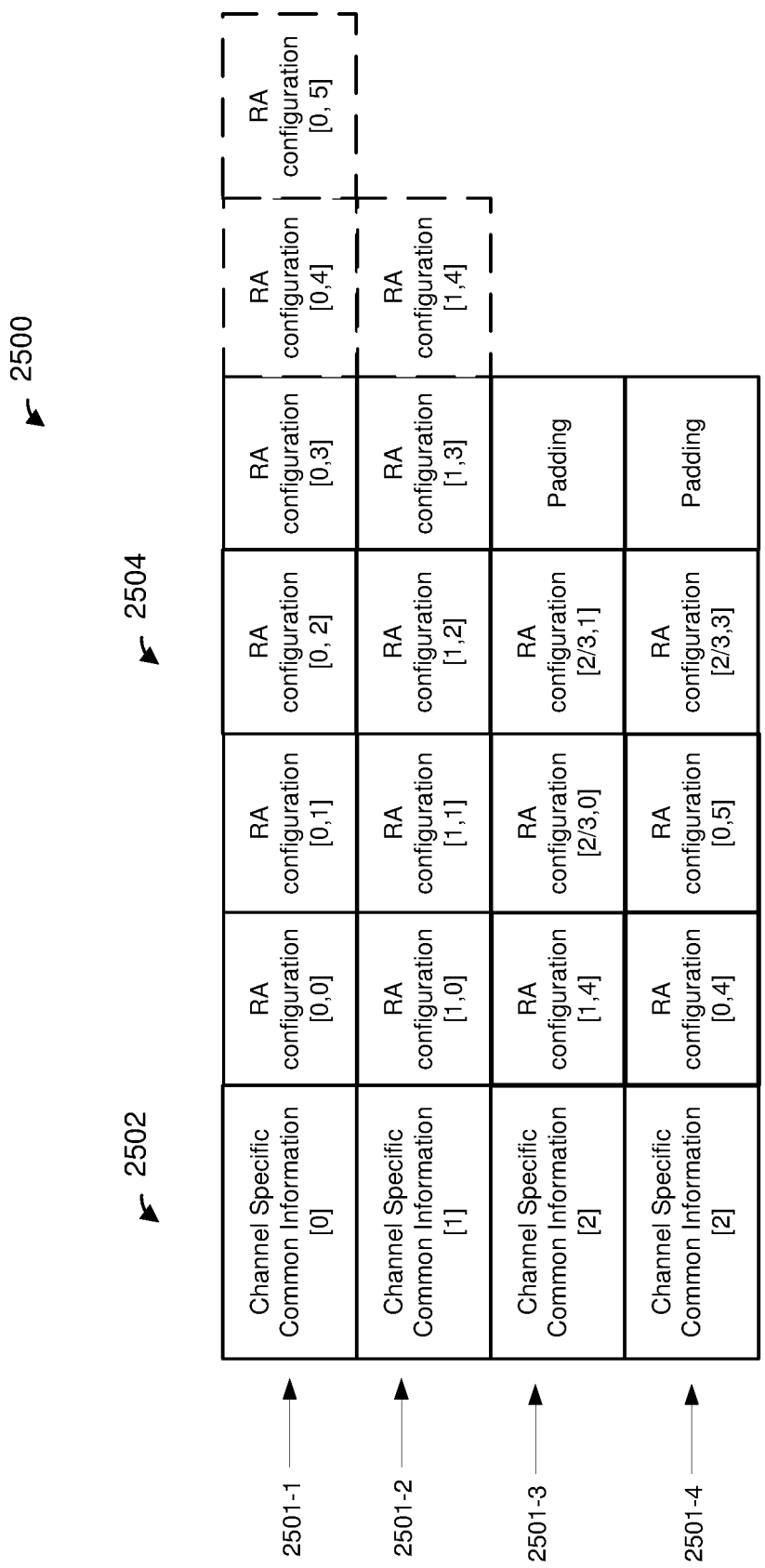
FIG. 25 is a diagram of a signal field included in a data unit in which a resource unit spans multiple sub-bands, according to an embodiment.

FIG. 25 is a diagram of a signal field 2500 included in a data unit, such as the data unit 200, in which a resource unit spans multiple sub-bands, according to an embodiment. The signal field 2500 includes four signal field portions 2501, including a first signal field portion 2501-1 corresponding to one or more resource units allocated in a first sub-band of the data unit, a second signal field portion 2501-2 corresponding to one or more resource units allocated in a second sub-band of the data unit, and a third signal field portion 2501-3 and a fourth signal field portion 2503-4 collectively corresponding to a single resource unit that spans two sub-bands of the data unit 200 (e.g., 40 MHz-wide resource unit that includes 484 OFDM tones). Six users are scheduled to receive data in the first sub-band of the data unit, five users are scheduled to receive data in the second sub-band of the data unit and three users are scheduled to receive data in the resource unit that spans the third sub-band and the fourth sub-band of the data unit, in the illustrated embodiment. Accordingly, the signal field 2500 includes six RA configuration subfields 2504 corresponding to the first sub-band of the data unit, five RA configuration subfields 2504 corresponding to the second sub-band of the data unit and three RA configuration subfields collectively corresponding to the third and fourth subfields of the data unit.

Each of the signal field portions 2501 includes a channel specific common subfield 2502 such as the channel specific common subfield 2400 of FIG. 24, in an embodiment. In an embodiment, the redistribution subfield 2402-12 in each of the first signal field portion 2501-1 and the second signal field portion 2501-2 is set (e.g., to logic 1) to indicate that at least one RA configuration subfield 2504 is moved out of the corresponding signal field portion 2501. Further, the redistribution channel/prepend block number subfield 2402-16 in the first signal field portion 2501-1 is set to indicate that the at least one RA configuration subfield 2504 that is moved out of the first signal field portion 2501-1 is moved to the third signal field portion 2501-3 (channel 3), and the redistribution channel/prepend block number subfield 2402-16 in the second signal field portion 2501-2 is set to indicate that the at least one RA configuration subfield 2504 that is moved out of the second signal field portion 2501-2 is moved to the fourth signal field portion 2501-4 (channel 4), in the illustrated embodiment.

With continued reference to FIG. 25, the channel specific common subfield 2502 in each of the third signal field portion 2502-3 and the fourth signal field portion 2502-4, corresponding to the single resource unit that spans the third sub-band and the fourth sub-band of the data unit, includes a same resource allocation subfield 2402-12 which includes allocation information for the entire resource unit that spans the third sub-band and the fourth sub-band, in an embodiment. On the other hand, channel specific common subfield 2502 in the third signal field portion 2501-3 and the fourth signal field portion 2501-4 include different redistribution information, in an embodiment. For example, in the illustrated embodiment, redistribution subfield 2402-14 in each of the third signal field portion 2501-3 and the fourth signal field portion 2501-4 is set (e.g., to logic 0) to indicate that at no of RA configuration subfields 2504 are moved out of the corresponding signal field portion 2501. But the redistribution channel/prepend block number subfield 2402-16 in the third signal field portion 2501-3 is set differently from the redistribution channel/prepend block number subfield 2402-16 in the fourth signal field portion 2501-4, in an embodiment. For example, the redistribution channel/prepend block number subfield 2402-16 in the fourth signal field portion 2501-3 is set to indicate that one RA configuration subfield is prepended in the third signal field portion 2501-3, and the redistribution channel/prepend block number subfield 2402-16 in the fourth signal field portion 2501-4 is set to indicate that two RA configuration subfields are prepended in the fourth signal field portion 2501-3, in the illustrated embodiment.

Figure 26A:
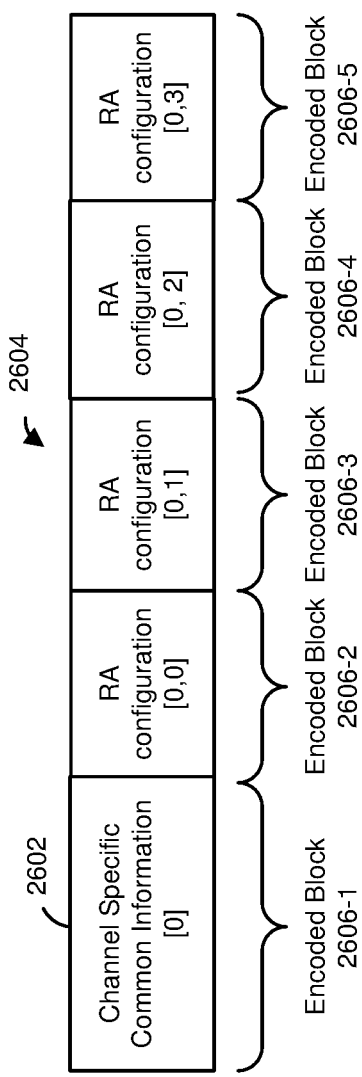
FIGS. 26A-26D are diagrams that illustrate different methods of encoding channel specific common information subfields and resource allocation configuration subfields, according to some embodiments.

The various channel specific common information subfields and RA configuration subfields described herein are encoded jointly, individually, or in blocks, in various embodiments. FIGS. 26A-26D are diagrams that illustrate different methods of encoding channel specific common information subfields and RA configuration subfields, according to some embodiments. Referring first to FIG. 26A, a signal field 2600 corresponds to the HE-SIG-B 222, or to a signal field portion of the HE-SIG-B 222 corresponding to a sub-band of the data unit 200, in embodiments. The signal field 2600 includes a common channel specific information subfield 2602 and a plurality of RA configuration subfields 2604, in embodiment. Although four RA configuration subfields 2604 are illustrated in FIG. 26A, the signal field 2600 includes a number of RA configuration subfields 2604 different than four (e.g., 1, 2, 3, 5, etc.), in other embodiments. The channel specific common subfield 2602 and each of the RA configuration subfields 2604 is each encoded as a separate block 2606, in the illustrated embodiment. The channel specific common subfield 2602 and the RA configuration subfields 2604 are encoded using BCC encoding, in an embodiment. Although not shown in FIG. 26A, the encoded blocks 2606 include respective CRC bits and respective tail bits, in an embodiment. In another embodiment, the channel specific common subfield 2602 and the RA configuration subfields 2604 are encoded using TBCC. In this embodiment, the encoded blocks 2606 omit tail bits.

Figure 26B:
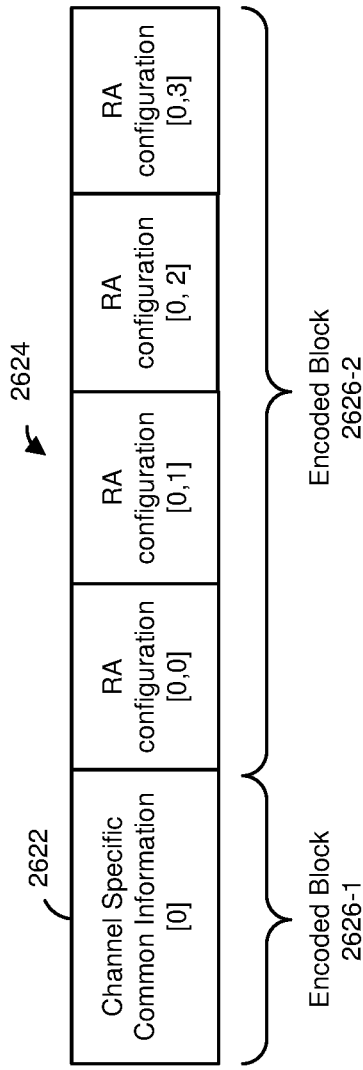

Referring now to FIG. 26B, a signal field 2620 corresponds to the HE-SIG-B 222, or to a signal field portion of the HE-SIG-B 222 corresponding to a sub-band of the data unit 200, in embodiments. The signal field 2620 includes a common channel specific information subfield 2622 and a plurality of RA configuration subfields 2624, in embodiment. Although four RA configuration subfields 2624 are illustrated in FIG. 26A, the signal field 2620 includes a number of RA configuration subfields 2624 different than four (e.g., 1, 2, 3, 5, etc.), in other embodiments. In the embodiment of FIG. 26B, the common channel specific information subfield 2622 is encoded as a first block 2626-1, and the plurality of RA configuration subfields 2624 are collectively encoded as a second block 2626-2. The channel specific common subfield 2622 and the RA configuration subfields 2624 are encoded using BCC encoding, in an embodiment. Although not shown in FIG. 26B, the encoded blocks 2626 include respective CRC bits and respective tail bits, in an embodiment. In another embodiment, the channel specific common subfield 2622 and the RA configuration subfields 2624 are encoded using TBCC. In this embodiment, encoded blocks 2626 omit tail bits.

Figures 26C, 26D:
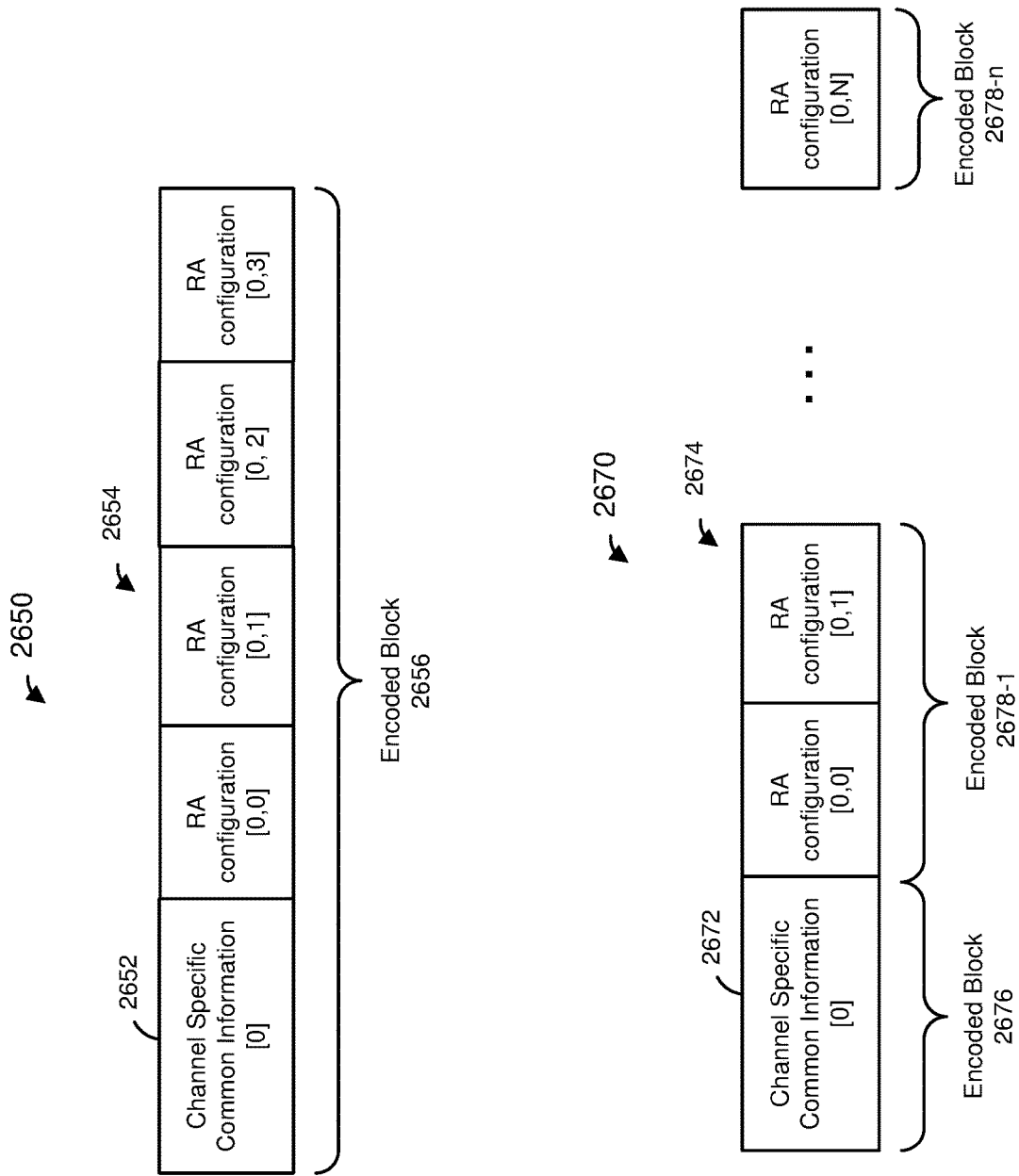

Referring now to FIG. 26C, a signal field 2650 corresponds to the HE-SIG-B 222, or to a signal field portion of the HE-SIG-B 222 corresponding to a sub-band of the data unit 200, in embodiments. The signal field 2650 includes a common channel specific information subfield 2652 and a plurality of RA configuration subfields 2654, in embodiment. Although four RA configuration subfields 2654 are illustrated in FIG. 26A, the signal field 2650 includes a number of RA configuration subfields 2654 different than four (e.g., 1, 2, 3, 5, etc.), in other embodiments. In the embodiment of FIG. 26C, the common channel specific information subfield 2652 and the plurality of RA configuration subfields 2654 are collectively encoded as a single block 2656. The channel specific common subfield 2652 and the RA configuration subfields 2654 are encoded using BCC encoding, in an embodiment. Although not shown in FIG. 26C, the encoded block 2656 includes CRC bits and tail bits, in an embodiment. In another embodiment, the channel specific common subfield 2652 and the RA configuration subfields 2654 are encoded using TBCC. In this embodiment, the encoded block 2656 omits tail bits.

Referring now to FIG. 26D, a signal field 2670 corresponds to the HE-SIG-B 222, or to a signal field portion of the HE-SIG-B 222 corresponding to a sub-band of the data unit 200, in embodiments. The signal field 2670 includes a channel specific common subfield 2672 and a plurality of RA configuration subfields 2674, in embodiment. In the embodiment of FIG. 26C, the common channel specific information subfield 2652 is encoded as a block 2676-1. The channel specific common subfield 2652 and the RA configuration subfields 2674 are encoded in groups, where each group of K RA configuration subfields 2674 is encoded as a separate block 2678, wherein K is a positive integer. In an embodiment, if the number N of RA configuration subfields 2674 in the signal field 2670 is not divisible by the number K of RA configuration subfields 2674 per coding group, the last L RA configuration subfields 2674 in the signal field 2670 are encoded as a separate block 2678, wherein L is a positive integer and wherein L<K. In the embodiment of FIG. 26D, K is equal to 2 and L is equal to 1. Accordingly, each group of two RA configuration subfields 2674, except for the last one RA configuration subfields 2674, is encoded as a separate block 2678, and the last one RA configuration subfield 2674 is encoded as a separate block 2678, in the illustrated embodiment.

The channel specific common subfield 2672 and the RA configuration subfields 2674 are encoded using BCC encoding, in an embodiment. Although not shown in FIG. 26D, the encoded blocks 2676 include respective CRC bits and respective tail bits, in an embodiment. Although not shown in FIG. 26D, each encoded block 2676, 2678 includes respective CRC bits and respective tail bits, in an embodiment. In another embodiment, the channel specific common subfield 2672 and the RA configuration subfields 2674 are encoded using TBCC. In this embodiment, the encoded block 2676, 2678 omit tail bits.

Figure 27:
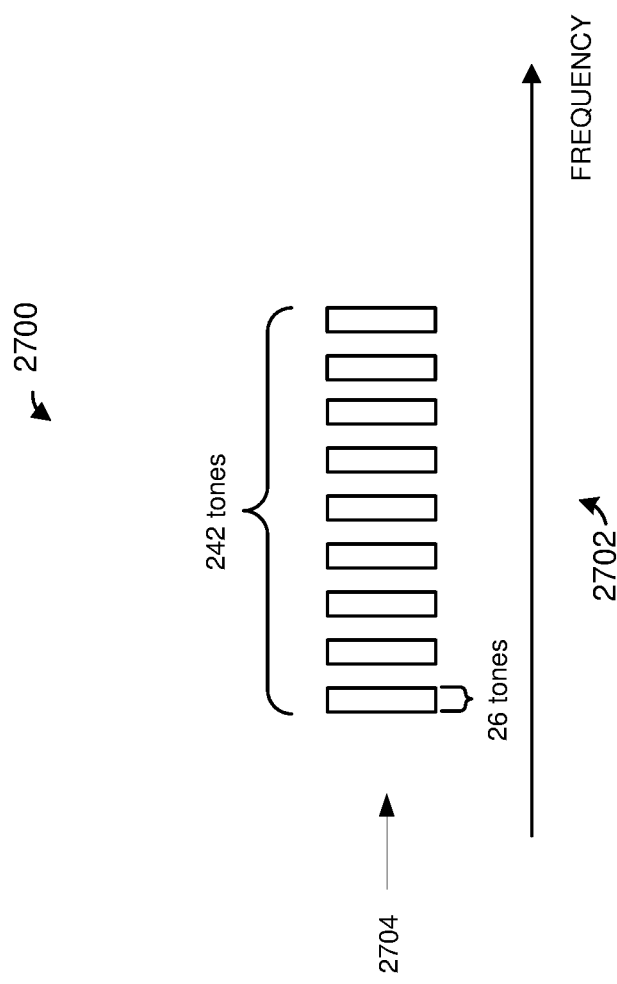
FIG. 27 is a diagram of a resource allocation scheme used for allocation of resources for a communication channel, according to an embodiment.

FIG. 27 is a diagram of a resource allocation scheme 2700 used for allocation of resources for a 20 MHz-wide communication channel, according to an embodiment. The resource allocation scheme 2700 is based on a tone plan that includes 242 data/pilot tones in the 20 MHz-wide communication channel, in an embodiment. The resource allocation scheme 250 is based on a tone plan 2702 that includes 242 data/pilot tones in the 20 MHz-wide communication channel, in an embodiment. The resource allocation scheme 2700 allocates basic resource unit blocks 2704 to resource units, wherein each resource unit comprises one or more of the basic resource unit blocks 2704, in an embodiment. Each basic resource unit block 2704 includes a respective subset of the 242 data/pilot tones, in an embodiment. For example, each basic resource unit 2704 includes 26 consecutive data/pilot tones, in the illustrated embodiment. Accordingly, the tone plan 2702 includes nine basic resource units 2704, collectively spanning 234 OFDM tones, and eight leftover tones, in this embodiment. The eight leftover tones remain unused in the resource allocation scheme 2700, according to an embodiment. In another embodiment, one or more of the leftover tones are combined with one or more of the resource units 2704. In yet another embodiment, the leftover tones are unused in some situations, and are combined with one or more of the basic resource units 254 in other situations. For example, if all of the basic resource units 2704 are allocated to a same resource unit, then the leftover tones are combined with the basic resource unit blocks 2704 to form a 242 tone resource unit, in an embodiment. On the other hand, if the basic resource units 2704 are allocated to multiple resource units, then the leftover tone remain unused, in an embodiment.

In an embodiment, resource allocation indication used with the resource allocation scheme 2700 includes a bitmap, wherein each bit in the bitmap corresponds to a particular basic resource unit. Thus, for example, in the embodiment of FIG. 27, a resource allocation bitmap used with the RA plan 2700 includes nine bits corresponding to the nine basic resource unit 2704, in an embodiment. A set of one or more consecutive bits that have a same value (e.g., 0 or 1) indicate allocation of the corresponding basic resource to a same resource unit, in an embodiment. On the other hand, a change in value between two consecutive bits in the bitmap (e.g., from 1 to 0 or from 0 to 1) indicates that the corresponding basic resource units are allocated to different resource units, in an embodiment. Accordingly, a change in value between two consecutive bits indicates a beginning of a new resource unit, in this embodiment. Such bitmap also indicates the total number of resource units allocated in the channel 2702, in an embodiment. As just an example the values of "110010100" of the resource allocation bitmap bits indicate that six resource units are allocated in the channel 2702, and that the six resource units respectively include 2, 2, 1, 1, 1 and 2 basic resource units, in an embodiment.

In an embodiment, if all of the basic resource units 2704 are allocated to a single resource unit in the data unit 200, then the leftover tones are included in the tone allocated for the single unit. On the other hand, if the basic resource units 2704 are respectively allocated to two or more resource units in the data unit 200, the leftover tones are not allocated to any of the resource units and are unused, in an embodiment. For example, in an embodiment, an indication that all of the basic resource units 2704 are allocated to a same resource unit also indicates allocation of the leftover tones to the same resource unit. Thus, for example, the value of "111111111" in the resource allocation bitmap indicates that all 242 tones in the channel 2702 are allocated to a single resource unit, in an embodiment.

Although the resource units 2704 are illustrated in FIG. 27 as each including 26 consecutive OFDM tones, the basic resource units 2704 include other suitable numbers of OFDM tones and/or least some of the basic resource units 2704 include at least some non-consecutive OFDM tones. Further, in some embodiments, a resource allocation scheme similar to the resource allocation scheme 2700 is used with data units that occupy communication channels with bandwidths other than 20 MHz. For example, a resource allocation scheme similar to the resource allocation scheme 2700 is used with data units that occupy 40 MHz-wide, 80 MHz-wide, 160 MHz-wide, etc., communication channels, in some embodiments and/or scenarios. As a more specific example, in various embodiments and scenarios that utilize basic resource units having 26 data/pilot tones, a resource allocation scheme used with a 40 MHz communication channel includes 19 basic resource units, a 40 MHz communication channel includes 38 basic resource units, and a 160 MHz communication channel includes 76 basic resource units. Accordingly, bitmaps used to signal resource allocation include 19, 28 and 76 bits for signaling allocation in 40 MHz-wide, 80 MHz-wide and 160 MHz-wide channels, respectively, in an embodiment.

Accordingly, the communication channel 2702 includes nine basic resource units, collectively spanning 234 OFDM tones, and eight leftover tones, in an embodiment. The leftover tones are located at any suitable locations within the communication channel 2702, in various embodiments. The eight leftover OFDM tones are unused by the allocation scheme 2700, in an embodiment. In another embodiment, the eight leftover tones are used in at least some situations. For example, one or more of the eight leftover tones are combined with one or more of the basic resource units 2704

Figure 28:
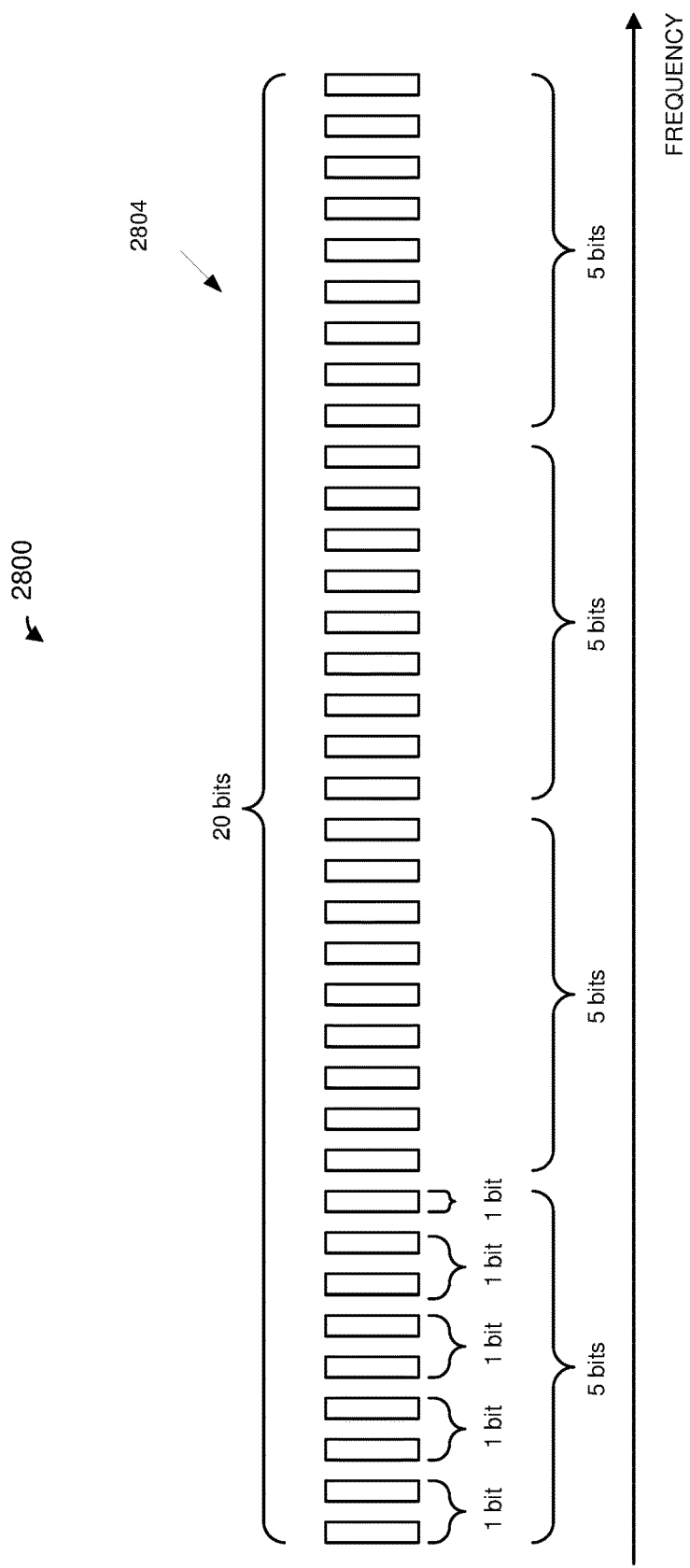
FIG. 28 is a diagram of another resource allocation scheme used for allocation of resources for a communication channel, according to an embodiment.

In some embodiments, a bitmap used for signaling resource allocation for at least some communication channels does not correspond to the number of basic resource units in the communication channel. For example, a resource allocation scheme utilizes fewer bits than the number of basic resource units for at least some communication channels, such as 80 MHz-wide and 160 MHz-wide communication channels, in an embodiment. FIG. 28 is a diagram of a resource allocation scheme 2800 for allocation of resources within a data unit that occupies an 80 MHz-wide communication channel, according to an embodiment. The resource allocation scheme 2800 is generally similar to the resource allocation scheme 2700 of FIG. 27, except that the resource allocation scheme 2800 groups multiple basic resource units 2804 such that a single bit is used to signal allocation of the multiple grouped basic resource units 2804, in an embodiment. For example, in the resource allocation scheme 2800, each 20 MHz sub-channel of the 80 MHz-wide channel includes four groups of basic resource units 2804, wherein each group includes two basic resource units 2804, and a single un-grouped basic resource unit 2804, in the illustrated embodiment. In this embodiment, a bitmap used to signal allocation in the 80 MHz-wide communication channel includes 20 bits, wherein respective 5-bit subsets are used to signal resource allocation in each 20 MHz sub-channel of the 80 MHz-wide channel. Because resource units are paired within each 20 MHz sub-channel of the 80 MHz channel, basic resource units in a particular 20 MHz can be allocated to a same resource unit irrespective of allocation in a neighboring 20 MHz sub-channel, in an embodiment. Thus, for example a value of "11111" of five bits that correspond to a particular 20 MHz sub-channel in the resource allocation scheme 2800 indicates that the corresponding 242 OFDM tone block is allocated to same resource unit, in an embodiment.

Figure 29A:
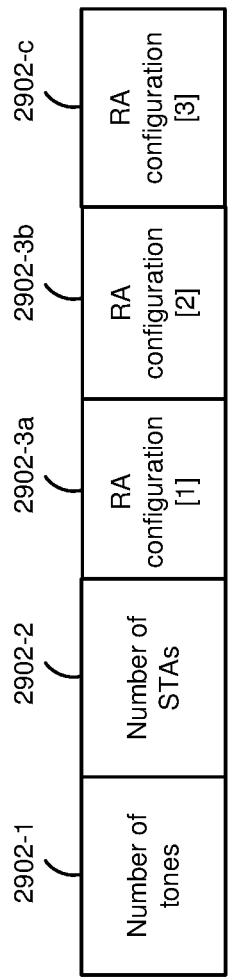
FIG. 29A is a diagram of a signal field, according to an embodiment.

In some embodiments described herein in which a resource unit occupies a cumulative bandwidth that is an integer multiple of 20 MHz (e.g., 20 MHz, 40 MHz, 80 MHz, etc.), resource allocation indication that indicates a mapping between basic resource units and resource units in the corresponding sub-band or sub-bands of the data unit is replaced with a shortened resource allocation indication that indicates a number of users allocated in the resource unit. FIG. 29A is a diagram of a signal field 2900, according to one such embodiment. Signal field 2900 corresponds to HE-SIG-B signal field portion in a sub-band that includes a single resource unit, or a portion of a single resource unit, according to an embodiment. The signal field 2900 includes a plurality of subfields 2902, including a number of tones subfield 2902-1, a number of users subfield 2902-2, and a plurality of RA configuration subfields 2902-3. The number of tones subfield 2902-1 indicates a number of OFDM tones (e.g., 242 tones, 484 tones, 996 tones, or 992×2 tones) in the single resource unit to which the signal field 2900 corresponds. In some embodiments, shortened RA indication is allowed to be used for a resource unit if a number of tones in the resource unit exceed a certain threshold number of tones. For example, shortened RA indication is allowed to be used with resource units that include a number of tones that is greater than or equal to 242 tones. In other embodiments, other minimum number of tones thresholds are used, such a minimum of 484 tones, a minimum of 996 tones, a minimum of two non-contiguous blocks of 996 tone (996×2), etc. In an embodiment, the particular threshold is determined by the bandwidth of the data unit 200. For example, in an embodiment, reduced RA indication is allowed only if a single RU covers the entire bandwidth of the data unit, such as in a case of 242-tone RU for a 20 MHz-wide data unit, a 484-tone RU for a 40 MHz-wide data unit, etc. In an embodiment, the particular threshold is determined by the AP and is signaled to client stations 25, for example in a management frame or a control frame transmitted by the AP. In yet another embodiment, the particular threshold is fixed and is known a prior to the AP and the client stations 25.

In an embodiment, the number of tones subfield 2902-1 includes two bits and, accordingly, is able to indicate a maximum of four possible numbers of tones. For example, in an embodiment in which a threshold of 242 tones is used, the value of "00" of the two bits indicates that no users are allocated in the corresponding resource unit, the value of "01" of the two bits indicates that the number of tones in the corresponding resource unit is 242, the value of "10" of the two bits indicates that the number of tones in the corresponding resource unit is 484, and the value of "11" of the two bits indicates that the number of tones in the corresponding resource unit is 996. As another example, in another embodiment in which a threshold of 242 tones is used, the value of "00" of the two bits indicates that the number of tones in the corresponding resource unit is 242, the value of "01" of the two bits indicates that the number of tones in the corresponding resource unit is 484, the value of "10" of the two bits indicates that the number of tones in the corresponding resource unit is 996, and the value of "11" of the two bits indicates that the number of tones in the corresponding resource unit is 996×2. As yet another example, in an embodiment in which a threshold of 484 tones is used, the value of "00" of the two bits indicates that no users are allocated in the corresponding resource unit, the value of "01" of the two bits indicates that the number of tones in the corresponding resource unit is 484, the value of "10" of the two bits indicates that the number of tones in the corresponding resource unit is 996, and the value of "11" of the two bits indicates that the number of tones in the corresponding resource unit is 996×2.

With continued reference to FIG. 29A, the number of users subfield 2902-2 indicates a number of client stations 25 that are scheduled in the corresponding resource unit, in an embodiment. In an embodiment, the number of users subfield 2902-3 includes three bits to indicate a maximum number of eight client stations 25. In other embodiments, the number of users subfield 2902-2 includes other suitable number of bits to indicate other suitable maximum numbers of users.

Figure 29B:
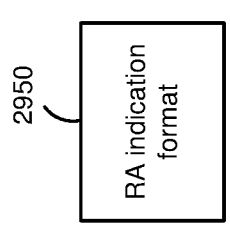
FIG. 29B is a diagram of a subfield that indicates format of resource allocation, according to an embodiment.

FIG. 29B is a diagram of a subfield 2950 that indicates format of resource allocation, according to an embodiment. In an embodiment, the subfield 2950 is included in the HE-SIG-A 220 or in the HE-SIG-B 222. In an embodiment, the subfield 2950 indicates the resource allocation indication format for each of one or more sub-channels of the data unit 200. For example, the subfield 2900 indicates four bits, with each bit corresponding to a particular one of four 20 MHz sub-bands of the data unit 200. Each bit is set to indicate whether regular resource allocation indication or shortened resource allocation indication is included in the HE-SIG-B field portion in the corresponding sub-band of the data unit. In another embodiment, the RA indication format subfield 2950 includes a single bit that indicates whether the regular RA indication or the shortened RA indication is included in each HE-SIG-B signal portion corresponding to each sub-band of the data unit. In an embodiment, the shortened resource allocation indication includes the number of tones subfield 2902-1 and the number of users subfield 2902-2, in an embodiment.

Referring back to FIG. 2, in an embodiment, a duration indication in the L-SIG 215 is used for medium protection. For example, a client station that is not an intended recipient of the data unit 200 will calculate a duration based on a rate and a length (e.g., in number of bytes) indicated in the L-SIG field 212, and will refrain from accessing the medium for a time corresponding to the calculated duration, according to an embodiment. In an embodiment, the rate and the length in the L-SIG field 212 are set such that a client station configured to operate according to a legacy communication protocol will calculate, based the rate and the length, a packet duration (T) that corresponds to, or at least approximates, the actual duration of the data unit 200. For example, the rate is set to indicate a lowest rate defined by the IEEE 802.11a Standard (i.e., 6 Mbps), and the length is set to a value computed such that packet duration computed using the lowest rate at least approximates the actual duration of the data unit 200, in one embodiment.

In an embodiment, the HE-SIG-A 220 includes an additional length indication to indicate a length extension mode used by non-legacy client stations to calculate a duration of the data unit 200. Length extension mode allows a non-legacy client station to determining a more accurate duration of the data unit 200, in at least some embodiments. In an embodiment, the additional length indication included in the HE-SIG-A 220 includes one bit set to a value of logic one (1) to indicate that the duration of the data unit 200 is twice (2×) the duration calculated based on the duration indication (e.g., rate and length) in the L-SIG 212, or is set to a value of logic zero (0) to indicate that the duration of the data unit 200 corresponds to (1×) the duration calculated based on the duration indication (e.g., rate and length) in the L-SIG 212, or vice versa, in an embodiment. In another embodiment, the additional length indication included in the HE-SIG-A indicates an MCS to be used for calculating the duration of the data unit based on the length indication included in the L-SIG 212. For example, the HE-SIG-A 220 includes one bit set to a value of logic zero (0) to indicate that MCS0 corresponding to a data rate of 6 MBPS, should be used to determine the duration based on the length indication included in the L-SIG 212, or is set to a value of logic one (1) to indicate that MCS1 corresponding to a data rate of 12 MBPS, should be used to determine the duration based on the length indication included in the L-SIG 212, or vice versa, in an embodiment. In other embodiments, the additional length indication in the HE-SIG-A 220 includes suitable numbers of bits greater than one bit to provide a better granularity for signaling extension of the length indication in L-SIG 212.

In another embodiment, the additional length indication included in the HE-SIG-A field includes n bits, where n is an integer greater than zero. The additional length indication is used to calculate an additional duration that is then added to the duration calculated based on the L-SIG 212, in an embodiment. In an embodiment, the additional length indication includes an indication of a number of bytes, and a receiving non-legacy client station determines an additional duration based on the indicated number of bytes and using a predetermined data rate, such as 6 MBPS, 12 MBPS or another suitable data rate, in an embodiment. In another embodiment, the additional length indication in the HE-SIG-A 220 directly indicates additional duration using a predetermined unit of time such as milliseconds.

In some embodiments, the additional length indication is included in L-SIG 212 itself, and is omitted from the HE-SIG-A 220. For example, one or more bits in the L-SIG 212 that are reserved according to the legacy communication protocol(s) is/are used to include additional length indication such as an additional length indication described above. Additionally or alternatively, value of the length indication in the L-SIG 212 is used as an additional length indication, in some embodiments. Generally, according to the legacy communication protocols, the value of the length indication included in the L-SIG 212 is constrained to be a multiple of 3. In an embodiment, the value of the length indication in the L-SIG 212 is not constrained to be a multiple of 3. In an embodiment, a non-legacy client station utilizes the remainder obtained in dividing the value of the length indication in the L-SIG 212 by 3 as a length extension indicator to be used for calculating the duration of the data unit 200. For example, in an embodiment, if division of the value of the length indication in L-SIG 212 results in remainder of one (1), this indicates to the non-legacy client station that the duration calculated based on the duration indication (e.g., rate and length) in L-SIG 212 is to be multiplied by 2 (2×), or that a rate of 3 MBPS rather than the 6 MBPS rate indicated by the L-SIG 212 is to be used to calculate the duration. On the other hand, if division of the value of the length indication in L-SIG 212 results in remainder of two (2), this indicates to the non-legacy client station that the duration calculated based on the duration indication (e.g., rate and length) in L-SIG 212 is to be used as is (×1), in this embodiment.

In another embedment, if the value of the length indication in L-SIG 212 is divisible by 3 (i.e., remainder of 0), this indicates to a non-legacy client station that the duration calculated based on the duration indication (e.g., rate and length) in L-SIG 212 is to be used as is. On the other hand, if the value of the length indication in L-SIG 212 is not divisible by 3 (i.e., remainder of 1 or 2), this indicates to the non-legacy client station that the duration calculated based on the duration indication (e.g., rate and length) in L-SIG 212 is to be multiplied by 2 (2×), in this embodiment.

In addition to, or as an alternative to, explicit length extension mode indication described above, length extension mode is signaled implicitly by modulation of one or more OFDM symbols of the data unit 200, in some embodiments. For example, the data unit 200 includes an additional, duplicated, L-SIG that occupies an additional OFDM symbol immediately following L-SIG 212, in some embodiments. In an embodiment, if OFDM tones in the OFDM symbol corresponding to the duplicated L-SIG are modulated using the same modulation as OFDM tones in the OFDM symbol corresponding to the first L-SIG 212 (e.g., using BPSK modulation), this indicates to a non-legacy client station that the duration calculated is to be determined based on the duration indication (e.g., rate and length) in L-SIG 212 without modification. On the other hand, if modulation of all or at least some OFDM tones, such as only data OFDM tones or only pilot OFDM tones, in the OFDM symbol corresponding to the duplicated L-SIG is rotated (e.g., by 90 degrees) with respect to OFDM tones in the OFDM symbol corresponding to the first L-SIG 212, this indicates to the non-legacy client station that the duration calculated based on the duration indication (e.g., rate and length) in L-SIG 212 is to be multiplied by 2 (2x), in this embodiment. Alternatively, modulation of OFDM tones of an OFDM symbol other than duplicated L-SIG field, such as an OFDM symbol corresponding to the HE-SIG-A 220, is used to signal length extension mode, in some embodiments.

Figure 30A:
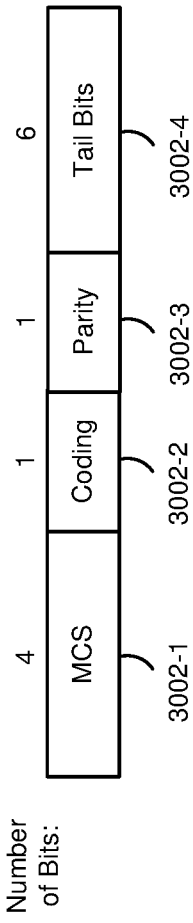
FIGS. 30A-30C are diagrams of example signal fields, according to embodiments.
Figure 30B:
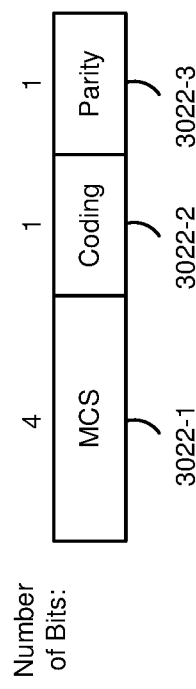
Figure 30C:
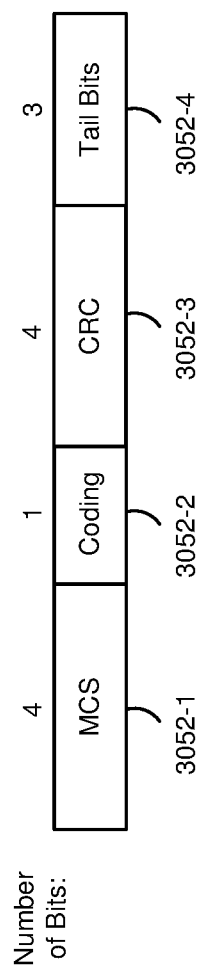

FIGS. 30A-30C are diagrams of example signal fields 3000, 3020, 3050, according to various embodiment. The signal fields 3000, 3020, 3050 are included in the HE-SIG-C 235, in various embodiments. For example, the HE-SIG-C 235 includes a signal field such as the signal field 3000, 3020, 3050 corresponding to each client station 25 scheduled to receive data in the data unit 200. Referring first to FIG. 30A, the signal field 3000 includes a plurality of subfields 3002. Bit allocation for the subfields 3002, according to an example embodiment, are illustrated above the subfields 3002 in FIG. 30A. Other bit allocations are used for the subfields 3002, in other embodiments. The subfields 3002 include an MCS subfield 3002-1, a coding subfield 3002-2, a parity bit 3002-3 and tail bits 3002-4. The MCS subfield 3002-1 indicates an MCS used for transmission of data to the corresponding client station 25, in an embodiment. The coding subfield 3002-2 indicates a coding type (e.g., BCC or LDPC) used for the corresponding client station 25, in an embodiment. The parity bit 3002 is used to check correctness of the signal field 3000 at the receiving device. Tail bits are used to initialize the decoder at the receiving device, if BCC encoding is used, in an embodiment.

In an embodiment, a signal field, such as the signal field 3000, corresponding to a resource unit is transmitted the OFDM tones included in the resource unit. In an embodiment, if a resource unit is a multi-user resource unit allocated to multiple client stations 25, a respective signal field, such as the signal 3000 corresponding to each of the multiple client station 25 transmitted using the respective spatial streams allocated for transmission of data to the corresponding client station 25. In an embodiment, the signal field 3000 is modulated using a lowest MCS, such as MCS0. In another embodiment, the signal field 3000 is modulated using a repletion MCS, such as MCS-Rep 2, if the repetition MCS is used for the HE-SIG-B 222, and is modulated using the lowest MCS, such as MCS 0, if repetition MCS is not used for the HE-SIG-B 222. In an embodiment, a signal field, such as the signal field 3000, corresponding to a 26-tone resource unit comprises two OFDM symbols if MCS-Rep is used, and comprises one OFDM symbol if MCS0 is used.

Referring now to FIG. 30B, the signal field 3020 is generally the same as the signal field 3000, except that tail-biting is used to encode the signal field 3020 and, accordingly, tail bits are omitted from the signal field 3020. In an embodiment, MCS10 is used to modulate the signal field 3020 to compensate for performance loss due to tail biting used with the signal field 3020. In an embodiment in which MCS10 is used to modulate the signal field 3020, the signal field 3020 comprises one OFDM symbol. Referring now to FIG. 30C, the signal field 3050 is generally the same as the signal field 3020 of FIG. 30B, except that in the signal field 3050, the parity bit 3002-3 is replaced by a CRC subfield 3052-3. The CRC subfield 3052-3 is used to compensate for performance loss dues to tail biting used with the signal field 3050 by increasing reliability of reception of the signal field 3050 at the receiving device. Accordingly, MCS10 may not be needed for reliable transmission of the signal field 3050, and the signal field 3050 is transmitted using MCS0, in an embodiment.

Figure 31:
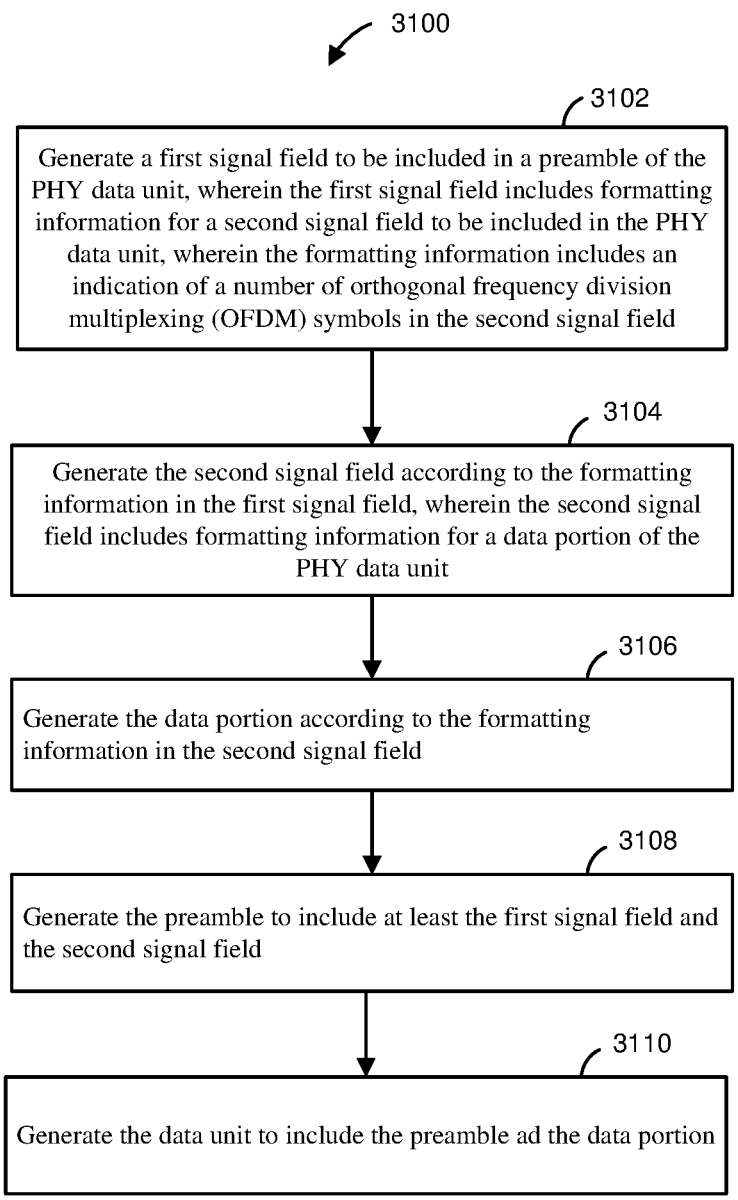
FIG. 31 is a flow diagram of a method for generating a data unit, according to an embodiment.

FIG. 31 is a flow diagram of an example method 3100 for processing a data unit, according to an embodiment. With reference to FIG. 1, the method 3100 is implemented by the network interface device 16, in an embodiment. For example, in one such embodiment, the PHY processing unit 20 is configured to implement the method 3100. According to another embodiment, the MAC processing 18 is also configured to implement at least a part of the method 3100. With continued reference to FIG. 1, in yet another embodiment, the method 3100 is implemented by the network interface device 27 (e.g., the PHY processing unit 29 and/or the MAC processing unit 28). In other embodiments, the method 3100 is implemented by other suitable network interface devices.

At block 3102, a first signal field to be included in a preamble of the data unit is generated. The first signal field includes formatting information for a second signal field to be included in the preamble of the data unit. In an embodiment, the HE-SIG-A 220 of FIG. 2 is generated at block 3102. In another embodiment, another suitable signal field is generated at block 3102. In an embodiment, the first signal field includes an indication of a number of OFDM symbols in the second signal field.

At block 3104, the second signal field is generated. The second signal field includes formatting information for a data portion of the data unit. In an embodiment, HE-SIG-B 222 of FIG. 2 is generated at block 3104. In another embodiment, the second signal field is generated at block 3104 according to the formatting information in the first signal field generated at block 3102. In an embodiment, the second signal field generated at block 3104 comprises the number of OFDM symbols indicated in the first signal field generated at block 3102.

At block 3106, the data portion is generated according to the formatting information included in the second signal field generated at block 3104. In an embodiment, the data portion 240 of the data unit 200 of FIG. 2 is generated. In another embodiment, another suitable data portion is generated.

At block 3108, the preamble is generated to include at least the first signal field generated at block 3102 and the second signal field generated at block 3104. At block 3110, the data unit is generated to include the preamble generated at block 3108 and the data portion generated at block 3106. In an embodiment, the data unit 200 of FIG. 2 is generated at block 3110. In another embodiment, another suitable data unit is generated at block 3110.

In an embodiment, a method for generating a physical layer (PHY) data unit for transmission via a communication channel includes generating a first signal field to be included in a preamble of the PHY data unit, wherein the first signal field includes formatting information for a second signal field to be included in the PHY data unit, wherein the formatting information includes an indication of a number of orthogonal frequency division multiplexing (OFDM) symbols in the second signal field. The method also includes generating the second signal field according to the formatting information in the first signal field, wherein the second signal field includes formatting information for a data portion of the PHY data unit. The method additionally includes generating the data portion according to the formatting information in the second signal field. The method further includes generating the preamble to include at least the first signal field and the second signal field, and generating the PHY data unit to include the preamble and the data portion.

In other embodiments, the method further includes any suitable combination of one or more of the following features.

Generating the first signal field includes generating the first signal field to include an indication of a modulation and coding scheme (MCS) used for generating the second signal field.

The MCS used for generating the second signal field is a first MCS, and wherein generating the first signal field includes using a second MCS for the first signal field, wherein the second MCS is different from the first MCS.

Generating the first signal field includes generating the first signal field to include an identifier of a network in which the PHY data unit is to be transmitted.

Generating the first signal field to include the identifier of the network comprises generating the first signal field to include an identifier of a basic service set (BSS).

The PHY data unit is a multi-user (MU) data unit directed to multiple receiving devices.

Generating the second signal field includes generating (i) a common subfield that includes common formatting information for the multiple receiving devices and (ii) a plurality of user-specific subfields that respectively include formatting information for ones of the multiple receiving devices.

Generating the second signal field includes generating the second signal field such that different ones of the user-specific subfields will be transmitted in parallel in different frequency sub-bands of the PHY data unit.

The PHY data unit is an orthogonal frequency division multiple access (OFDMA) data unit that includes data for multiple receiving devices.

Generating the second signal field includes generating (i) a first subfield of the second signal field to include a subfield that indicates resource allocation for the multiple devices and (ii) a plurality of second subfields that respectively include formatting information for different ones of the multiple receiving devices.

The subfield that indicates resource allocation includes a value selected form a codebook, wherein each value in the codebook corresponds to a particular mapping between (i) a plurality of basic resource units and (ii) the multiple receiving devices, wherein each basic resource unit in the plurality of basic resource units includes a block of consecutive OFDM tones.

The subfield includes fewer bits than a number of basic resource units in the plurality of resource units.

In another embodiment, an apparatus comprises a network interface device having one or more integrated circuits configured to generate a first signal field to be included in a preamble of a physical layer (PHY) data unit, wherein the first signal field includes formatting information for a second signal field to be included in the PHY data unit, wherein the formatting information includes an indication of a number of orthogonal frequency division multiplexing (OFDM) symbols in the second signal field. The one or more integrated circuits are further configured to generate the second signal field according to the formatting information in the first signal field, wherein the second signal field includes formatting information for a data portion of the PHY data unit. The one or more integrated circuits are additionally configured to generate the data portion according to the formatting information in the second signal field. The one or more integrated circuits are also configured to generate the preamble to include at least the first signal field and the second signal field, and generate the PHY data unit to include the preamble and the data portion.

In other embodiments, the apparatus includes any suitable combination of one or more of the following features.

The one or more integrated circuits are configured to generate the first signal field to include an indication of a modulation and coding scheme (MCS) used for generating the second signal field.

The MCS used for generating the second signal field is a first MCS, and wherein the one or more integrated circuits are configured to generate the first signal field using a second MCS, wherein the second MCS is different from the first MCS.

The one or more integrated circuits are configured to generate the first signal field to include an identifier of a network in which the PHY data unit is to be transmitted.

The one or more integrated circuits are configured to generate the first signal field to include the identifier of the network at least by generating the first signal field to include an identifier of a basic service set (BSS).

The PHY data unit is a multi-user (MU) data unit directed to multiple receiving devices.

The one or more integrated circuits are configured to generate (i) a common subfield that includes common formatting information for the multiple receiving devices and (ii) a plurality of user-specific subfields that respectively include formatting information for ones of the multiple receiving devices, and generate the second signal field to include the common subfield and the plurality of user-specific subfields.

The one or more integrated circuits are configured to generate the second signal field such that different ones of the user-specific subfields will be transmitted in parallel in different frequency sub-bands of the PHY data unit.

The PHY data unit is an orthogonal frequency division multiple access (OFDMA) data unit that includes data for multiple receiving devices.

The one or more integrated circuits are configured to generate (i) a first subfield to indicate resource allocation for the multiple devices and (ii) a plurality of second subfields that respectively include formatting information for different ones of the multiple receiving devices, and generate the second signal field to include the first subfield and the plurality of second subfields.

The subfield that indicates resource allocation includes a value selected form a codebook, wherein each value in the codebook corresponds to a particular mapping between (i) a plurality of basic resource units and (ii) the multiple receiving devices, wherein each basic resource unit in the plurality of basic resource units includes a block of consecutive OFDM tones.

The subfield includes fewer bits than a number of basic resource units in the plurality of resource units.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

In addition, further aspects of the present invention relates to one or more of the following clauses.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
   generating, at a communication device, a physical layer (PHY) preamble of a multi-user (MU) PHY data unit, including:
      generating a first signal field, wherein the first signal field is generated to include formatting information for a second signal field to be included in the PHY preamble, and
      generating the second signal field according to the formatting information in the first signal field, wherein the second signal field is generated to include:
         a common field that includes a value, selected from a codebook, that indicates i) an allocation of frequency resources to one or more resource units, wherein each resource unit corresponds to a respective block of consecutive orthogonal frequency division multiplexing (OFDM) tones, and ii) a respective number of receiving devices assigned to each resource unit, and
         a plurality of user-specific fields that indicate an allocation of the one or more resource units to the multiple receiving devices, wherein each user-specific field corresponds to a respective receiving device and includes i) an identifier of the respective receiving device, and ii) an indication of which one or more spatial streams are allocated to the respective receiving device;
   generating, at the communication device, a data portion of the MU PHY data unit to include data for the multiple receiving devices, wherein the data portion is generated according to i) the value, selected from the codebook, in the common field, and ii) the allocation of the one or more resource units to the multiple receiving devices indicated by the plurality of user-specific fields; and
   transmitting, by the communication device, the MU PHY data unit via the communication channel.

2. The method of claim 1, wherein:
   the formatting information in the first signal field indicates a modulation scheme; and
   the second signal field is generated according to the modulation scheme indicated by the first signal field.

3. The method of claim 2, wherein:
   the modulation scheme used for generating the second signal field is a first modulation scheme;
   the first signal field is generated according to a second modulation scheme; and
   the second modulation scheme is different from the first modulation scheme.

4. The method of claim 1, wherein the formatting information includes a value that indicates a number of orthogonal frequency division multiplexing (OFDM) symbols in the second signal field.

5. The method of claim 1, wherein generating the first signal field includes generating the first signal field to include an identifier of a network in which the MU PHY data unit is to be transmitted.

6. The method of claim 1, wherein:
   the common field is a first common field;
   the value selected from the codebook is a first value;
   the allocation of frequency resources is a first allocation of frequency resources corresponding to a first frequency channel;
   the one or more resource units are one or more first resource units;
   the plurality of user-specific fields are a plurality of first user-specific fields;
   the PHY preamble is generated to include the second signal field in the first frequency channel;
   generating the PHY preamble further comprises generating a third signal field that includes:
      a second common field that includes a second value, selected from the codebook, that indicates i) a second allocation of frequency resources, corresponding to a second frequency channel, to one or more second resource units, wherein each second resource unit corresponds to a respective block of consecutive OFDM tones, and ii) a respective number of receiving devices assigned to each second resource unit, and
      a plurality of second user-specific fields that indicate an allocation of the one or more second resource units to the multiple receiving devices, wherein each second user-specific field corresponds to a respective receiving device and includes i) an identifier of the respective receiving device, and ii) an indication of which one or more spatial streams are allocated to the respective receiving device.

7. The method of claim 1, wherein generating the PHY preamble further includes:
   encoding pairs of user-specific fields, among the plurality of user-specific fields, as respective error correction code blocks.

8. The method of claim 7, wherein:
   the respective error correction code blocks are first error correction code blocks; and
   generating the PHY preamble further includes encoding the common field as a second error correction code block.

9. An apparatus, comprising:
a network interface device having one or more integrated circuit (IC) devices, wherein the one or more IC devices are configured to:
generate a physical layer (PHY) preamble of a multi-user (MU) PHY data unit, including:
generating a first signal field, wherein the first signal field is generated to include formatting information for a second signal field to be included in the PHY preamble, and
generating the second signal field according to the formatting information in the first signal field, wherein the second signal field is generated to include:
a common field that includes a value, selected from a codebook, that indicates i) an allocation of frequency resources to one or more resource units, wherein each resource unit corresponds to a respective block of consecutive orthogonal frequency division multiplexing (OFDM) tones, and ii) a respective number of receiving devices assigned to each resource unit, and
a plurality of user-specific fields that indicate an allocation of the one or more resource units to the multiple receiving devices, wherein each user-specific field corresponds to a respective receiving device and includes i) an identifier of the respective receiving device, and ii) an indication of which one or more spatial streams are allocated to the respective receiving device;
wherein the one or more IC devices are further configured to:
generate a data portion of the MU PHY data unit to include data for the multiple receiving devices, wherein the data portion is generated according to i) the value, selected from the codebook, in the common field, and ii) the allocation of the one or more resource units to the multiple receiving devices indicated by the plurality of user-specific fields, and
transmit the MU PHY data unit via the communication channel.

10. The apparatus of claim 9, wherein:
the formatting information in the first signal field indicates a modulation scheme; and
the one or more IC devices are further configured to modulate the second signal field according to the modulation scheme indicated by the first signal field.

11. The apparatus of claim 10, wherein:
the modulation scheme used for generating the second signal field is a first modulation scheme;
the one or more IC devices are further configured to modulate the first signal field according to a second modulation scheme; and
the second modulation scheme is different from the first modulation scheme.

12. The apparatus of claim 9, wherein the formatting information includes a value that indicates a number of orthogonal frequency division multiplexing (OFDM) symbols in the second signal field.

13. The apparatus of claim 9, wherein the one or more IC devices are further configured to generate the first signal field to include an identifier of a network in which the MU PHY data unit is to be transmitted.

14. The apparatus of claim 9, wherein:
the common field is a first common field;
the value selected from the codebook is a first value;
the allocation of frequency resources is a first allocation of frequency resources corresponding to a first frequency channel;
the one or more resource units are one or more first resource units;
the plurality of user-specific fields are a plurality of first user-specific fields;
the one or more IC devices are further configured to:
generate the PHY preamble to include the second signal field in the first frequency channel,
generate the PHY preamble to include a third signal field, wherein the third signal field includes:
a second common field that includes a second value, selected from the codebook, that indicates i) a second allocation of frequency resources, corresponding to a second frequency channel, to one or more second resource units, wherein each second resource unit corresponds to a respective block of consecutive OFDM tones, and ii) a respective number of receiving devices assigned to each second resource unit, and
a plurality of second user-specific fields that indicate an allocation of the one or more second resource units to the multiple receiving devices, wherein each second user-specific field corresponds to a respective receiving device and includes i) an identifier of the respective receiving device, and ii) an indication of which one or more spatial streams are allocated to the respective receiving device.

15. The apparatus of claim 9, wherein the one or more IC devices are further configured to:
encode pairs of user-specific fields, among the plurality of user-specific fields, as respective error correction code blocks.

16. The apparatus of claim 15, wherein:
the respective error correction code blocks are first error correction code blocks; and
the one or more IC devices are further configured to encode the common field as a second error correction code block.

17. The apparatus of claim 9, wherein the network interface further comprises:
a media access control (MAC) processor implemented on the one or more IC devices; and
a PHY processor coupled to the MAC processor, wherein the PHY processor is implemented on the one or more IC devices.

18. The apparatus of claim 17, wherein the PHY processor comprises:
a plurality of transceivers.

19. The apparatus of claim 18, further comprising:
a plurality of antennas coupled to the plurality of transceivers.

* * * * *